United States Patent
van de Rijt et al.

(10) Patent No.: US 11,291,210 B2
(45) Date of Patent: Apr. 5, 2022

(54) SPIRAL COOKING DEVICES AND METHODS OF USING THE SAME

(71) Applicant: Provisur Technologies, Inc., Chicago, IL (US)

(72) Inventors: Frederik N. L. A. van de Rijt, Hedel (NL); Inge van der Helm, Delft (NL); Patrick Xander Steensma, Wateringen (NL)

(73) Assignee: Provisur Technologies, Inc., Chicago, IL (US)

( * ) Notice: Subject to any disclaimer, the term of this patent is extended or adjusted under 35 U.S.C. 154(b) by 0 days.

(21) Appl. No.: 16/588,760

(22) Filed: Sep. 30, 2019

(65) Prior Publication Data

US 2020/0029578 A1     Jan. 30, 2020

Related U.S. Application Data

(63) Continuation of application No. 15/587,697, filed on May 5, 2017, now Pat. No. 10,448,650.
(Continued)

(51) Int. Cl.
*A21B 1/48*     (2006.01)
*A21B 1/24*     (2006.01)
(Continued)

(52) U.S. Cl.
CPC ............... *A21B 1/48* (2013.01); *A21B 1/245* (2013.01); *A21B 1/26* (2013.01); *A23L 3/185* (2013.01);
(Continued)

(58) Field of Classification Search
CPC ........ A47J 37/0754; A21B 1/24; A21B 1/245; A21B 1/26; A21B 1/46; A21B 1/48; B65G 15/30; B65G 17/083; B65G 17/22
(Continued)

(56) References Cited

U.S. PATENT DOCUMENTS

| 2,083,864 A | 6/1937 | Puckett |
| 2,228,998 A | 1/1941 | Birdseye |

(Continued)

FOREIGN PATENT DOCUMENTS

| CA | 2882647 C | 5/2007 |
| CN | 101855151 A | 10/2010 |

(Continued)

OTHER PUBLICATIONS

Extended European Search Report for application No. 17793422.1, dated Mar. 3, 2020 (16 pages).
(Continued)

*Primary Examiner* — Reginald Alexander
(74) *Attorney, Agent, or Firm* — Klintworth & Rozenblat IP LLP

(57) ABSTRACT

In one aspect, a spiral cooking device includes a first cooking zone with air configured to move horizontally therethrough in a first direction, a second cooking zone with air configured to move horizontally therethrough in a second direction different than the first direction, and a spiral conveyor belt at least partially positioned in the first and second cooking zones and configured to transport food product thereon through the first and second cooking zones. In one aspect, a spiral cooking device includes a spiral conveyor belt providing a central opening inside the belt and a conveyor belt drive member positioned externally of the central opening. In one aspect, a conveyor belt cleaning device is provided. In one aspect, a cooking device includes a frame including a plurality of coupled pipes for providing structural support to the device and at least one of the pipes is configured to have liquid pass therethrough.

11 Claims, 47 Drawing Sheets

Related U.S. Application Data

(60) Provisional application No. 62/332,143, filed on May 5, 2016.

(51) Int. Cl.
| | |
|---|---|
| *B65G 45/24* | (2006.01) |
| *A47J 37/04* | (2006.01) |
| *B65G 45/18* | (2006.01) |
| *A21B 1/26* | (2006.01) |
| *B65G 45/22* | (2006.01) |
| *A23L 3/18* | (2006.01) |
| *A23L 5/10* | (2016.01) |
| *A47J 37/07* | (2006.01) |
| *A47J 27/00* | (2006.01) |
| *A47J 36/34* | (2006.01) |

(52) U.S. Cl.
CPC ............... *A23L 5/17* (2016.08); *A47J 27/002* (2013.01); *A47J 36/34* (2013.01); *A47J 37/044* (2013.01); *A47J 37/0754* (2013.01); *B65G 45/18* (2013.01); *B65G 45/22* (2013.01); *B65G 45/24* (2013.01); *A23L 5/15* (2016.08); *B65G 2201/0202* (2013.01); *B65G 2207/26* (2013.01)

(58) Field of Classification Search
USPC ............................... 99/443 C, 477, 478, 479
See application file for complete search history.

(56) References Cited

U.S. PATENT DOCUMENTS

| | | | |
|---|---|---|---|
| 3,256,803 A | 6/1966 | Nelson | |
| 3,443,505 A | 5/1969 | Kaufman, Jr. | |
| 3,448,678 A | 6/1969 | Burstein | |
| 3,448,695 A | 6/1969 | Werner | |
| 3,580,164 A | 5/1971 | Baker | |
| 3,706,378 A | 12/1972 | Markwick | |
| 3,837,272 A | 9/1974 | Evich | |
| 3,905,760 A | 9/1975 | Johansson et al. | |
| 3,908,533 A | 9/1975 | Fagerstrom et al. | |
| 3,938,651 A | 2/1976 | Alfred et al. | |
| 4,039,278 A | 8/1977 | Denholm | |
| 4,118,181 A | 10/1978 | Onodera | |
| 4,191,881 A | 3/1980 | Ahlgren et al. | |
| 4,479,310 A | 10/1984 | Duc | |
| 4,548,191 A | 10/1985 | Hwang | |
| 4,565,282 A | 1/1986 | Olsson et al. | |
| 4,631,029 A | 12/1986 | Lanham et al. | |
| 4,689,303 A | 8/1987 | Kraft et al. | |
| 4,750,416 A | 6/1988 | Graham | |
| 4,812,622 A | 3/1989 | Takeda et al. | |
| 4,830,175 A | 5/1989 | Durst et al. | |
| 4,831,238 A | 5/1989 | Smith et al. | |
| 4,875,343 A | 10/1989 | Jeppsson | |
| 4,949,629 A | 8/1990 | Leary et al. | |
| RE33,510 E | 1/1991 | Williams | |
| 5,010,808 A * | 4/1991 | Lanham | A21B 1/48 198/778 |
| 5,066,505 A | 11/1991 | Vos et al. | |
| 5,078,120 A | 1/1992 | Hwang | |
| 5,111,929 A | 5/1992 | Pierick et al. | |
| 5,156,873 A | 10/1992 | Skrmetta | |
| 5,189,948 A | 3/1993 | Liebermann | |
| 5,228,557 A | 7/1993 | Lago | |
| 5,243,962 A | 9/1993 | Hwang | |
| 5,322,007 A | 6/1994 | Caridis et al. | |
| 5,329,916 A | 7/1994 | Lygum | |
| 5,335,590 A | 8/1994 | Crump, III et al. | |
| 5,343,714 A | 9/1994 | Kiczek et al. | |
| 5,394,791 A | 3/1995 | Vallee | |
| 5,410,951 A * | 5/1995 | Ledet | A23L 3/185 99/443 C |
| 5,460,260 A | 10/1995 | Ochs et al. | |
| 5,515,775 A | 5/1996 | Crump, III et al. | |
| RE35,259 E | 6/1996 | Williams | |
| 5,615,603 A | 4/1997 | Polin | |
| 5,702,245 A | 12/1997 | London | |
| 5,743,376 A | 4/1998 | Ochs | |
| 5,836,240 A | 11/1998 | Kuenen | |
| 5,850,781 A | 12/1998 | Kuenen | |
| 5,906,485 A | 5/1999 | Groff et al. | |
| 5,919,039 A | 7/1999 | Shaw et al. | |
| 5,942,265 A | 8/1999 | Roberds et al. | |
| 6,065,463 A | 5/2000 | Martin | |
| 6,095,805 A | 8/2000 | Kuenen | |
| 6,138,660 A * | 10/2000 | Middleton, Jr. | A21B 1/26 126/21 A |
| 6,244,168 B1 | 6/2001 | van de Vorst et al. | |
| 6,247,922 B1 | 6/2001 | Kuenen | |
| 6,494,131 B2 | 12/2002 | van de Vorst et al. | |
| 6,531,172 B2 | 3/2003 | Perrine | |
| 6,658,993 B2 | 12/2003 | Kuenen | |
| 6,689,407 B2 | 2/2004 | Shefet et al. | |
| 6,691,698 B2 | 2/2004 | Gunawardena et al. | |
| 6,713,107 B2 | 3/2004 | Shefet et al. | |
| 6,932,210 B2 | 8/2005 | Krämer | |
| 7,107,899 B2 | 9/2006 | Nothum, Jr. | |
| 7,178,662 B2 | 2/2007 | Olsson et al. | |
| 7,258,226 B2 | 8/2007 | Nelson et al. | |
| 7,258,227 B2 | 8/2007 | Rettore et al. | |
| RE39,828 E | 9/2007 | Miller et al. | |
| 7,270,231 B2 | 9/2007 | Heber | |
| 7,374,035 B2 | 5/2008 | Olsson et al. | |
| 7,494,005 B2 | 2/2009 | Messick, Jr. et al. | |
| 7,565,967 B2 | 7/2009 | Maine, Jr. et al. | |
| 7,975,840 B2 | 7/2011 | Messick, Jr. et al. | |
| 7,987,972 B2 | 8/2011 | Hennigar et al. | |
| 8,028,618 B2 * | 10/2011 | Lapeyre | B65G 45/14 99/443 R |
| 8,302,765 B2 | 11/2012 | Lago | |
| 8,333,087 B2 | 12/2012 | McCormick et al. | |
| 8,348,046 B1 | 1/2013 | Baumgardner et al. | |
| 8,381,499 B2 | 2/2013 | Parisini et al. | |
| 8,415,592 B2 | 4/2013 | Kuenen | |
| 8,424,676 B2 | 4/2013 | Jones et al. | |
| 8,567,308 B2 | 10/2013 | Onozato et al. | |
| 8,646,383 B1 | 2/2014 | Howard | |
| 8,707,861 B2 | 4/2014 | Gunawardena et al. | |
| 8,753,703 B2 | 6/2014 | Gunawardena et al. | |
| 8,800,757 B2 | 8/2014 | Malmberg et al. | |
| 8,807,021 B2 | 8/2014 | McVeagh et al. | |
| 8,820,517 B2 | 9/2014 | Gramby | |
| 8,839,714 B2 | 9/2014 | Schjerven, Sr. et al. | |
| 8,839,779 B2 | 9/2014 | Wiker et al. | |
| 9,021,944 B2 | 5/2015 | Leferink et al. | |
| 9,044,022 B2 | 6/2015 | Van der Eerden et al. | |
| 9,061,829 B2 | 6/2015 | Salsone et al. | |
| 9,107,422 B2 | 8/2015 | Howard et al. | |
| 9,161,651 B2 | 10/2015 | Ros et al. | |
| 9,169,074 B2 | 10/2015 | Messick, Jr. et al. | |
| 9,220,276 B2 | 12/2015 | Howard | |
| 9,221,611 B2 | 12/2015 | Ulchak et al. | |
| 9,320,284 B2 | 4/2016 | Van Camp et al. | |
| 9,585,400 B2 | 3/2017 | Wiker et al. | |
| 9,585,401 B2 | 3/2017 | Wiker et al. | |
| 10,448,650 B2 | 10/2019 | van de Rijt et al. | |
| 2002/0029698 A1 | 3/2002 | Van De Vorst et al. | |
| 2003/0165600 A1 | 9/2003 | Shefet et al. | |
| 2004/0103923 A1 | 6/2004 | Brink | |
| 2005/0092730 A1 | 5/2005 | Nothum, Jr. | |
| 2006/0054465 A1 | 3/2006 | Kraus et al. | |
| 2007/0298148 A1 | 12/2007 | van der Eerden et al. | |
| 2009/0120304 A1 | 5/2009 | Ishino et al. | |
| 2010/0058937 A1 | 3/2010 | Leferink et al. | |
| 2011/0084056 A1 | 4/2011 | Kuenen | |
| 2011/0168689 A1 | 7/2011 | Kuenen | |
| 2011/0226137 A1 | 9/2011 | van der Eerden et al. | |
| 2011/0247355 A1 | 10/2011 | McCormick | |
| 2011/0287154 A1 | 11/2011 | Reeser et al. | |
| 2011/0297513 A1 * | 12/2011 | Lago | B65G 21/18 198/850 |

(56) References Cited

U.S. PATENT DOCUMENTS

| | | |
|---|---|---|
| 2013/0133637 A1 | 5/2013 | McVeagh et al. |
| 2013/0220145 A1* | 8/2013 | Ros ............... A47J 37/045 99/443 C |
| 2014/0037809 A1 | 2/2014 | Middleton, Jr. |
| 2015/0079259 A1 | 3/2015 | Ahmed |
| 2015/0245643 A1 | 9/2015 | Kop et al. |
| 2015/0250213 A1 | 9/2015 | Howard |
| 2015/0342227 A1 | 12/2015 | Verbruggen et al. |
| 2015/0353285 A1* | 12/2015 | Matsuzaki ........... B65G 21/18 198/778 |
| 2016/0066585 A1* | 3/2016 | Lago ............... A21B 1/48 99/326 |
| 2017/0318819 A1 | 11/2017 | van de Rijt et al. |

FOREIGN PATENT DOCUMENTS

| | | |
|---|---|---|
| CN | 102202989 A | 9/2011 |
| CN | 102405181 A | 4/2012 |
| DE | 10 2013 105 034 A1 | 11/2013 |
| EP | 0 333 565 B1 | 9/1989 |
| EP | 0528593 A1 | 2/1993 |
| EP | 0953286 A1 | 11/1999 |
| EP | 1069387 A1 | 1/2001 |
| EP | 1688687 A1 | 8/2006 |
| EP | 2135509 A1 | 12/2009 |
| EP | 2200913 A1 | 6/2010 |
| EP | 2346754 A2 | 7/2011 |
| EP | 2421775 A2 | 2/2012 |
| EP | 2679097 A1 | 1/2014 |
| FR | 2428977 A1 | 1/1980 |
| GB | 2096878 A | 10/1982 |
| GB | 2206190 A | 12/1988 |
| WO | 99/57496 A1 | 11/1999 |
| WO | 2006/049492 A1 | 5/2006 |
| WO | 2009084949 A2 | 7/2009 |
| WO | 2014170134 A1 | 10/2014 |

OTHER PUBLICATIONS

International Search Report for PCT/NL2013/050043, dated May 29, 2013, 5 pages.

FMC Foodtech, The Optimized Oven, published at least as early as May 4, 2016, 12 pages.

"TSP" Hot Air Tunnels Are Precision Engineered To Maximize Product Quality & Food Safety; Provisur Technologies, Inc.; Catalog [online], Feb. 16, 2016. [retrieved Jun. 5, 2017). Retrieved from the Internet: <URL: http:/fwww.provisur.com/tsVproducts/hot-air-tunnel>; p. 1.

International Search Report and Written Opinion for PCT/US17/19431 dated Jun. 27, 2017, 37 pages.

International Search Report and Written Opinion for PCT/US2017/031230 dated Sep. 21, 2017, 21 pages.

Partial Supplementary European Search Report for application No. 17793422.1, dated Nov. 11, 2019 (20 pages).

* cited by examiner

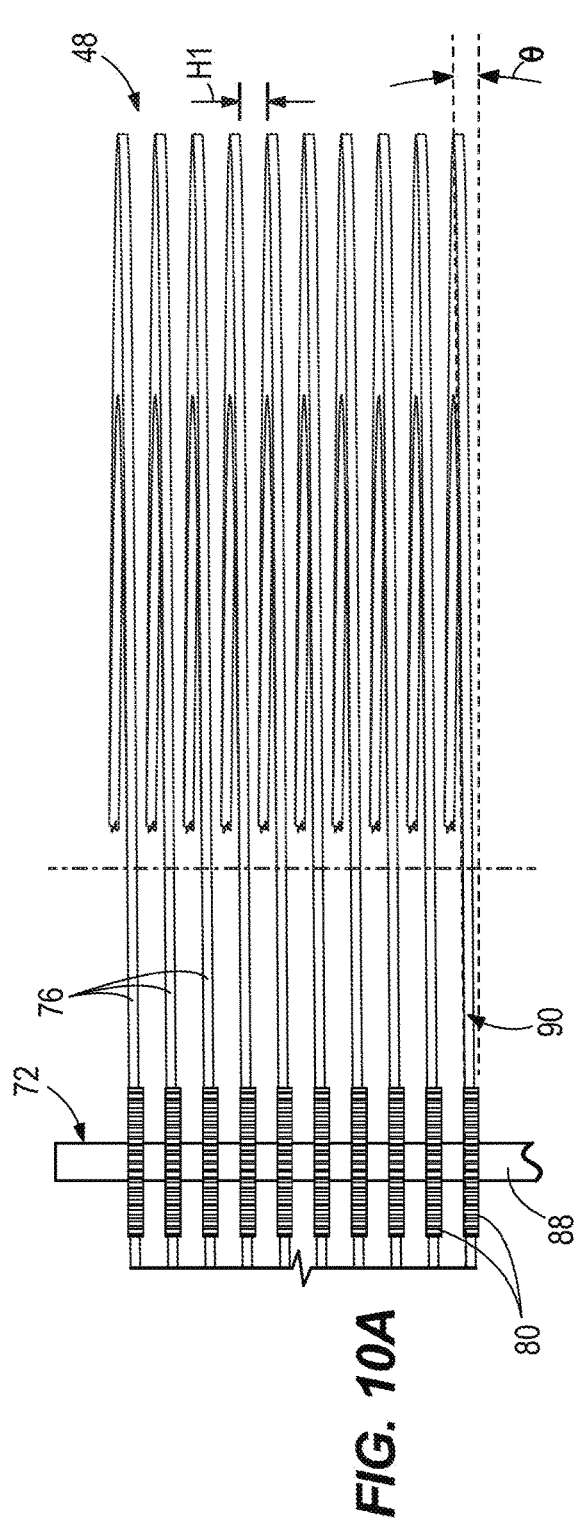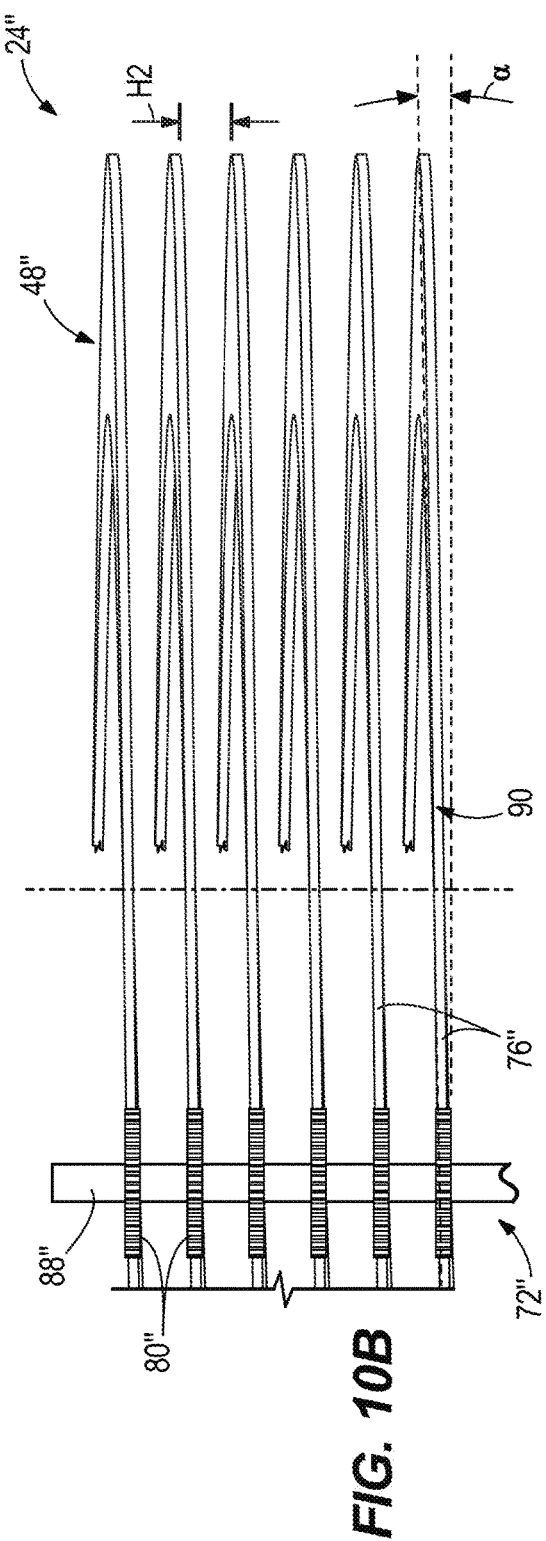

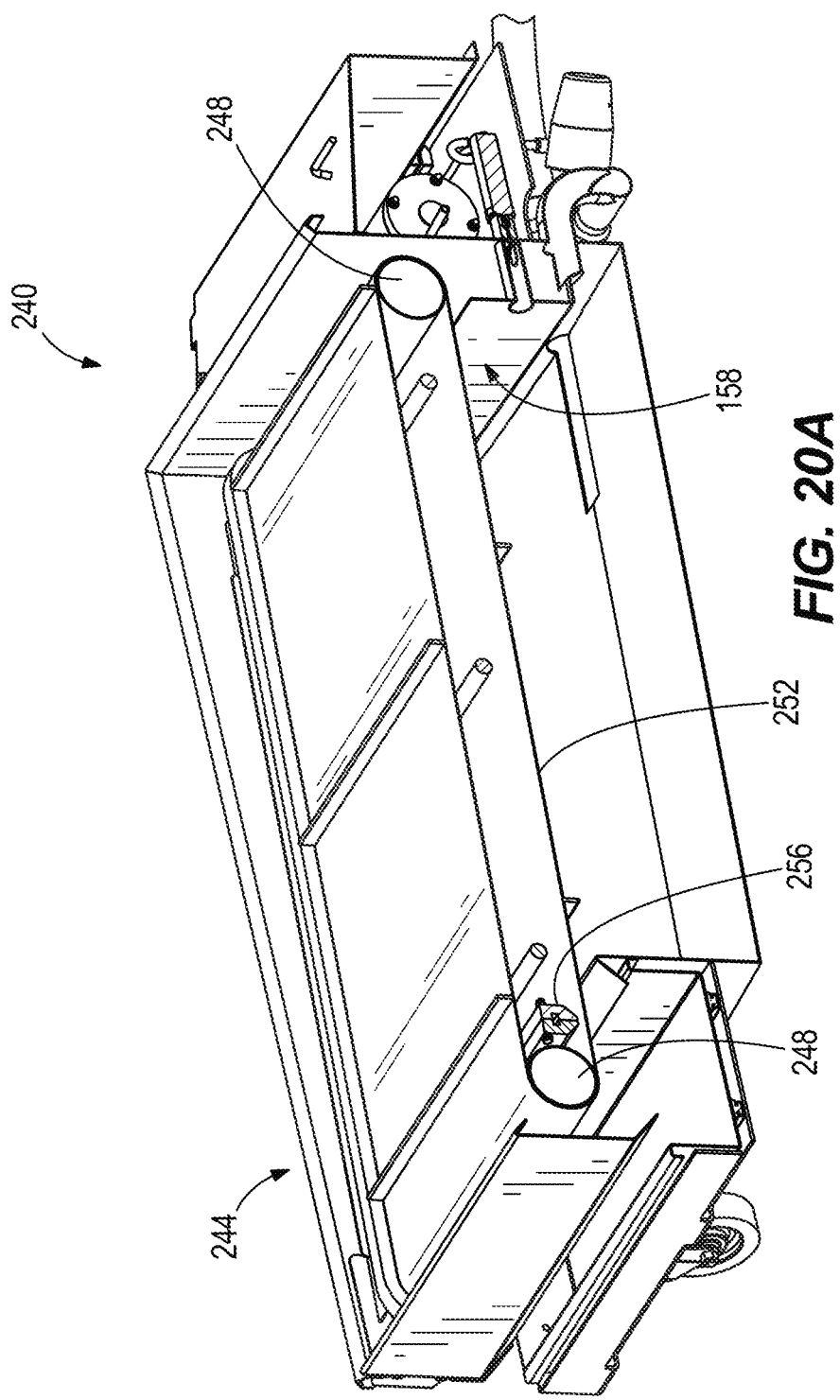

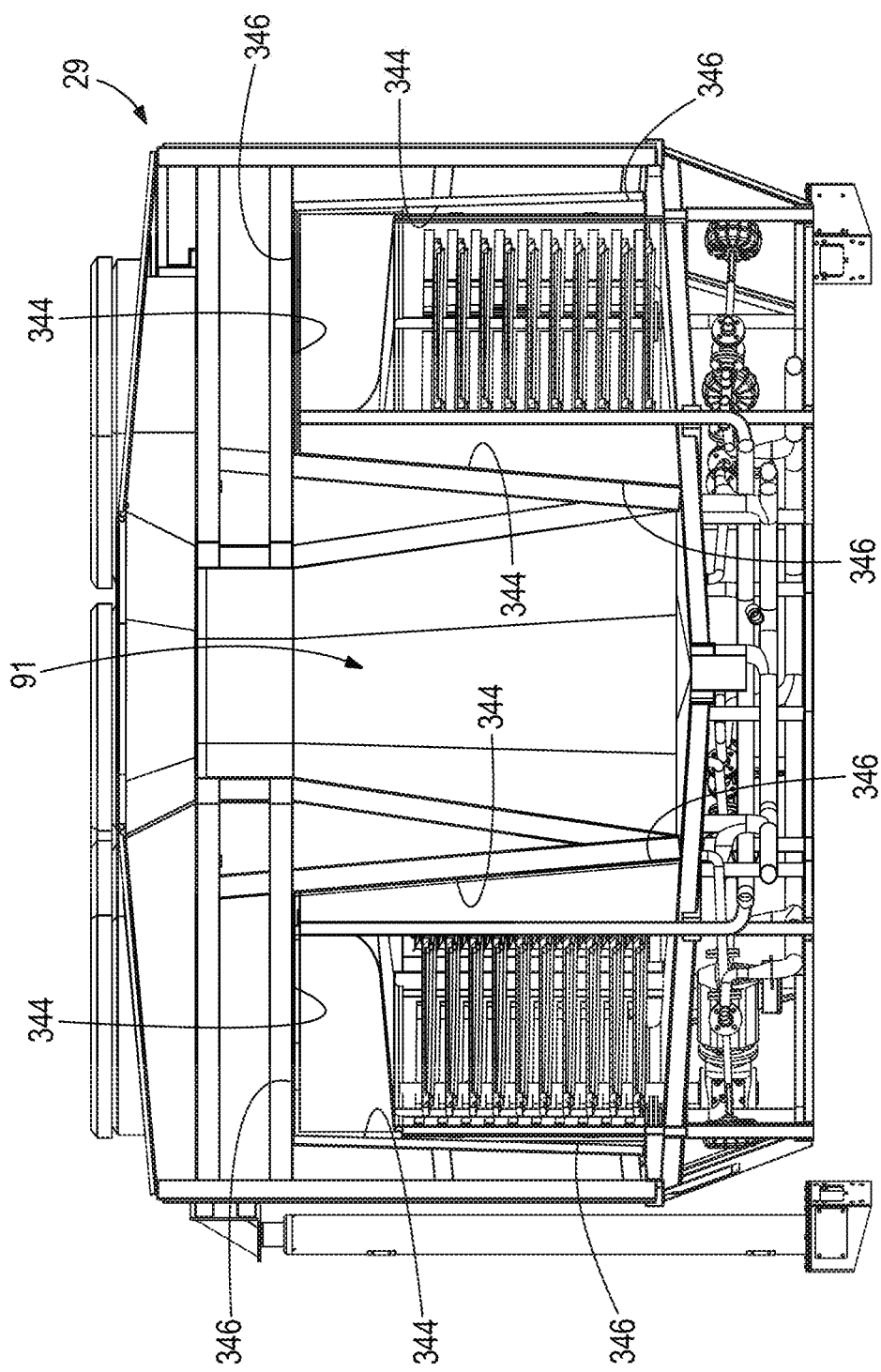

SPIRAL COOKING DEVICES AND METHODS OF USING THE SAME

RELATED APPLICATIONS

The present application is a continuation application of, and claims the priority benefit of, co-pending U.S. patent application Ser. No. 15/587,697, filed May 5, 2017, which is incorporated by reference herein. U.S. patent application Ser. No. 15/587,697 and the present application claim the priority benefit of U.S. Provisional Patent Application No. 62/332,143, filed May 5, 2016, which is incorporated by reference herein.

FIELD OF THE INVENTION

The present disclosure generally relates to a cooking device for cooking food product and, more particularly, to a spiral cooking device including improved cooking performance of food product.

BACKGROUND

Many conventional cooking devices exist and are used to cook food product in a variety of manners. Such conventional cooking devices attempt to cook food product in reliable, consistent and efficient manners. However, such conventional cooking devices fall short in achieving one or more of these desired results, thereby resulting in one or more deficiencies of the conventional cooking devices.

Moreover, spiral cooking devices exist. However, such conventional spiral cooking devices may lack reliable, consistent and efficient cooking operation.

Conventional spiral cooking devices include a center drive member or center drum that engages an interior of a spiral conveyor belt to drive the spiral conveyor belt. The presence of the center drum significantly affects the air and heat flow within the spiral cooking device, thereby providing uneven and/or inconsistent air and heat distribution within the spiral cooking device. The presence of the center drum also occupies space in the conventional spiral ovens that could otherwise be occupied by other components.

SUMMARY

Thus, a need exists for a spiral cooking device that resolves one or more of these deficiencies.

In one aspect, a spiral cooking device is provided.

In one aspect, a method of operating a spiral cooking device is provided.

In one aspect, a spiral cooking device is provided and includes a plurality of independently controlled cooking zones, in which at least one of temperature, pressure, humidity, and air speed may be controlled within each zone independently of another zone.

In one aspect, a method of controlling a spiral cooking device is provided and includes independently controlling a plurality of zones within the spiral cooking device.

In one aspect, a spiral cooking device is provided and includes a first cooking zone and a second cooking zone, wherein food product is configured to pass through the first cooking zone and the second cooking zone, and wherein heated air passes through the first cooking zone in a first direction and heated air passes through the second cooking zone in a second direction different than the first direction.

In one aspect, a method of cooking food product in a spiral cooking device is provided and includes passing heated air through a first cooking zone of the spiral cooking device in a first direction and passing heated air through a second cooking zone in a second direction different than the first direction.

In one aspect, a spiral cooking device is provided and includes a first cooking zone with air configured to move horizontally therethrough in a first direction and a second cooking zone with air configured to move horizontally therethrough in a second direction different than the first direction.

In one aspect, the second direction may be opposite the first direction.

In one aspect, the spiral cooking device may have an arcuate configuration and the first and second directions may be radial with respect to the arcuate configuration of the spiral cooking device.

In one aspect, the first direction may be outward from a center of the spiral cooking device and the second direction may be inward toward the center of the spiral cooking device.

In one aspect, the spiral cooking device may further include a first adjustable opening in fluid communication with the first cooking zone and a second adjustable opening in fluid communication with the second cooking zone. The heated air is configured to pass through the first adjustable opening into the first cooking zone and heated air is configured to pass through the second adjustable opening into the second cooking zone. A size of the first adjustable opening and a size of the second adjustable opening are adjustable.

In one aspect, the spiral cooking device may further include a conveyor belt at least partially positioned in the first cooking zone and the second cooking zone. The conveyor belt is configured to transport food product thereon through the first cooking zone and the second cooking zone.

In one aspect, the cooking device may include a spiral conveyor belt that has multiple vertical tiers. The multiple vertical tiers of conveyor belt are positioned in the first cooking zone and the second cooking zone. The multiple vertical tiers of conveyor belt are configured to transport food product thereon through the first cooking zone and the second cooking zone.

In one aspect, the spiral cooking device may further include a third cooking zone with air configured to move horizontally therethrough in the first direction, and a fourth cooking zone with air configured to move horizontally therethrough in the second direction.

In one aspect, the first, second, third and fourth zones may be consecutively and concentrically around the arcuately configured spiral cooking device.

In one aspect, a spiral cooking device is provided and includes a first cooking zone with air configured to move horizontally therethrough in a first direction and a second cooking zone with air configured to move horizontally therethrough in a second direction different than the first direction.

In one aspect, a spiral cooking device is provided and includes a base, a hood, a spiral conveyor belt at least partially positioned in the hood and configured to provide a central opening inside the spiral conveyor belt, and a conveyor belt drive member configured to drive the belt. The spiral cooking device lacks a central drum in the central opening defined by the spiral conveyor belt.

In one aspect, a continuous conveyor belt wash device is provided and includes at least one brush configured to rotate, at least one sprayer configured to spray fluid, a soak bin configured to hold an amount of fluid through which a conveyor belt passes, a waste bin positioned at least partially below the brush and configured to receive a combination of fluid from the sprayer and debris dislodged from the conveyor belt, and a filter belt configured to receive the combination of fluid and debris from the waste bin.

In one aspect, a cooking device is provided and includes a frame including a plurality of coupled pipes for providing structural support to the cooking device. At least one of the plurality of pipes is hollow and is configured to have liquid pass therethrough. The cooking device also includes a sprayer configured to receive the liquid from the at least one of the plurality of pipes and configured to spray the fluid within the cooking device.

In one aspect, a food processing system is provided and includes a first spiral cooking device including a base, a hood, a heating element and a spiral conveyor belt at least partially positioned in the hood, and a second spiral cooking device including a base, a hood, a heating element and a spiral conveyor belt at least partially positioned in the hood. The first and second spiral cooking devices are controlled independently of each other.

In one aspect, a spiral cooking device is provided and includes a base, a hood, and a spiral conveyor belt at least partially positioned in the hood. The spiral conveyor belt is selectively positioned in a first configuration, in which the spiral conveyor belt has a first plurality of tiers and a first spacing between the first plurality of tiers, and a second configuration, in which the spiral conveyor belt has a second plurality of tiers and a second spacing between the second plurality of tiers. The first plurality of tiers is different than the second plurality of tiers and the first spacing is different than the second spacing.

In one aspect, a cooking device is provided and is configured to provide uniform airflow, temperature, air speed and humidity in order to cook food product in a highly efficient manner.

In one aspect, a spiral cooking device is provided and includes a first cooking zone with air configured to move horizontally therethrough in a first direction, a second cooking zone with air configured to move horizontally therethrough in a second direction different than the first direction, and a spiral conveyor belt at least partially positioned in the first cooking zone and the second cooking zone. The spiral conveyor belt is configured to transport food product thereon through the first cooking zone and the second cooking zone.

In one aspect, the second direction may be opposite the first direction.

In one aspect, the spiral cooking device may be circular in shape, and the first direction may be a center-out direction and the second direction may be an outside-in direction.

In one aspect, the spiral cooking device may further include a first adjustable opening in fluid communication with the first cooking zone and a second adjustable opening in fluid communication with the second cooking zone. Heated air may be configured to pass through the first adjustable opening into the first cooking zone and heated air may be configured to pass through the second adjustable opening into the second cooking zone. A size of the first adjustable opening and a size of the second adjustable opening may be adjustable.

In one aspect, the spiral cooking device may further include a third cooking zone with air configured to move horizontally therethrough, a fourth cooking zone with air configured to move horizontally therethrough, a fifth cooking zone with air configured to move horizontally therethrough, and a sixth cooking zone with air configured to move horizontally therethrough.

In one aspect, the first through sixth cooking zones may be consecutively positioned around the spiral cooking device.

In one aspect, the spiral cooking device may further include a hood defining a cavity therein. The first, second, third, fourth, fifth and size cooking zones may be within the cavity in the hood.

In one aspect, the spiral conveyor belt may include a plurality of tiers and a plurality of cooking locations. The spiral conveyor belt may be configured to transport food product through the plurality of cooking locations. One of the plurality of cooking locations may be positioned at each of the plurality of tiers, and both the plurality of tiers and the plurality of cooking locations may be at least partially positioned in the first cooking zone and the second cooking zone.

In one aspect, air may be configured to move horizontally through the plurality of cooking locations positioned in the first cooking zone in the first direction, and air may be configured to move horizontally through the plurality of cooking locations positioned in the second cooking zone in the second direction.

In one aspect, the spiral conveyor belt may include a first tier and a second tier positioned above the first tier. The first tier and the second tier may be positioned in both the first cooking zone and the second cooking zone. A first cooking location may be defined between the first tier and the second tier in the first cooking zone, air may be configured to move horizontally through the first cooking location in the first direction, and a second cooking location may be defined between the first tier and the second tier in the second cooking zone. Air may be configured to move horizontally through the second cooking location in the second direction.

In one aspect, the spiral cooking device may further include a first opening in fluid communication with the first cooking location. Heated air may be configured to pass through the first opening into the first cooking location in the first direction. The spiral cooking device may also include a second opening in fluid communication with the second cooking location. Heated air may be configured to pass through the second opening into the second cooking location in the second direction.

In one aspect, the first opening may be a first adjustable opening that is adjustable to change a size thereof, and the second opening may be a second adjustable opening that is adjustable to change a size thereof.

In one aspect, the first adjustable opening and the second adjustable opening may be adjustable independent of each other.

In one aspect, the first cooking zone may include a first heating element positioned in the first cooking zone and the second cooking zone may include a second heating element positioned in the second cooking zone.

In one aspect, the spiral cooking device may further include a hood defining a cavity therein. The first and second cooking zones may be within the cavity of the hood.

In one aspect, a spiral cooking device is provided and includes a housing, a spiral conveyor belt at least partially positioned in the housing and providing a central opening inside the spiral conveyor belt, and a conveyor belt drive member configured to drive the spiral conveyor belt. The conveyor belt drive member is positioned externally of the central opening.

In one aspect, the housing may include a base and a hood. The hood may be moveable relative to the base to selectively provide access inside the hood.

In one aspect, the spiral cooking device may further include a lifting mechanism coupled between the base and the hood to selectively move the hood between a lowered position, in which the hood may engage the base to facilitate a seal between the hood and the base and a lifted position, in which the hood may be vertically raised relative to the base and does not provide a seal between the base and the hood.

In one aspect, the housing may include a base and a hood. The hood may be rigidly coupled to the base. The spiral cooking device may further include a plurality of doors coupled to the hood. The doors may be moveable relative to the hood to selectively provide access inside the hood.

In one aspect, the spiral conveyor belt may include an interior edge and an exterior edge. The interior edge may define the central opening, and the conveyor belt drive member may engage the exterior edge of the spiral conveyor belt.

In one aspect, the conveyor belt drive member may include a sprocket that engages the exterior edge of the spiral conveyor belt to drive the spiral conveyor belt.

In one aspect, the spiral conveyor belt may be a helical conveyor belt including an interior edge and an exterior edge. The interior edge of the helical conveyor belt may define the central opening.

In one aspect, the helical conveyor belt may include a plurality of tiers, and the conveyor belt drive member may include a plurality of sprockets. One of the plurality of sprockets may engage the exterior edge of the helical conveyor belt at each of the plurality of tiers of the helical conveyor belt.

In one aspect, the helical conveyor belt may include a plurality of tiers, and the conveyor belt drive member may include a motor, a first spindle, a first plurality of sprockets, a second spindle and a second plurality of sprockets. The first plurality of sprockets may be rigidly coupled to the first spindle. The first spindle may be coupled to and configured to be rotated by the motor. The second plurality of sprockets may be rigidly coupled to the second spindle. The second spindle may be coupled to and configured to be rotated by the motor. One of the first plurality of sprockets and one of the second plurality of sprockets may engage the exterior edge of the helical conveyor belt at each of the plurality of tiers of the helical conveyor belt.

In one aspect, the spiral cooking device may further include a heating element positioned in the central opening defined by the helical conveyor belt.

In one aspect, the spiral cooking device may further include a cooking location, an air infeed path and an air return path. The helical conveyor belt may be configured to move food product through the cooking location, the air infeed path may be in fluid communication with the cooking location and may be configured to direct heated air into the cooking location, the air return path may be in fluid communication with the cooking location and may be configured to receive air exiting the cooking location, and one of the air infeed path and the air return path may be positioned in the central opening defined by the helical conveyor belt.

In one aspect, the spiral cooking device may further include a heating element positioned in the central opening defined by the helical conveyor belt.

In one aspect, a conveyor belt cleaning device is provided and includes a brush configured to engage a conveyor belt, a sprayer configured to spray fluid, a soak bin configured to hold an amount of fluid through which the conveyor belt is configured to pass prior to engagement with the brush, and a filter device configured to receive a combination of fluid from the sprayer and debris dislodged from the conveyor belt.

In one aspect, the filter device may include a filter belt at least partially positioned below the brush to receive the combination of fluid and debris.

In one aspect, the filter belt may be oriented in a non-horizontal manner.

In one aspect, the filter belt may define a plurality of holes therethrough. The plurality of holes may be sufficiently sized to allow the fluid from the combination of fluid and debris to pass therethrough and inhibit the debris from the combination of fluid and debris from passing therethrough.

In one aspect, the filter belt may be configured to rotate.

In one aspect, the conveyor belt cleaning device may further include a debris bin at least partially positioned under the filter belt. Rotation of the filter belt may be configured to cause debris resting on top of the filter belt to fall from the filter belt and into the debris bin.

In one aspect, the conveyor belt cleaning device may further include a fluid bin at least partially positioned under the filter belt. Fluid from the combination of fluid and debris may be configured to fall into the fluid bin.

In one aspect, the filter belt may define a plurality of holes therethrough. The plurality of holes may be sufficiently sized to allow the fluid from the combination of fluid and debris to pass therethrough and inhibit the debris from the combination of fluid and debris from passing therethrough. Fluid passing through the plurality of holes may fall into the fluid bin.

In one aspect, the filter belt may be oriented in a non-horizontal manner such that fluid that fails to pass through the plurality of holes may flow down the filter belt toward and into the fluid bin.

In one aspect, the conveyor belt cleaning device may further include a pump. The fluid bin may be in fluid communication with the sprayer and the pump may be configured to pump the fluid contained within the fluid bin to the sprayer for reuse.

In one aspect, the filter belt may be wrapped around at least two rollers and may be configured to rotate about the rollers. The filter belt may include two ends. The conveyor belt cleaning device may further include a waste bin positioned at least partially below one of the two ends of the filter belt. Rotation of the filter belt may be configured to cause debris resting on top of the filter belt to fall from the one of the two ends of the filter belt and into the debris bin.

In one aspect, the conveyor belt cleaning device may further include an air knife configured to blow air at the filter belt to assist with removal of debris from the filter belt.

In one aspect, the brush may be a rotatable brush.

In one aspect, the brush may be a first brush configured to engage a first surface of the conveyor belt. The conveyor belt cleaning device may further include a second brush configured to engage a second surface of the conveyor belt with the second surface being different than the first surface.

In one aspect, the first brush may be positioned above the conveyor belt and the second brush may be positioned below the conveyor belt.

In one aspect, the brush may be a first brush configured to engage a surface of the conveyor belt. The conveyor belt cleaning device may further include a second brush configured to engage the surface of the conveyor belt.

In one aspect, the first and second brushes may both be positioned either above the conveyor belt or below the conveyor belt.

In one aspect, the brush may be one of a first plurality of brushes positioned above the conveyor belt and may be configured to engage a first surface of the conveyor belt. The conveyor belt cleaning device may further include a second plurality of brushes positioned below the conveyor belt and may be configured to engage a second surface of the conveyor belt. The first surface may be different than the second surface.

In one aspect, the first plurality of brushes and the second plurality of brushes may be moveable toward and away from the conveyor belt.

In one aspect, the first plurality of brushes and the second plurality of brushes may be linearly moveable toward and away from the conveyor belt.

In one aspect, the conveyor belt cleaning device may further include a lock associated with the brush. The lock may be moveable between an unlocked condition, in which the brush may be moveable toward and away from the conveyor belt, and a locked condition, in which the brush cannot move toward and away from the conveyor belt.

In one aspect, the brush and the sprayer may both be positioned either above or below the conveyor belt.

In one aspect, the sprayer may be one of a plurality of sprayers configured to spray fluid onto the conveyor belt.

In one aspect, the plurality of sprayers may all be positioned either above or below the conveyor belt.

In one aspect, the sprayer may be one of a first plurality of sprayers configured to spray fluid onto a first surface of the conveyor belt. The conveyor belt cleaning device may further include a second plurality of sprayers configured to spray fluid onto a second surface of the conveyor belt. The first surface may be different than the second surface.

In one aspect, the sprayer may be a nozzle.

In one aspect, the filter device may include a first pipe and a second pipe surrounding the first pipe. The first pipe may include a plurality of apertures therein, and the combination of fluid and debris may be configured to be pumped into the first pipe and the plurality of apertures may be configured to allow fluid to pass therethrough into the second pipe and may inhibit debris from passing therethrough. Debris from the combination of fluid and debris may be configured to be pumped from the first pipe via a debris outlet and the fluid from the combination of fluid and debris may be configured to be pumped from the second pipe via a fluid outlet.

In one aspect, the filter device may be one of a plurality of filter devices.

In one aspect, the plurality of filter devices may be coupled in series with one another.

In one aspect, a spiral cooking device may include a housing, a heating element positioned in the housing, a helical conveyor belt at least partially positioned in the housing, and a conveyor belt cleaning device. The conveyor belt cleaning device may be configured to clean the helical conveyor belt.

In one aspect, a cooking device is provided and includes a frame and a sprayer. The frame includes a plurality of coupled pipes for providing structural support to the cooking device. At least one of the plurality of pipes is hollow and is configured to have liquid pass therethrough. The sprayer is configured to receive the liquid from the at least one of the plurality of the pipes and configured to spray the fluid within the cooking device.

In one aspect, the cooking device may further include a base defining a drain and a basin therein. The basin may be sloped downward toward the drain.

In one aspect, the sprayer may be a nozzle.

In one aspect, the cooking device may further include a heating element configured to heat air. The heating element may be supported by the frame.

In one aspect, the cooking device may further include a heating element configured to heat air. The heating element may be supported by the at least one of the plurality of pipes.

In one aspect, the cooking device may further include a heating element configured to heat air. The heating element may be connected to the frame.

In one aspect, the cooking device may further include a heating element configured to heat air. The heating element may be connected to the at least one of the plurality of pipes.

In one aspect, the cooking device may further include a conveyor belt supported by the frame.

In one aspect, the cooking device may further include a conveyor belt supported by the at least one of the plurality of pipes.

In one aspect, the cooking device may further include a conveyor belt connected to the frame.

In one aspect, the cooking device may further include a conveyor belt connected to the at least one of the plurality of pipes.

In one aspect, a spiral cooking device is provided and includes a housing defining a cavity therein and a frame coupled to the housing and at least partially positioned within the cavity. The frame includes a plurality of pipes coupled together. At least one of the plurality of pipes is hollow and is configured to have liquid pass therethrough. The spiral cooking device also includes a pump in fluid communication with the at least one of the plurality of pipes to pump liquid through the at least one of the plurality of pipes, a heating element positioned within the cavity of the housing and supported by the frame, a helical conveyor belt at least partially positioned within the cavity of the housing and supported by the frame, and a sprayer in fluid communication with the pump and configured to receive the liquid from the at least one of the plurality of the pipes and configured to spray the fluid within the cavity of the housing.

In one aspect, a food processing system is provided and includes a first spiral cooking device and a second spiral cooking device. The first spiral cooking device includes a first housing defining a first cavity, a first heating element positioned in the first cavity, a first spiral conveyor belt at least partially positioned in the first cavity, a first inlet and a first outlet. The first spiral conveyor belt is configured to convey a food product through the first cavity from the first inlet to the first outlet. The second spiral cooking device includes a second housing defining a second cavity, a second heating element positioned in the second cavity, a second spiral conveyor belt at least partially positioned in the second cavity, a second inlet and a second outlet. The second spiral conveyor belt is configured to receive the food product at the second inlet and convey the food product through the second cavity from the second inlet to the second outlet. The first spiral cooking device and the second spiral cooking device are controlled independently of each other.

In one aspect, the first spiral cooking device and the second spiral cooking device are spaced-apart from one another.

In one aspect, the first housing and the second housing are spaced-apart from one another.

In one aspect, the first spiral cooking device may include a first chimney in fluid communication with the first cavity and the second spiral cooking device may include a second chimney in fluid communication with the second cavity.

In one aspect, the first housing may include a first base and a first hood moveable relative to the first base, and the second housing may include a second base and a second hood moveable relative to the second base. The first hood and the second hood may be moveable independent of each other.

In one aspect, the food processing system may further include a food product treatment device positioned between the first spiral cooking device and the second spiral cooking device. The food product treatment device may be configured to receive the food product from the first outlet, treat the food product, and deliver the food product to the second inlet.

In one aspect, a food processing system is provided and includes a first spiral cooking device including a first housing defining a first cavity, a first heating element positioned in the first cavity, a first inlet and a first outlet. The food processing system also includes a second spiral cooking device including a second housing defining a second cavity, a second heating element positioned in the second cavity, a second inlet and a second outlet. The food processing system further includes a conveyor belt at least partially positioned in the first cavity of the first spiral cooking device and at least partially positioned in the second cavity of the second spiral cooking device. The conveyor belt is configured to convey a food product through the first cavity from the first inlet to the first outlet and is configured to convey the food product through the second cavity from the second inlet to the second outlet. The conveyor belt has a first helical confirmation in the first cavity and a second helical configuration in the second cavity.

In one aspect, the first spiral cooking device and the second spiral cooking device may be controlled independently of each other.

In one aspect, the first spiral cooking device and the second spiral cooking device may be spaced-apart from one another.

In one aspect, the first housing and the second housing may be spaced-apart from one another.

In one aspect, the first spiral cooking device may include a first chimney in fluid communication with the first cavity and the second spiral cooking device may include a second chimney in fluid communication with the second cavity.

In one aspect, the first housing may include a first base and a first hood moveable relative to the first base, and the second housing may include a second base and a second hood moveable relative to the second base. The first hood and the second hood may be moveable independent of each other.

In one aspect, a cooking device is provided and includes a housing defining a cavity therein, a heating element positioned in the cavity of the housing, and a helical conveyor belt at least partially positioned in the cavity of the housing. The helical conveyor belt is selectively positioned in, one at a time, a first configuration, in which the helical conveyor belt has a first plurality of tiers, and a second configuration, in which the helical conveyor belt has a second plurality of tiers different than the first plurality of tiers.

In one aspect, the first configuration may further include a first spacing between the first plurality of tiers, and the second configuration may further include a second spacing between the second plurality of tiers. The first spacing may be different than the second spacing.

In one aspect, the cooking device may further include a conveyor belt drive member configured to engage and drive the helical conveyor belt with the helical conveyor belt in either the first configuration or the second configuration.

In one aspect, the conveyor belt drive member may engage an exterior of the helical conveyor belt.

In one aspect, the helical conveyor belt may include an interior edge and an exterior edge. The conveyor belt drive member may be configured to engage the exterior edge of the helical conveyor belt.

In one aspect, the helical conveyor belt may include an interior edge and an exterior edge. The interior edge defines an interior of the helical conveyor belt, and the conveyor belt drive member is not positioned in the interior of the helical conveyor belt.

In one aspect, the conveyor belt drive member may be selectively positioned in a first configuration to engage and drive the helical conveyor belt with the helical conveyor belt in the first configuration, and a second configuration to engage and drive the helical conveyor belt with the helical conveyor belt in the second configuration.

In one aspect, the conveyor belt drive member may include a spindle and a plurality of sprockets positioned along the spindle. The plurality of sprockets may be configured to engage the helical conveyor belt.

In one aspect, the conveyor belt drive member may include a spindle, and the spindle may be configured to include either a first plurality of sprockets positioned along the spindle to engage the first plurality of tiers of the helical conveyor belt, or a second plurality of sprockets positioned along the spindle to engage the second plurality of tiers of the helical conveyor belt. The second plurality of sprockets is different than the first plurality of sprockets.

In one aspect, a quantity of the first plurality of tiers is equal to a quantity of the first plurality of sprockets, and a quantity of the second plurality of tiers is equal to a quantity of the second plurality of sprockets.

In one aspect, with the helical conveyor belt in the first configuration, one of the first plurality of sprockets may engage each of the first plurality of tiers, and with the helical conveyor belt in the second configuration, one of the second plurality of sprockets may engage each of the second plurality of tiers.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

FIG. 10A is an elevational view of one example of a configuration of the conveyor belt and conveyor belt drive member shown in FIGS. 5-7, according to one aspect of the present disclosure.

FIG. 10B is an elevational view of another example of a configuration of the conveyor belt and conveyor belt drive member shown in FIGS. 5-7, according to one aspect of the present disclosure.

FIG. 20A is a top perspective view of a portion of the conveyor belt cleaning device shown in FIG. 20, according to one aspect of the present disclosure.

FIG. 28A is an elevational cross-sectional view of the spiral cooking device shown in FIG. 2 with examples of engagement members illustrated in FIG. 28 emphasized, according to one aspect of the present disclosure.

DETAILED DESCRIPTION

Figure 1:
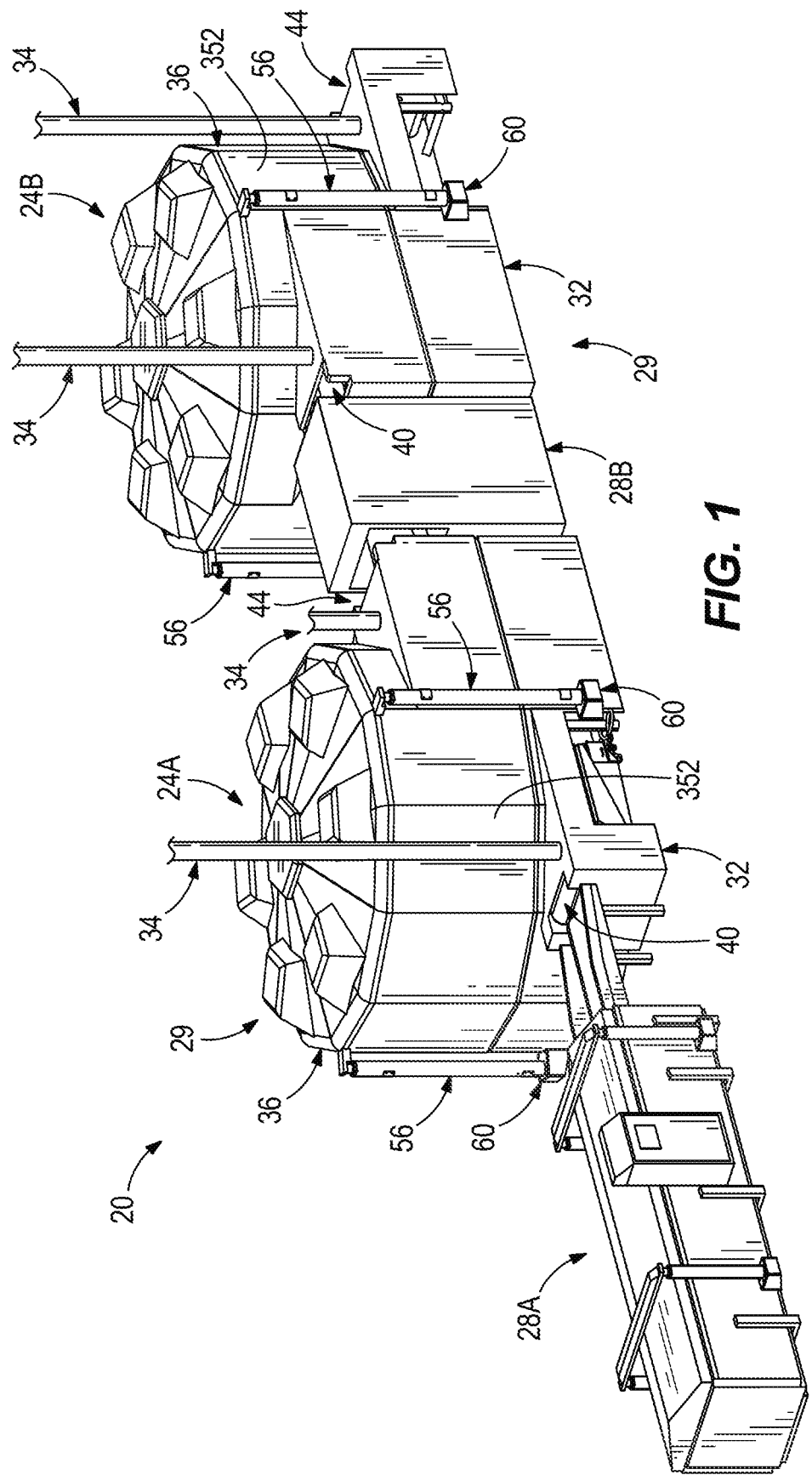
FIG. 1 is a top, front perspective view of one example of a cooking assembly including one example of a pair of spiral cooking devices and examples of other devices used in a cooking operation, according to one aspect of the present disclosure.

Referring to FIG. 1, one example of a cooking assembly 20 is illustrated. In this example, the cooking assembly 20 includes a plurality of spiral cooking devices 24 and other food product treatment devices 28. The cooking assembly 20 is capable of including any number of spiral cooking devices 24 (including one) and any number of other food product treatment devices 28 (including zero). In the illustrated example, the spiral cooking devices 24 are configured to cook food product to a desired extent. The cooking assembly 20 is capable of including any number of other food product treatment devices 28 capable of treating the food product in a wide variety of manners. For example, a first food product treatment device 28A may be a fryer, and may be positioned upstream of the spiral cooking devices 24 and may be configured to fry food product. Also, for example, the second food product treatment device 28B may be a liquid smoke device positioned between the spiral cooking devices 24 and may be configured to brown, color and/or flavor the food product. In other examples, the cooking assembly 20 is capable of including other food product treatment devices 28 such as, for example, forming machines, breaders, coaters, dusters, boiling device, impingement ovens, freezers, etc.

In the illustrated example, the spiral cooking devices 24 are similar in structure, but are configured to operate independently of each other. The first spiral cooking device 24A is oriented in a first position and includes a housing 29. In the illustrated example, the housing 29 includes a base 32 and a hood 36. The spiral cooking device 24A also includes an inlet 40, in which food product enters the first spiral cooking device 24A after being transported downstream from the first food product treatment device 28A, and an outlet 44, in which food product exits the first spiral cooking device 24A and transports downstream toward the second food product treatment device 28B. The first spiral cooking device 24A includes a helical or spiral conveyor belt 48 that rotates in a first direction, takes food product at a first or lower level from the inlet 40, transports the food product through the first spiral cooking device 24A in an upward direction, then transports the food out of the first spiral cooking device 24A via the outlet 44 at a second or higher level (higher than the first level).

In some examples, it may be desirable to have the outlet 44 of the first spiral cooking device 24A at the same or similar level as the inlet 40 of a subsequent spiral cooking device. The illustrated example is one of such examples. In the illustrated example, the second spiral cooking device 24B is oriented in a second position, in which the inlet 40 and outlet 44 are switched from the configurations associated with the first spiral cooking device 24A in the first position. In other words, the second spiral cooking device 24B is rotated or positioned about 180 degrees relative to the position of the first spiral cooking device 24A. In this second position, the second spiral cooking device 24B includes a housing 29. In the illustrated example, the housing 29 includes a base 32 and a hood 36. The spiral cooking device 24B also includes an inlet 40 at the second or higher level and an outlet 44 at the first or lower level. The second spiral cooking device 24B includes a spiral conveyor belt 48 similar to the spiral conveyor belt 48 included in the first spiral cooking device 24A, except the spiral conveyor belt 48 of the second spiral cooking device 24B rotates in a second direction opposite the first direction. By rotating in this second direction, the second spiral conveyor belt 48 takes food product at the second or higher level from the inlet 40, transports the food product through the second spiral cooking device 24B in a downward direction, then transports the food product out of the second spiral cooking device 24B via the outlet 44 at a first or lower level. In other examples, the plurality of spiral cooking devices 24 may have different configurations such as, for example, their configurations may be reversed such that the first spiral cooking device 24A in the cooking assembly 20 has its inlet 40 at the higher level, the plurality of spiral cooking devices 24 may be oriented in the same position (in which case, intermediate food product treatment device(s) may be positioned between the plurality of spiral cooking devices to accommodate the difference in height between the outlet and inlet of the spiral cooking devices, or any other possible configurations).

Figure 38:
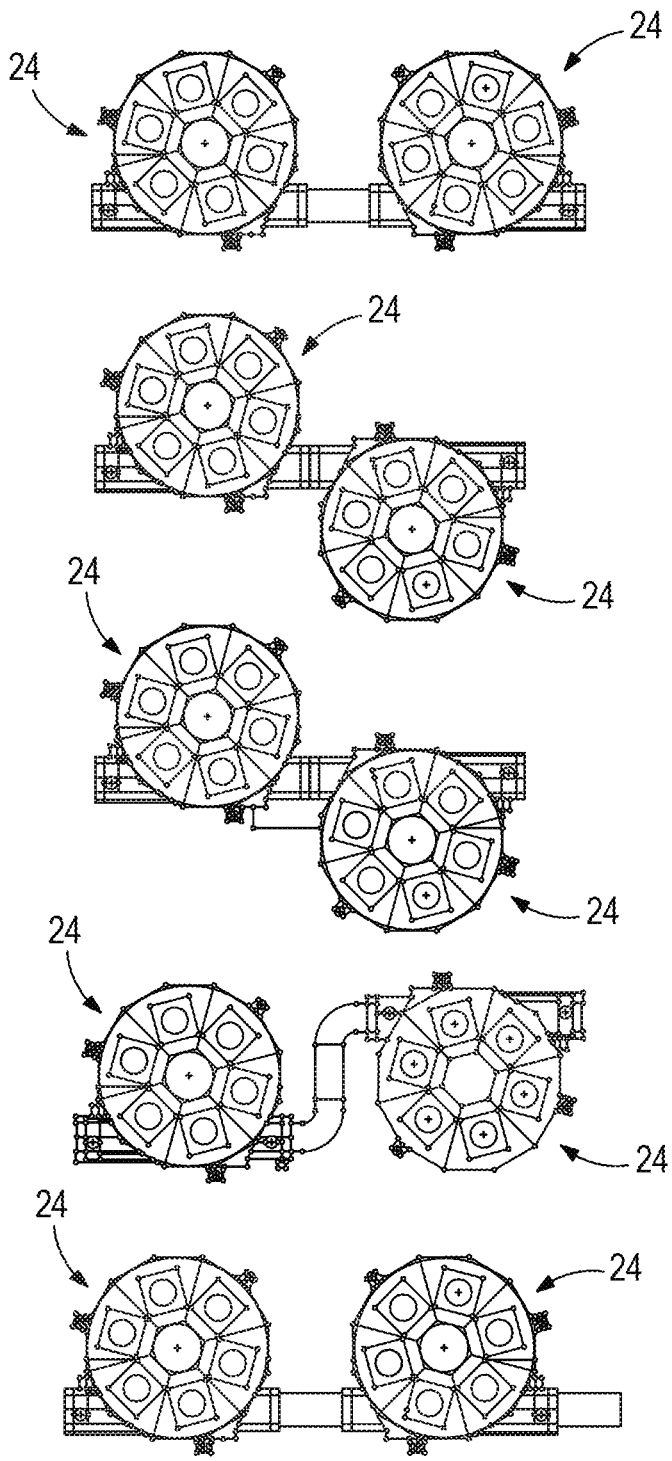
FIG. 38 is a schematic representation of a plurality of exemplary configurations of multiple spiral cooking devices in exemplary cooking assemblies, according to one aspect of the present disclosure.

It should be understood that multiple spiral cooking devices 24 may be used together and such spiral cooking devices 24 may have a variety of configurations relative to each with all possibilities intended to be within the spirit and scope of the present disclosure. For example, with reference to FIG. 38, a plurality of schematic representations of alternative examples of spiral cooking device orientations are shown. Also, it should be understood that any number of spiral cooking devices 24 may be used in the cooking assembly 20 in any configuration relative to each other and all of such possibilities are intended to be within the spirit and scope of the present disclosure.

Figure 44:
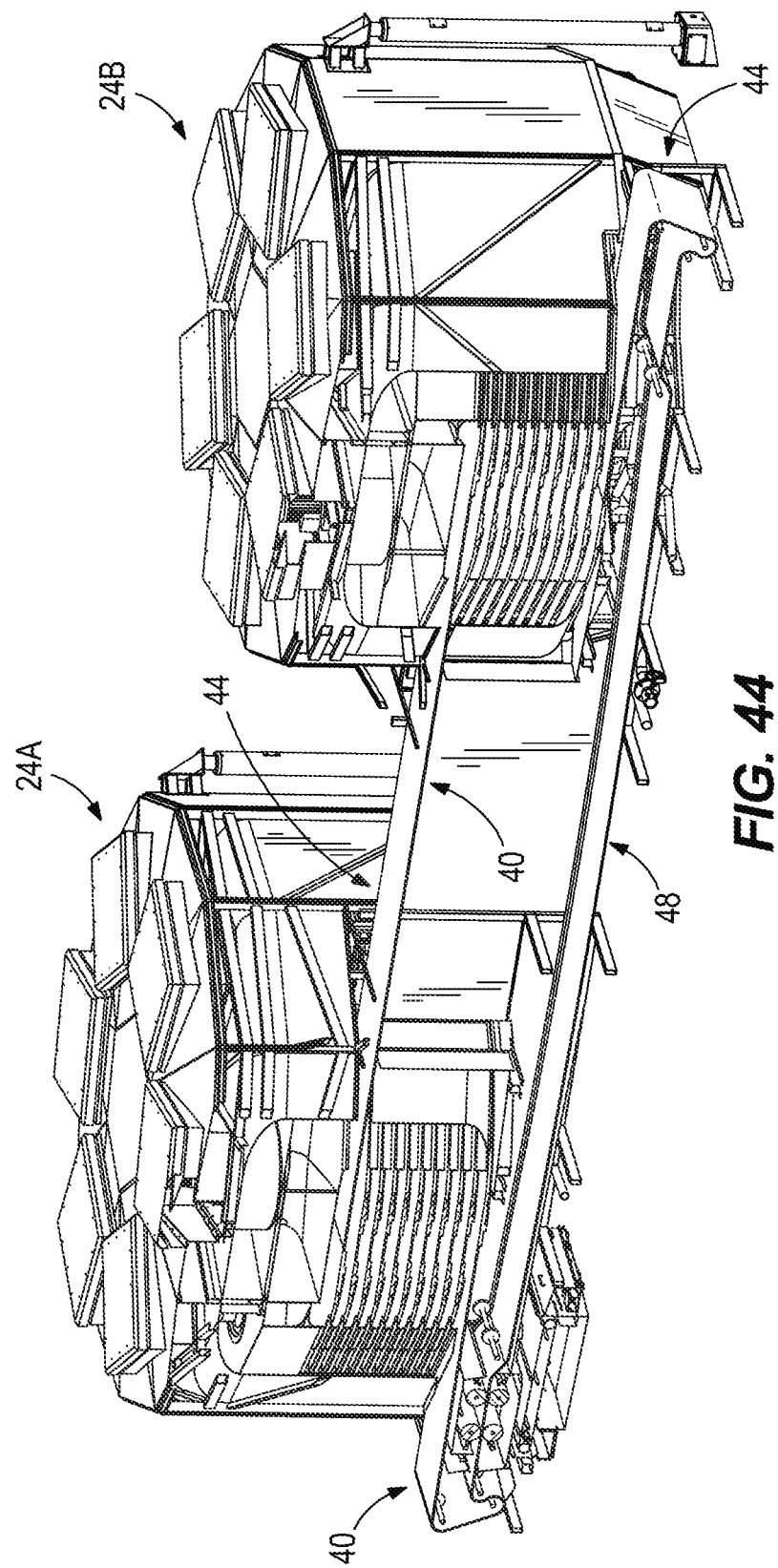
FIG. 44 is a top, front perspective view of another example of a cooking assembly including one example of a single, spiral conveyor belt used with a pair of spiral cooking devices, according to one aspect of the present disclosure.
Figure 45:
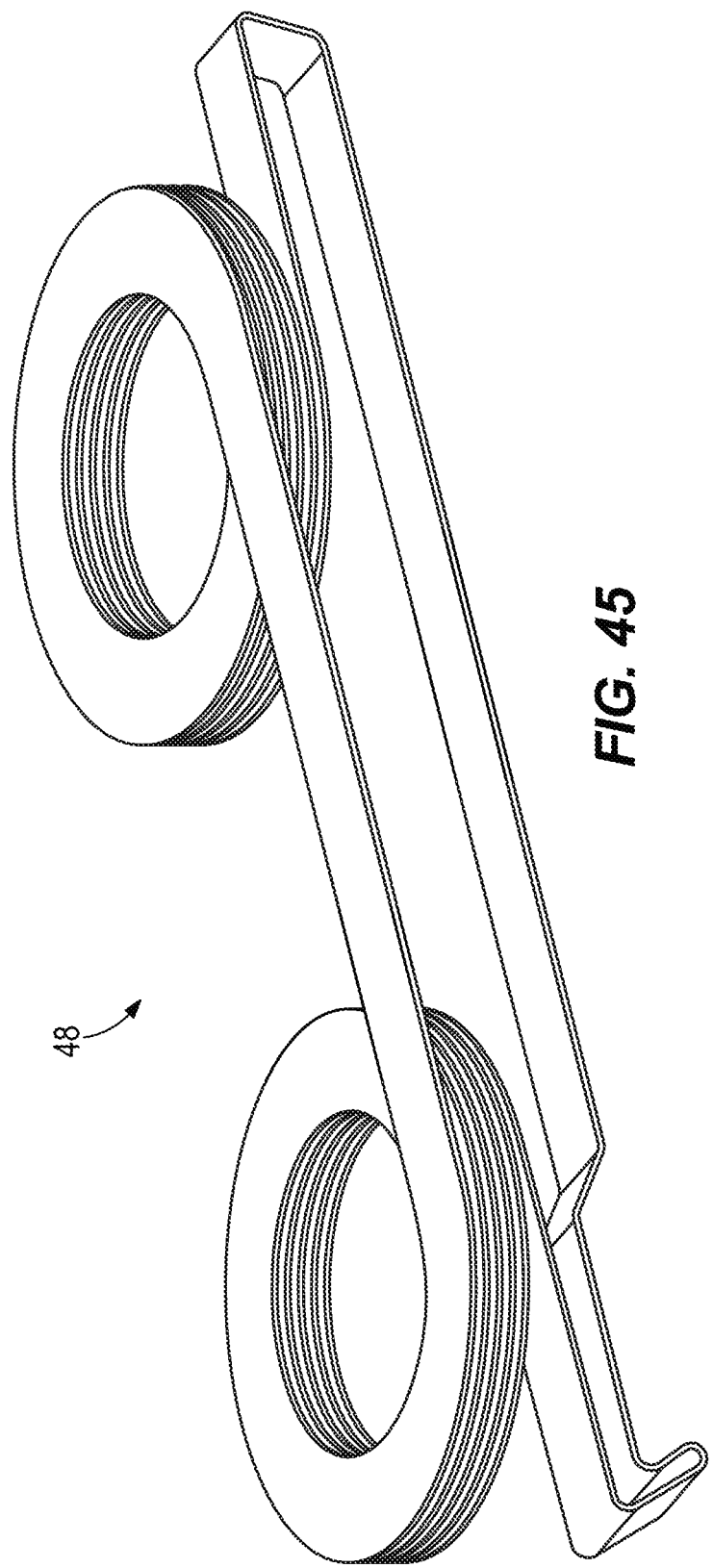
FIG. 45 is a top, rear perspective view of the spiral conveyor belt shown in FIG. 44, according to one aspect of the present disclosure.

In one example, with respect to FIGS. 44 and 45, a plurality of spiral cooking devices 24 used in a cooking assembly may share a single, spiral conveyor belt 48 that traverses the inlet 40 of a first spiral cooking device 24A, the outlet of the first spiral cooking device 24A, the inlet 40 of a second spiral cooking device 24B, the outlet 44 of the second spiral cooking device 24B, then returns to the first spiral cooking device 24A. The single, spiral conveyor belt 48 is capable of moving or conveying food product through both the first spiral cooking device 24A and the second spiral cooking device 24B. In examples where a single, spiral conveyor belt 48 is used with more than two spiral cooking devices, the single, spiral conveyor belt 48 is capable of moving food product through all of the spiral cooking devices. Any number of spiral cooking devices may share a single spiral conveyor belt and all of such possibilities are intended to be within the spirit and scope of the present disclosure.

With continued reference to FIG. 1, each of the plurality of spiral cooking devices 24 may be operated independently of each other. Various cooking characteristics are controllable during cooking operations of the spiral cooking devices 24. Such cooking characteristics and their controllability will be described in more detail below. Even though the spiral cooking devices 24 may be controlled independently from one another, the spiral cooking devices 24 may be controlled similarly to cook food product in a similar manner or they may be controlled differently to cook food product in different manners.

As indicated above, the plurality of spiral cooking devices 24 are configured to have similar structure. Accordingly, only one of the spiral cooking devices 24 will be described hereinafter with it being understood that the cooking assembly 20 is capable of having any number of spiral cooking devices 24 and the following description and associated figures applying to any and all possible spiral cooking devices 24.

Figure 2:
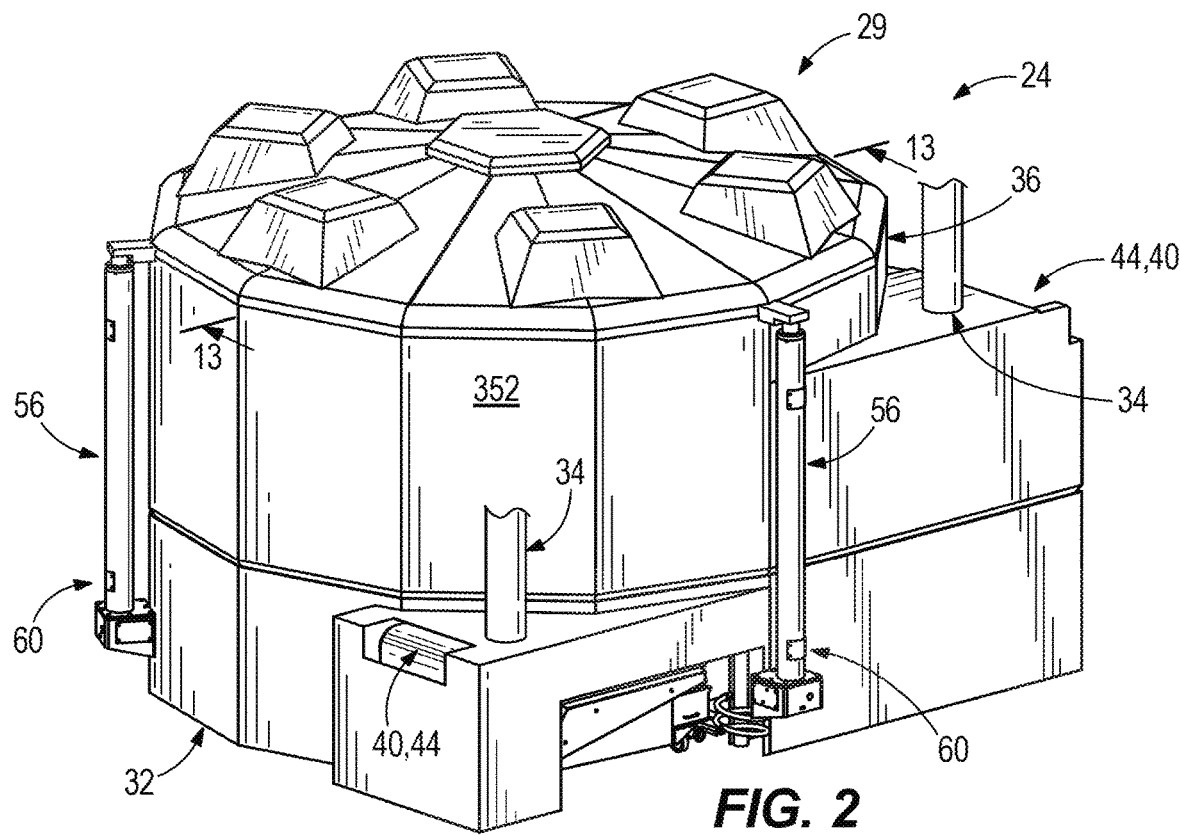
FIG. 2 is top, front perspective view of one of the exemplary spiral cooking devices shown in FIG. 1, according to one aspect of the present disclosure.
Figure 3:
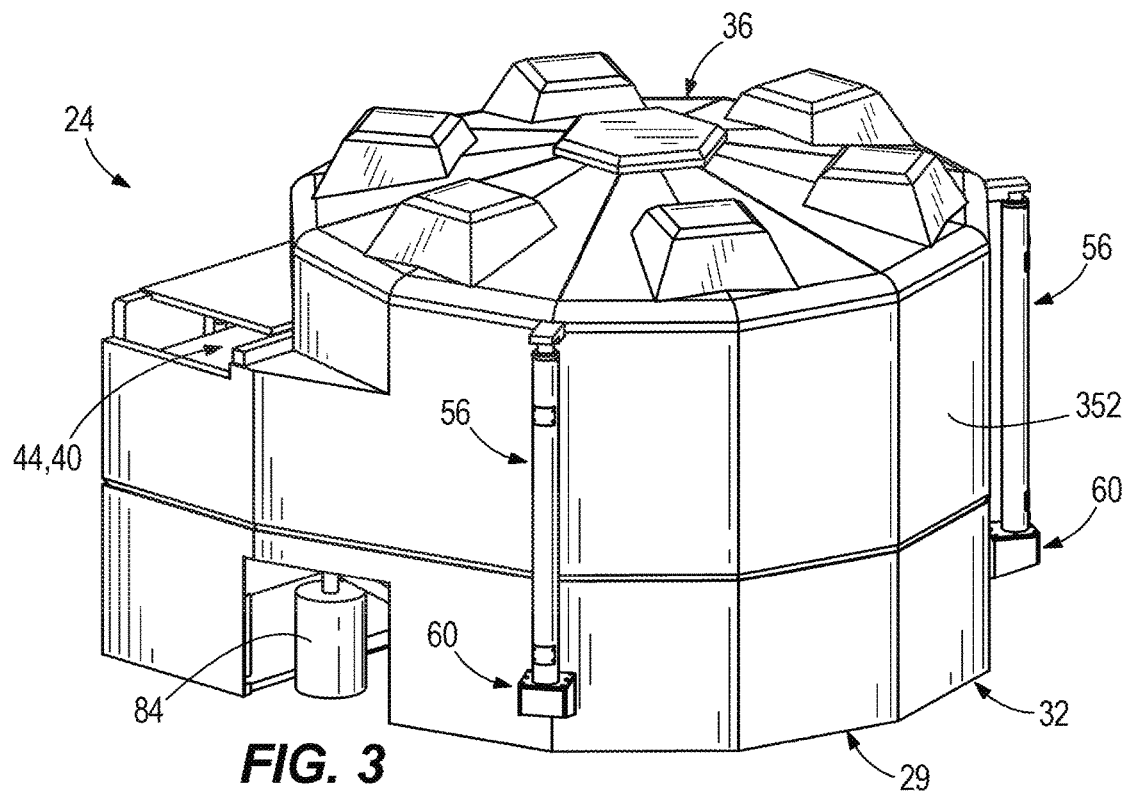
FIG. 3 is a top, rear perspective view of the spiral cooking device shown in FIG. 2, according to one aspect of the present disclosure.

Referring to FIGS. 2 and 3, one exemplary spiral cooking device 24 is illustrated. The spiral cooking device 24 is configured to cook a wide variety of food products passing therethrough in a variety of desired manners. For example, food products that may be cooked by the spiral cooking device 24 may include, but are not limited to, beef, chicken, pork, seafood, or any other comestible material, and may include a wide variety of forms including, but not limited to, patties, chicken legs, chicken wings, meatballs, filets, chunks, or any other form. In one example, the food product is of the type and form to be able to withstand the motion through the spiral cooking device 24.

The spiral cooking device 24 includes heating elements 52 (see, e.g., FIG. 13) and such heating elements 52 may be powered or fueled in a variety of manners. In one example, the fuel may be thermal oil. It should be understood that the spiral cooking device 24 may operate with a wide variety of fuels or other heat sources and all of such possibilities are intended to be within the spirit and scope of the present disclosure. In other examples, the spiral cooking device 24 may include electric heating elements, which would be powered by electricity.

With continued reference to FIGS. 2 and 3, the spiral cooking device 24 includes interchangeable inlets 40 and outlets 44 depending on the position of the spiral cooking device 24 in the cooking assembly 20 and the direction of rotation of the conveyor belt 48 (described in more detail below). For purposes of the following description, the inlet 40 will be associated with the first or lower level and the outlet 44 will be associated with the second or higher level, with it being understood that the inlet 40 and outlet 44 may be reversed.

In the illustrated example, the spiral cooking device 24 includes a housing 29 comprised of a base 32 and a cover or hood 36. In the illustrated example, the hood 36 is moveable relative to the base 32. In other examples, the hood 36 may be rigidly coupled to and non-moveable relative to the base 32. In the illustrated example, the spiral cooking device 24 also includes a pair of chimneys 34 and a plurality of lifting mechanisms 56. The chimneys 34 may be capable of exhausting smoke, heat, air, etc., from the interior of the spiral cooking device 24. The lifting mechanisms 56 are configured to selectively move the hood 36 relative to the base 32. In the illustrated example, spiral cooking device 24 includes three lifting mechanisms 56. In other examples, the spiral cooking device 24 may include any number of lifting mechanisms 56 (including zero, one or more than three) and all of such possibilities are intended to be within the spirit and scope of the present disclosure. In an example where one lifting mechanism 56 is utilized, the single lifting mechanism 56 may be centrally located in the spiral cooking device 24 and hood 36, and one or more guide members may be located near an exterior wall of the hood 36 and exterior wall of the substructure 150 to assist with guiding the hood 36 between raised and lowered positions.

In one example, the lifting mechanisms 56 are each powered or driven in sync to operate together in moving the hood 36 relative to the base 32. In another example, the lifting mechanisms 56 may be mechanically coupled to ensure proper alignment and synchronized lifting of the hood 36. The lifting mechanisms 56 may be driven in a wide variety of manners. In one example, each lifting mechanism 56 is driven by its own motor or drive member. In another example, the lifting mechanisms 56 are all powered or driven by the same motor or drive member. In other examples, the lifting mechanisms 56 may be driven in any one or more of a variety of manners including, but not limited to, screw drive, hydraulically, pneumatically, etc.

Figure 4:
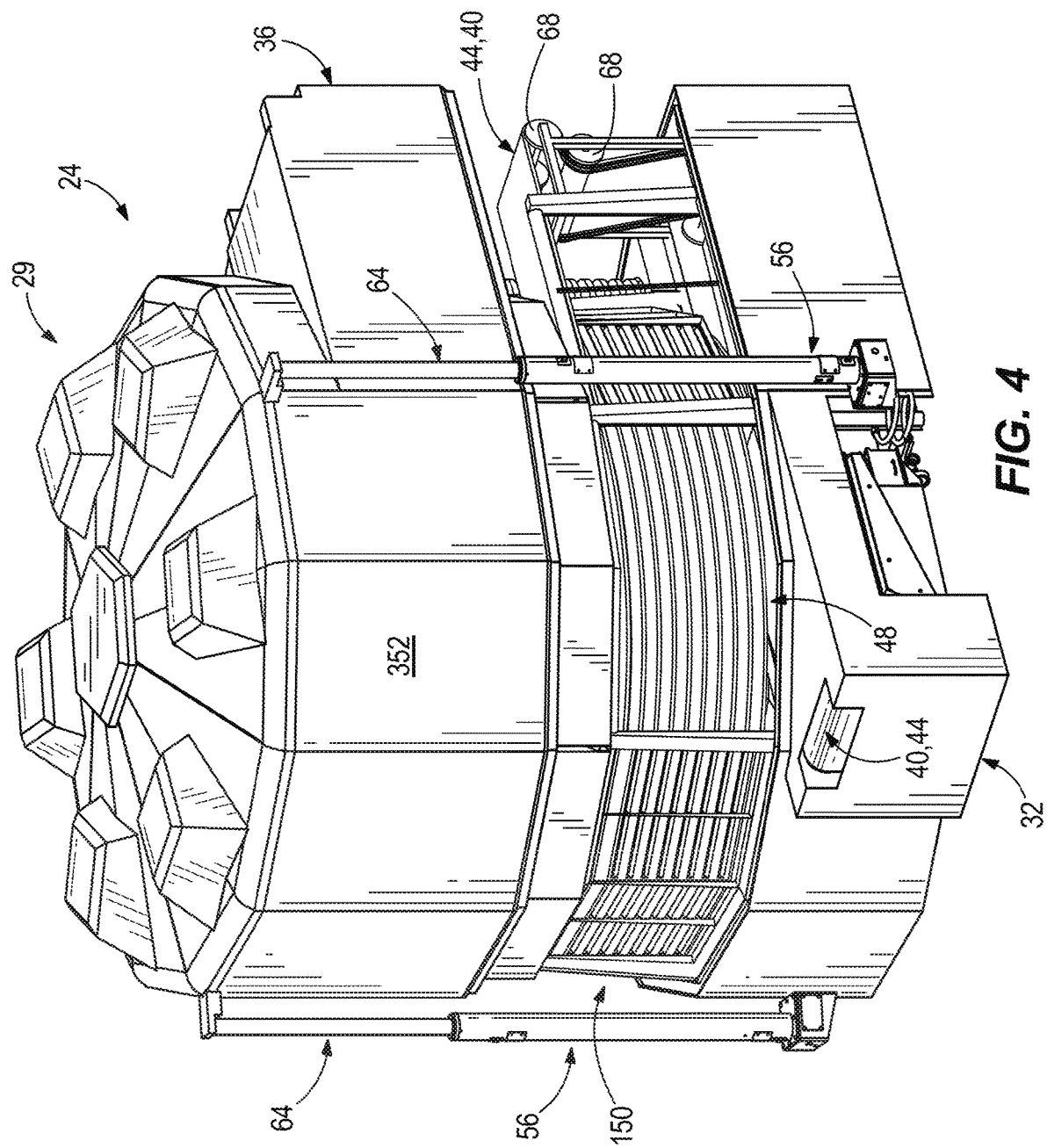
FIG. 4 is a top, front perspective view of the spiral cooking device shown in FIG. 2 with one example of a hood or cover of the spiral cooking device in a raised position, according to one aspect of the present disclosure.
Figure 5:
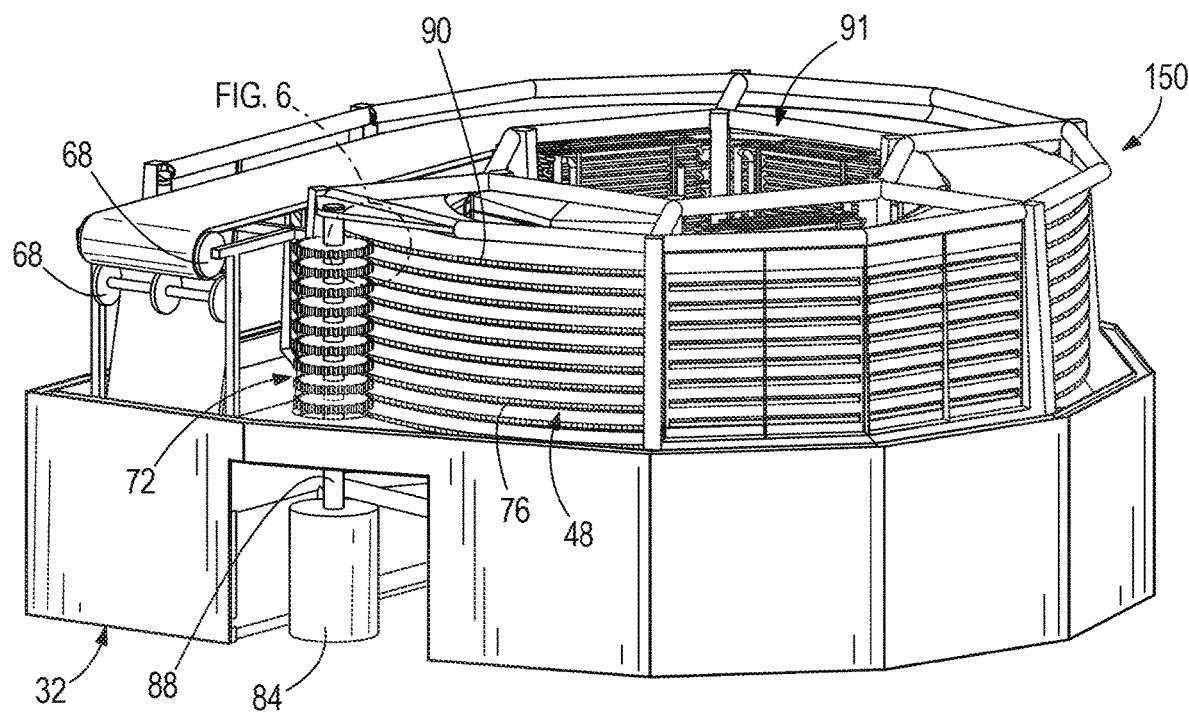
FIG. 5 is a top, rear perspective view of a portion of the spiral cooking device shown in FIG. 2 with the hood and heating elements removed to illustrate other components of the spiral cooking device, according to one aspect of the present disclosure.
Figure 6:
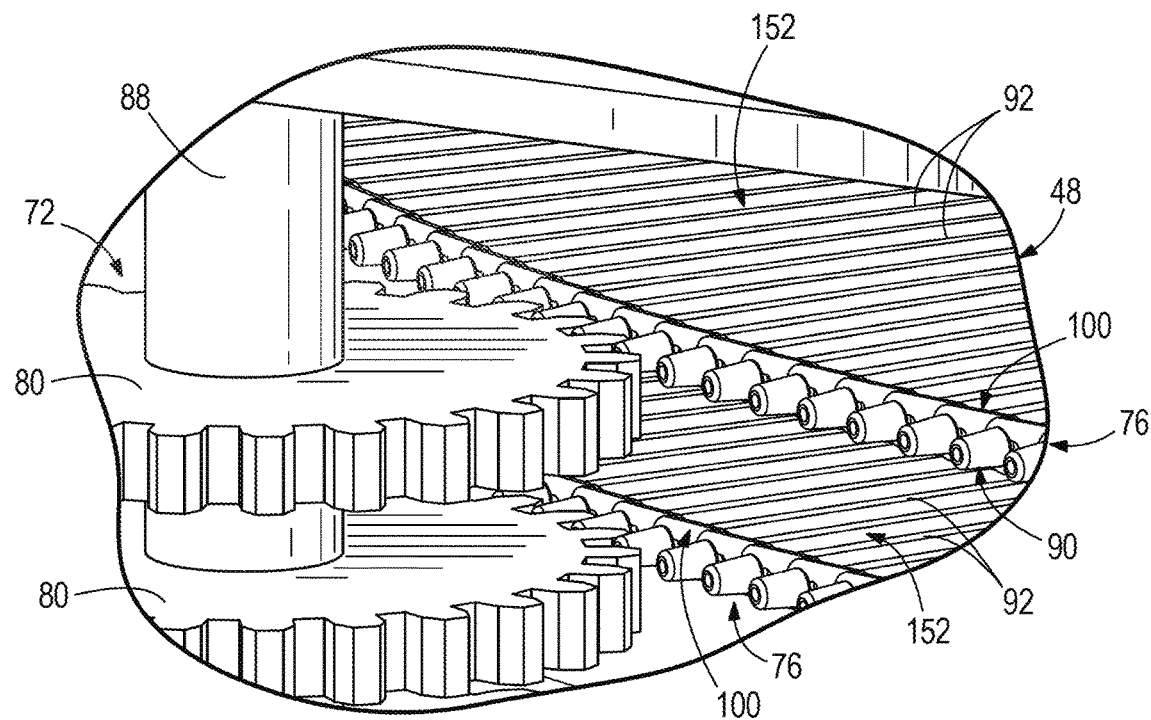
FIG. 6 is top perspective view of a portion of the spiral cooking device shown in FIG. 2 including one example of a conveyor belt and one example of a conveyor belt drive member, according to one aspect of the present disclosure.
Figure 7:
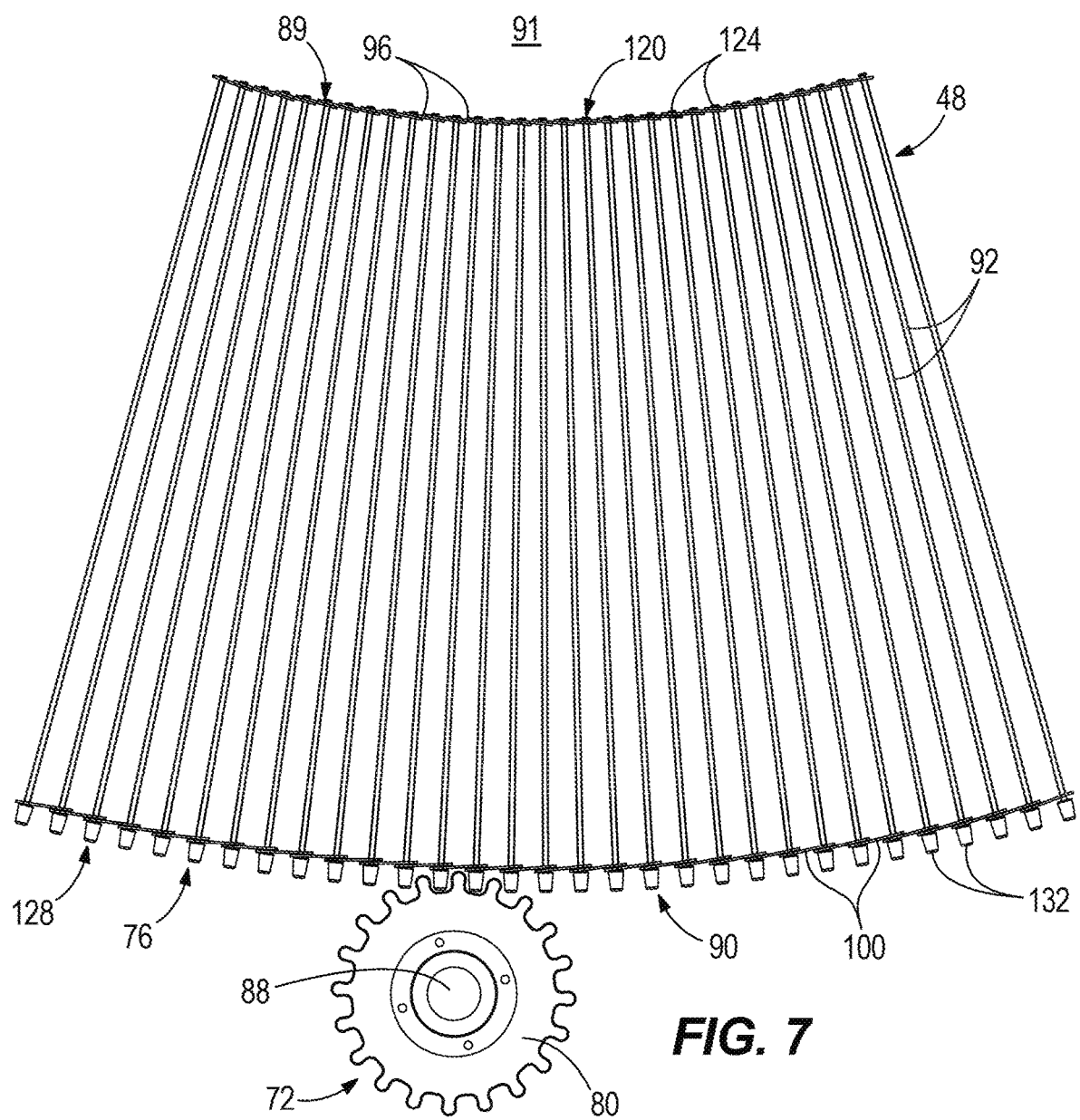
FIG. 7 is a top view of a portion of the exemplary conveyor belt and a portion of the exemplary conveyor belt drive member shown in FIG. 6, according to one aspect of the present disclosure.

The lifting mechanisms 56 may move the hood 36 between a downward, sealed or operating position (see FIGS. 2 and 3) and an upward, removed, unsealed or non-operating position (see FIG. 4). The lifting mechanisms 56 are configured to be controlled to move the hood 36 to any intermediate position between the downward and upward positions. In the illustrated example, the use of three lifting mechanisms 56 may be a preferred number of lifting mechanisms 56 due to their ability to equally distribute the weight of the hood 36 and equally apply lifting forces to the hood 36 in the equilateral triangular configuration of the lifting mechanisms 56. In the illustrated example, the hood 36 is generally cylindrical in shape and a hood of this shape can be adequately lifted with only three lifting mechanisms 56. In one example, the lifting mechanisms 56 are equally distributed or spaced around a perimeter of the hood 36. In other examples, the lifting mechanisms 56 may be distributed or spaced around the perimeter of the hood 36 in any manner and in any orientation relative to each other. Lifting or elevating the hood 36 relative to the remainder of the spiral cooking device 24 facilitates manual cleaning of the spiral cooking device 24 along with providing easy access to the components of the spiral cooking device 24 for repairing and/or replacing the components of the spiral cooking device 24.

In the illustrated example, each lifting mechanism 56 includes a stationary portion 60 coupled to the base 32 and a moveable portion 64 coupled to the hood 36. The moveable portion 64 is positioned in and translates relative to the stationary portion 60.

In another example, the spiral cooking device may include a housing enclosing internal components of the spiral cooking device and one or more doors or access panels included in the housing to provide access to an interior of the housing. The spiral cooking device with a housing and doors would replace the moveable hood. The one or more doors or access panels would be movable to allow access to the internal components of the spiral cooking device. In one example, the one or more doors would be coupled to the housing with one or more hinges or other components allowing pivoting or rotating of the one or more doors relative to the remainder of the housing. In another example, the one or more doors may be removed from the remainder of the housing. In a further example, the doors may be pivotal/rotatable relative to and removable from the remainder of the housing.

With reference to FIGS. 4-9, the spiral cooking device 24 includes a spiral transport device or spiral conveyor belt 48 configured to transport food product through the spiral cooking device 24. The spiral conveyor belt 48 is comprised of appropriate structure and material for food handling applications. The spiral conveyor belt 48 is capable of having a variety of configurations and all of such possibilities are intended to be within the spirit and scope of the present disclosure. The illustrated example is provided to demonstrate at least some of the principles of the present disclosure and is not intended to be limiting upon the present disclosure.

In the illustrated example, the spiral conveyor belt 48 wraps around various pulleys or rollers 68 disposed throughout the spiral cooking device 24. In some examples, these rollers 68 are passive rollers. In other examples, one or more of the rollers 68 are drive rollers to assist with driving the spiral conveyor belt 48. In the illustrated example, the spiral cooking device 24 includes a belt tensioning device 70 capable of moving at least one of the rollers 68A toward and away from the conveyor belt 48 to selectively apply more or less tension to the conveyor belt 48. The belt tensioning device 70 may be actuated in a variety of manners including, but not limited to, pneumatically, hydraulically, screw drive, motorized, among others.

The spiral cooking device 24 also includes a conveyor drive member 72 for driving the spiral conveyor belt 48. The conveyor drive member 72 is configured to rotate in either direction in order to rotate or move the spiral conveyor belt 48 in either direction. For example, the conveyor drive member 72 may rotate in a first direction to rotate the spiral conveyor belt 48 in the first direction, which results in the inlet 40 of the spiral cooking device 24 being oriented at the lower level and the outlet 44 oriented at the higher lever. Also, for example, the conveyor drive member 72 may rotate in a second direction to rotate the spiral conveyor belt 48 in the second direction, which results in the inlet 40 of the spiral cooking device 24 being oriented at the higher level and the outlet 44 being oriented at the lower level.

In the illustrated example, the spiral cooking device 24 includes a single conveyor drive member 72. In other examples, the spiral cooking device 24 may include any number of conveyor drive members 72 and all of such possibilities are intended to be within the spirit and scope of the present disclosure.

Returning to the illustrated example, the conveyor drive member 72 is positioned externally of the spiral conveyor belt 48 (i.e., between the conveyor belt 48 and interior surface 77 (see, e.g., FIGS. 13, 14, 16, 27) of the hood 36) and is configured to engage an exterior 76 of the spiral conveyor belt 48 in order to drive the spiral conveyor belt 48. The conveyor drive member 72 includes a plurality of sprockets or gears 80 engaging the exterior 76 of the spiral conveyor belt 48. The spiral conveyor belt 48 traverses around the spiral cooking device 24 a number of times, thereby providing a plurality of cooking levels, layers or tiers of the spiral conveyor belt 48. In the illustrated example, the conveyor drive member 72 includes a sprocket 80 for each tier of the spiral conveyor belt 48 such that the conveyer drive member 72 engages every tier of the spiral conveyor belt 48 near the conveyor drive member 72. In another example, the conveyor drive member 72 may include less sprockets 80 than the number of tiers of the spiral conveyor belt 48. In such an example, less than all the tiers of the spiral conveyor belt 48 will be engaged by the conveyor drive member 72. In one example, the conveyor drive member 72 includes a sufficient number of sprockets 80 to engage every other tier of the spiral conveyor belt 48. It should be understood that the conveyor drive member 72 is capable of including any number of sprockets 80 and is capable of engaging any number of tiers of the spiral conveyor belt 48 and all of such possibilities are intended to be within the spirit and scope of the present disclosure. A motor or drive source 84 may be coupled to the drive member 72 at a bottom thereof. The drive member 72 may include a drive spindle 88 positioned to an exterior of the conveyor belt 48 coupled to and driven by the drive source 84. The plurality of sprockets 80 coupled to the drive spindle 88 engage the exterior 76 of the various tiers of the conveyor belt 48. The drive source 84 is capable of rotating the spiral conveyor belt 48 at a variety of different speeds and may be controlled electronically via a control member and/or computer system.

In another example, with respect to Fig. the drive member 72 may include two spindles 88 and a plurality of sprockets 80 coupled to each of the two spindles 88. Both spindles 88 are positioned to an exterior of the spiral conveyor belt 48 and the two sets of sprockets 80 would engage the exterior 76 of the spiral conveyor belt 48. In this example, one motor or drive source 84 may be coupled to both drive spindles 88, via a respective gear box 87, to drive the spindles 88 or a plurality of motors or drive sources may be coupled to the spindles 88 to drive the spindles 88.

The conveyor belt 48 may have a variety of different configurations or orientations within the spiral cooking device 24. The conveyor belt 48 may be configured within the spiral cooking device 24 to have different spacing between tiers of the conveyor belt 48. Various spacing between the conveyor belt tiers may be done for a variety of reasons including, but not limited to, accommodating various food products having different heights, accommodating different desired cooking times or exposure times to heat within the spiral cooking device 24, maintaining as low or as small of a tier spacing as possible to maintain a high air speed through the cooking locations 152 above and between the various tiers of the spiral conveyor belt 48, or a variety of other reasons.

Figure 41:
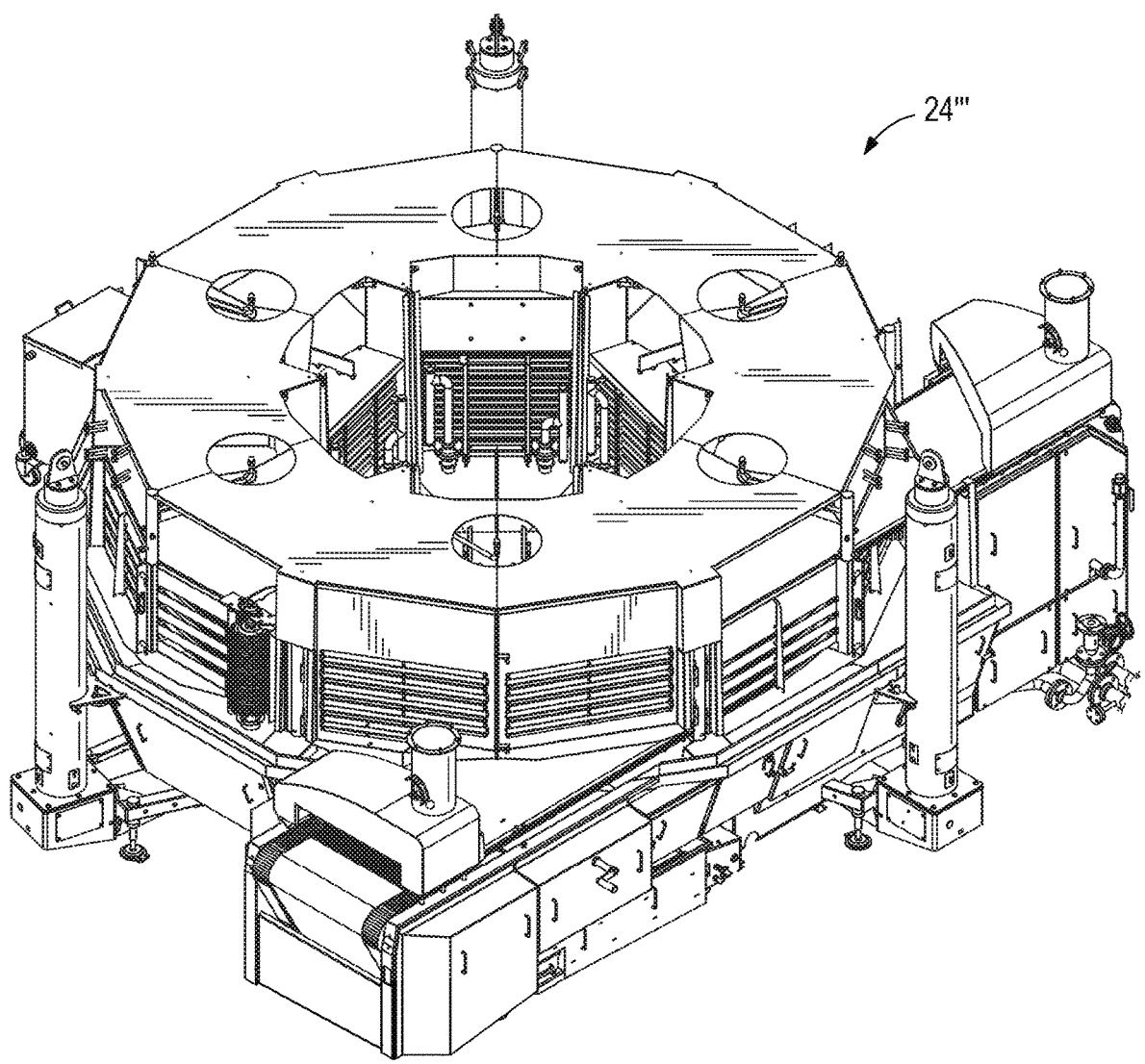
FIG. 41 is a top, front perspective view of another example of a spiral cooking device with a hood removed to illustrate structure underneath the hood, according to one aspect of the present disclosure.
Figure 42:
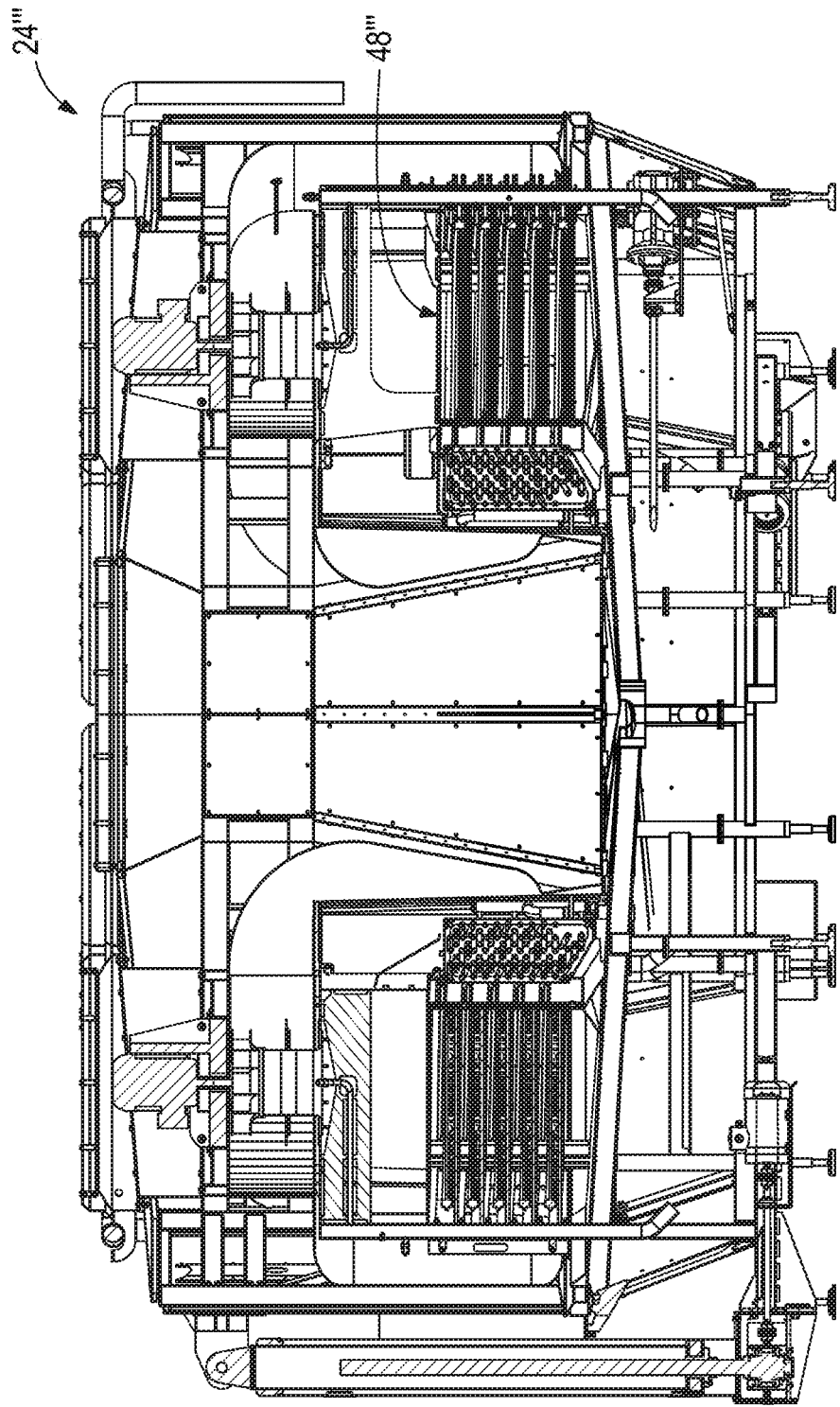
FIG. 42 is a cross-sectional view of the spiral cooking device shown in FIG. 41, according to one aspect of the present disclosure.
Figure 43:
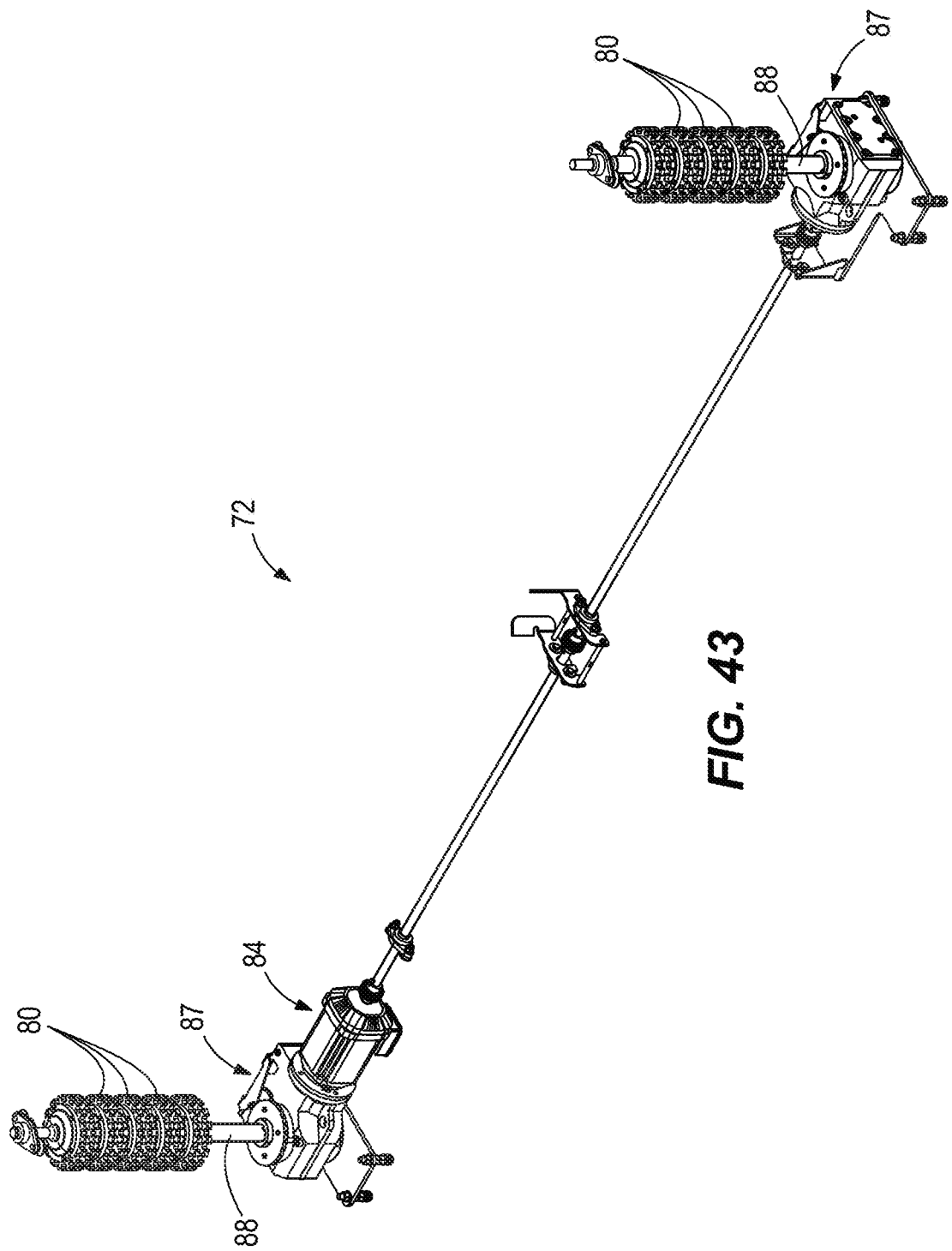
FIG. 43 is a top perspective view of another example of a conveyor belt drive member, according to one aspect of the present disclosure.

With reference to FIGS. 10A and 10B, two examples of conveyor belt configurations are illustrated. These exemplary configurations are not intended to be limiting upon the present disclosure. Rather, they are provided to demonstrate at least some of the principles of the present disclosure. With particular reference to FIG. 10A, the conveyor belt 48 is shown in a first configuration with a first spacing H1 between all tiers of the conveyor belt 48. To accommodate this first spacing H1 between tiers of the conveyor belt 48, the conveyor drive member 72 includes sprockets 80 that are equally spaced to the spacing H1 between tiers such that the sprockets 80 engage the exterior 76 of the conveyor belt 48. Since the conveyor belt 48 is a spiral conveyor belt 48 oriented in a spiral or helical orientation and must convey food product upwards or downwards depending on the direction of rotation of the conveyor belt 48, the conveyor belt 48 has a pitch or angle at which the conveyor belt 48 angles up or inclines to the next tier (or angles downward). In the example illustrated in FIG. 10A, the angle is represented by a θ and may be any angle. As indicated above, the spiral conveyor belt 48 may have any spacing between tiers and any number of tiers. Accordingly, the angle θ may be any angle to accomplish this variability. For comparison, reference is made to FIG. 10B wherein a second spacing H2 between all tiers of the conveyor belt 48 is larger than the first spacing H1 of the tiers shown in FIG. 10A. To facilitate this difference in spacing between conveyor belt tiers in the illustrated example, the pitch or incline of the conveyor belt 48 is greater than the pitch or incline of the conveyor belt 48 shown in FIG. 10A. In the example illustrated in FIG. 10B, the pitch or incline is represented by angle α and is greater than the angle θ associated with FIG. 10A. Similar to FIG. 10A, the drive member 72 illustrated in FIG. 10B includes a complementary number of sprockets 80 to engage the exterior 76 of the various tiers of the spiral conveyor belt 48. Since the spacing H2 is greater between tiers of the conveyor belt 48, the conveyor belt 48 in FIG. 10B has less conveyor belt tiers and the drive member 72 includes fewer sprockets 80. In the illustrated examples shown in FIGS. 10A and 10B, an equal spacing or distance is provided between all the tiers of the conveyor belts. It should be understood that the conveyor belt may have different spacings between tiers of the conveyor belt and any number of different spacings may occur between the tiers, and all of such possibilities are intended to be within the spirit and scope of the present disclosure. It should also be understood that the spiral cooking device 24 may have any number of tiers and all of such possibilities are intended to be within the spirit and scope of the present disclosure. For example, the illustrated example of the spiral cooking device in the majority of the figures (e.g., FIGS. 5, 10, 13, etc.) includes ten tiers formed by the spiral conveyor belt 48, FIG. 10B illustrates a spiral cooking device 24" including six tiers formed by the spiral conveyor belt 48", and FIGS. 41 and 42 illustrate a spiral cooking device 24''' including five tiers formed by the spiral conveyor belt 48'''. These illustrated examples are merely provided to demonstrate at least some of the principles of the present disclosure and are not intended to be limiting upon the present disclosure.

With reference to FIGS. 5-7, 11 and 13-17, the spiral cooking device 24 of the present disclosure eliminates the existence of a drive member (otherwise known as a drive drum) in the interior 91 of the spiral conveyor belt 48 by driving the spiral conveyor belt 48 on an exterior of the spiral conveyor belt 48. By eliminating obstructions in the interior 91 of the spiral conveyor belt 48, air and heat distribution is not interrupted, blocked, diverted or otherwise interfered with in the interior 91 of the spiral conveyor belt 48. Furthermore, lack of a drive drum in the interior 91 of spiral conveyor belt 48 allows positioning of other components of the spiral oven in the interior 91 such as, for example, components associated with cooking the food product. These features provide more even and consistent air and heat distribution within the spiral cooking device 24. In one example, the spiral conveyor belt 48 includes an interior edge 89 and an exterior edge 90. The interior edge 89 may define the interior 91 of the spiral conveyor belt 48.

Figure 8:
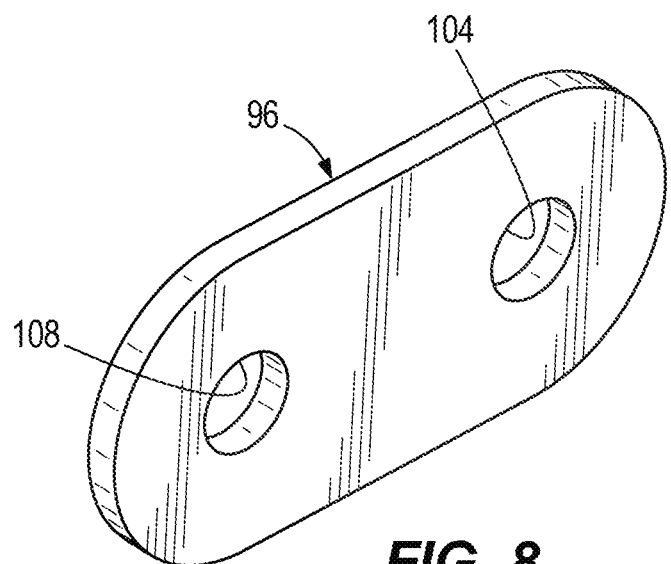
FIG. 8 is a top perspective view of one example of a portion of the conveyor belt shown in FIGS. 5-7, according to one aspect of the present disclosure.
Figure 9:
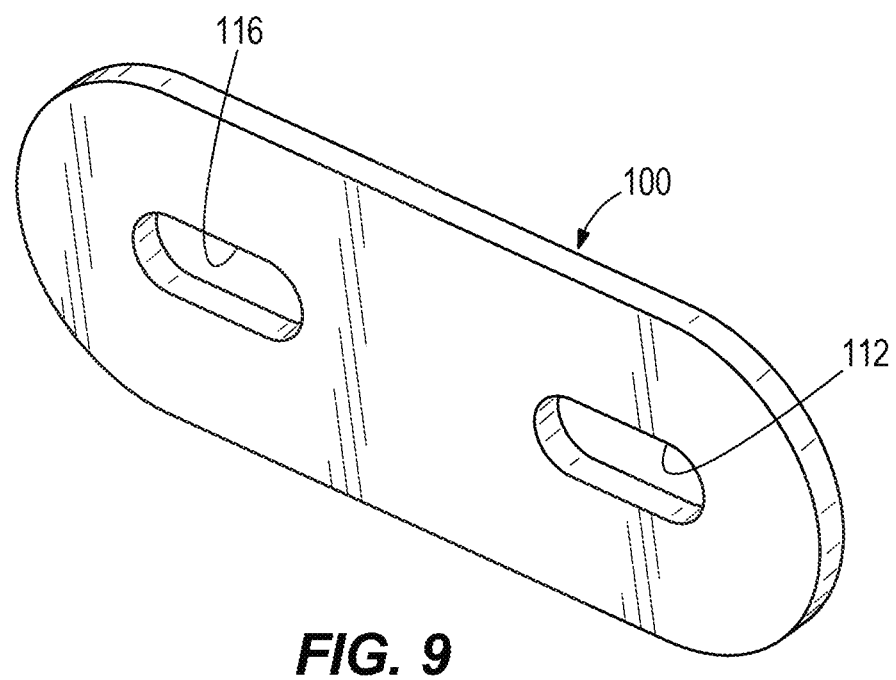
FIG. 9 is a top perspective view of one example of a portion of the conveyor belt shown in FIGS. 5-7, according to one aspect of the present disclosure.

Referring now to FIGS. 6-9, one example of a spiral conveyor belt is illustrated. In this illustrated example, the spiral conveyor belt 48 includes a plurality of rods 92, a plurality of inner members 96 and a plurality of outer members 100. One of the inner members 96 is illustrated in FIG. 8 and one of the outer members 100 is illustrated in FIG. 9. Each inner member 96 includes a first aperture 104 and a second aperture 108 and each outer member 100 includes a first aperture 112 and a second aperture 116. In the illustrated example, the inner members 96 are configured in an overlapping manner such that a first aperture 104 of one inner member 96 is aligned with and overlaps a second aperture 108 of another or adjacent inner member 96. An inner end 120 of each rod 92 is positioned in the aligned apertures 104, 108 of the overlapping inner members 96 and includes a head or enlarged member 124 larger than the size of the aligned first and second apertures 104, 108 to inhibit the inner end 120 of the rod 92 from exiting or uncoupling from the overlapping inner members 96. In the illustrated example, the rod 92 is sized complementary to the size of the first and second apertures 104, 108 of the inner members 96. That is, the rod 92 is sized similarly to the size of the first and second apertures 104, 108 such that there is little to no clearance between the rods 92 and inner members 96. This limited to no clearance inhibits significant movement of the inner ends 120 of the rods 92 relative to the inner members 96, thereby maintaining a substantially constant spacing of the inner ends 120 of the rods 92 relative to one another.

Similarly to the inner member 96, in the illustrated example, the outer members 100 are configured in an overlapping manner such that a first aperture 112 of one outer member 100 is aligned with and overlaps a second aperture 116 of another or adjacent outer member 100. An outer end 128 of each rod 92 is positioned in the aligned apertures 112, 116 of the overlapping outer members 100 and includes a head or enlarged member 132 larger than the size of the aligned first and second apertures 112, 116 to inhibit the outer end 128 of the rod 92 from exiting or uncoupling from the overlapping outer members 100. The enlarged head 132 at the outer end 128 of each rod 92 is also engageable by the sprockets 80 of the conveyor drive member 72. The enlarged heads 132 and sprockets 80 are appropriately sized and shaped to withstand the forces applied thereto during driving of the spiral conveyor belt 48, ensure proper and reliable engagement between the enlarged heads 132 and sprockets 80 and to ensure adequate driving of the spiral conveyor belt 48.

In the illustrated example, the first and second apertures 112, 116 of the outer members 100 are sized larger than the size of the rods 92. This difference in size between the first and second apertures 112, 116 of the outer member 100 and the rods 92 allows the outer ends 128 of the rods 92 to move relative to the outer members 100, thereby allowing the outer ends 128 of the rods 92 to move relative to each other and provide variable spacing between the outer ends 128 of the rods 92. In the illustrated example, the rods 92 are circular in cross-section, the first and second apertures 104, 108 of the inner members 96 are circular to accommodate the circular rods 92, and the first and second apertures 112, 116 of the outer members 100 are elongated slots having semi-circular ends to accommodate the circular rods 92. It should be understood that the rods 92 and apertures 104, 108, 112, 116 of the inner and outer members 96, 100 may have any shape or shapes and all of such possibilities are intended to be within the spirit and scope of the present disclosure.

In the illustrated example, the first and second apertures 112, 116 of the outer members 100 are generally horizontal and elongated slots, which allow the outer ends 128 of the rods 92 to move horizontally, but inhibit vertical movement of the outer ends 128 of the rods 92. These horizontal slots allow the outer ends 128 of the rods 92 to adjust spacing relative to each other, but maintain the rods 92 in a substantially planar orientation to support food product thereon. The first and second apertures 112, 116 of the outer member 100 are configured to accommodate all configurations of the spiral conveyor belt 48 as it moves through the spiral cooking device 24. For example, in some instances the spiral conveyor belt 48 is in a helical or spiral configuration within the spiral cooking device 24 and in other instances the spiral conveyor belt 48 is in a straight configuration (e.g., at the inlet, the outlet and when the belt is passing through the belt wash). In the spiral configuration, the outer ends 128 of the spiral conveyor belt 48 are spaced wider apart than the inner ends 120 of the rods 92 in order to provide an arcuate or spiral shape to the spiral conveyor belt 48, whereas in the straight configuration the outer ends 128 and the inner ends 120 of the rods 92 are at approximately the same spacing to provide a straight conveyor. In the illustrated example, ends of the first and second slots 112, 116 of the outer members 100 define two extreme positions for the rods 92. These extreme positions are associated with or define a widest spacing of the outer ends 128 of the rods 92 and a narrowest spacing of the outer ends 128 of the rods 92. The widest spacing of the outer ends 128 of the rods 92 is established by the first and second slots, which enable the spiral conveyor belt 48 to handle all curved or arcuate configurations of the spiral conveyor belt 48 occupied during operation of the spiral cooking device 24. The narrowest spacing of the outer ends 128 of the rods 92 is associated with the spacing of the first and second apertures 104, 108 in the inner members 96 in order to match the spacing of the inner ends 120 of the rods 92 or to allow arcuate configurations of the conveyor belt 48 in an opposite manner than that described above. In one example, the spiral conveyor belt 48 may have a turn ratio of about 1.6. In this example, a turn ratio may be equal to (central opening of spiral conveyor belt) divided by (belt width multiplied by 2). It should be understood that the present example of a turn ratio is provided to demonstrate at least some of the principles of the present disclosure and is not intended to be limiting upon the present disclosure. The spiral conveyor belt is capable of having a wide variety of turn ratios and all of such possibilities are intended to be within the spirit and scope of the present disclosure.

In one example, a control member 94 (described in more detail below) may control the spiral conveyor belt 48 at various speeds to adjust the cooking time of the food products. The control member 94 may also adjust the direction of movement of the spiral conveyor belt 48. In one example, the control member 94 could control the spiral conveyor belt 48 to advance or transport a food product through the spiral cooking device 24 between about 5 minutes and about 150 minutes. In one example, the control member 94 could control the spiral conveyor belt 48 to move at a maximum speed of about 25 to 30 meters per minute.

In one example, the spiral conveyor belt 48 may be about 740 millimeters wide. In such an example, the useable portion of the spiral conveyor belt 48 that may be occupied by food product may be about 700 millimeters. In another example, the spiral conveyor belt 48 may be about 1050 millimeters wide. In such an example, the useable portion of the spiral conveyor belt 48 that may be occupied by food product may be about 1000 millimeters. It should be understood that the spiral conveyor belt 48 may have any width and any useable portion, and all of such possibilities are intended to be within the spirit and scope of the present disclosure.

As indicated above, the spiral cooking device 24 may be configured to include a wide variety of tiers and spacing between the tiers. A length of the spiral conveyor belt 48 may be dependent upon the number of tiers. In one example, the conveyor belt 48 may include about 12 meters of length for each tier or layer. It should be understood that any length of the spiral conveyor belt may be required for each tier thereof and all of such possibilities are intended to be within the spirit and scope of the present disclosure. In some examples, the spiral conveyor belt 48 may be between about 47 meters and about 174 meters. It should be understood that the spiral conveyor belt may be any length and all of such possibilities are intended to be within the spirit and scope of the present disclosure.

Referring now to FIGS. 11-15, the spiral cooking device 24 includes a plurality of cooking zones 136-141. In the illustrated example, the spiral cooking device 24 includes six cooking zones 136-141. In other examples, the spiral cooking device 24 is capable of including any number of cooking zones and all of such possibilities are intended to be within the spirit and scope of the present disclosure. Additionally, it should be understood that the shape and size of the cooking zones 136-141 and the components of the spiral cooking device 24 included in each of the cooking zones 136-141 may vary slightly or greatly, and any and all of such variations and possibilities are intended to be within the spirit and scope of the present disclosure.

Figure 11:
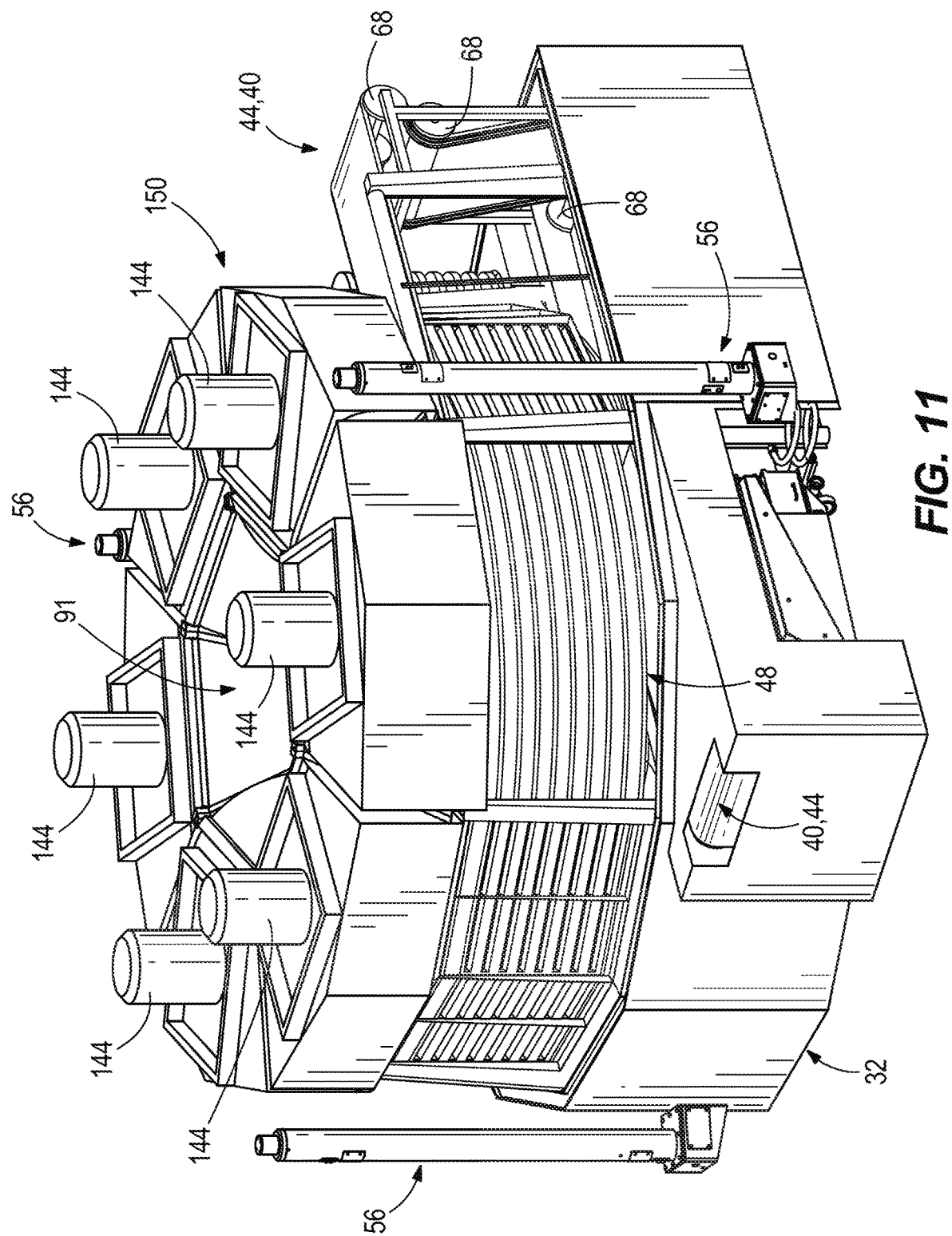
FIG. 11 is a top, front perspective view of a portion of the spiral cooking device shown in FIG. 2 with the hood removed to illustrate other components of the spiral cooking device, according to one aspect of the present disclosure.
Figure 12:
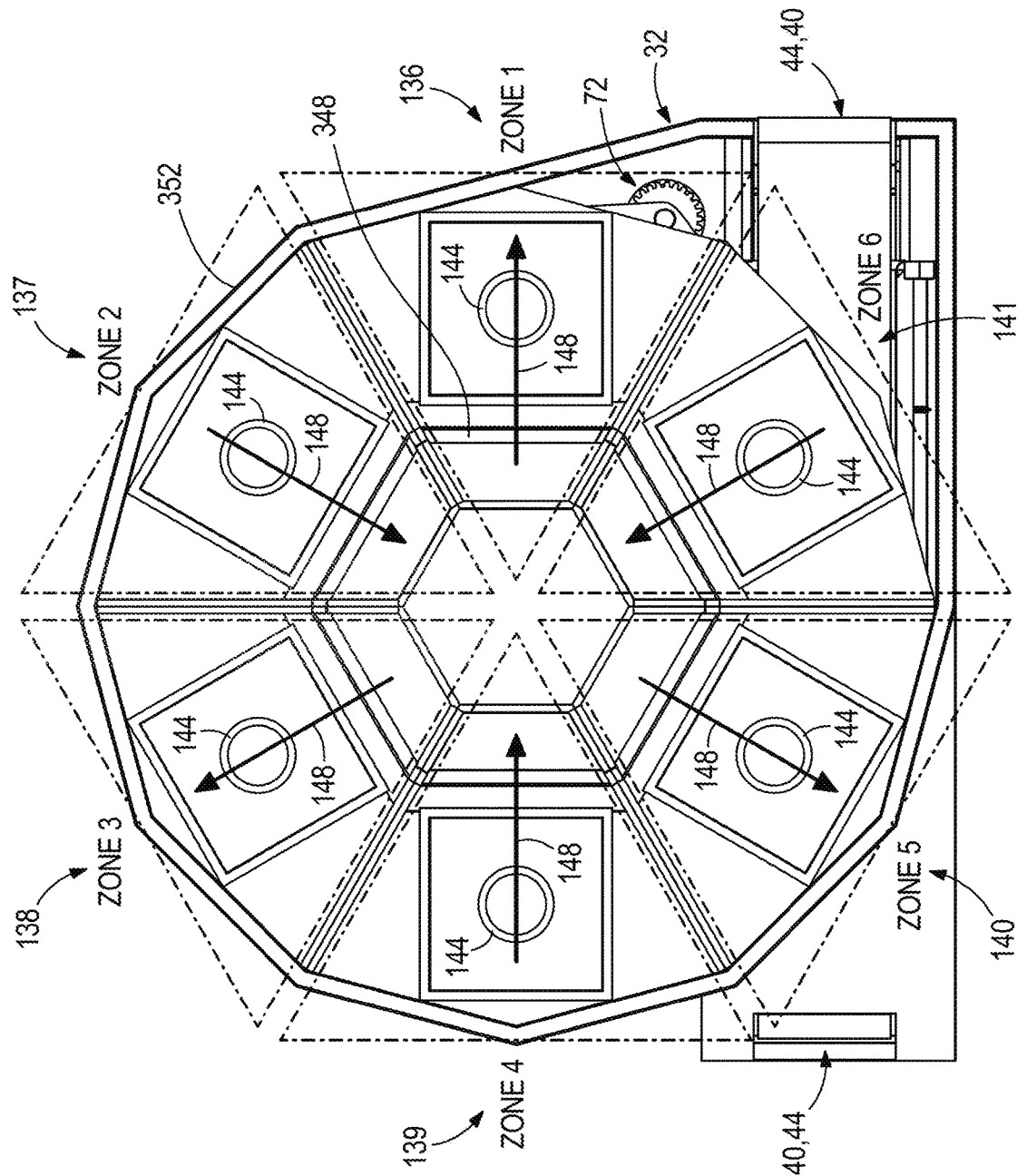
FIG. 12 is a top view of a portion of the spiral cooking device shown in FIG. 2 with a hood removed, examples of cooking zones and air flow directions over food product represented, according to one aspect of the present disclosure.

With particular reference to FIGS. 11 and 12, in the illustrated example, the cooking zones 136-141 are serially oriented around the spiral cooking device 24. In order to assist with describing the plurality of cooking zones 136-141, the cooking zones 136-141 will be referred to as the first cooking zone 136, the second cooking zone 137, the third cooking zone 138, the fourth cooking zone 139, the fifth cooking zone 140 and the sixth cooking zone 141. This manner of numerical labeling is not intended to be limiting upon the present disclosure. Additionally, this numerical identification of the zones is not intended to imply a consecutive order of the cooking zones 136-141 in either an upstream or downstream manner; however, in some examples, this numerical allocation may imply a consecutive order of the cooking zones 136-141.

As indicated above, the illustrated example of the spiral cooking device 24 includes six cooking zones 136-141. In the illustrated example, the spiral cooking device 24 includes six fans 144 and six heating elements 52 with one fan 144 and one heating element 52 associated with each cooking zone 136-141. In other examples, it should be understood that the spiral cooking device 24 may include any number of cooking zones and, accordingly, may include any number of fans and any number of heating elements as long as the number of fans and the number of heating elements are equal to the number of cooking zones 136-141. In other words, the spiral cooking device 24 includes a complementary number of fans 144, heating elements 52 and cooking zones 136-141. In further examples, the spiral cooking device 24 may include a different number of fans 144 and/or heating elements 52 than the number of cooking zones 136-141.

In one example, with reference to FIG. 11, the fans 144 are coupled to a substructure 150 of the spiral cooking device 24. In another example, with reference to FIG. 16, the fans 144 are coupled to the hood 36. It should be understood that the fans 144 may be coupled to and supported within the spiral cooking device 24 in any manner and all of such possibilities are intended to be within the spirit and scope of the present disclosure.

The one or more fans 144 may be operated at a variety of different speeds to move the air flow through the spiral cooking device 24 at various speeds, and all of such possibilities are intended to be within the spirit and scope of the present disclosure. In one example, the fans 144 may be operated at a first speed and a second speed faster than the first speed. In one example, the second speed may be about twice as fast as the first speed. In one example, a maximum airflow speed generated by the fans 144 in the cooking locations may be about 10 meters per second.

Figure 36:
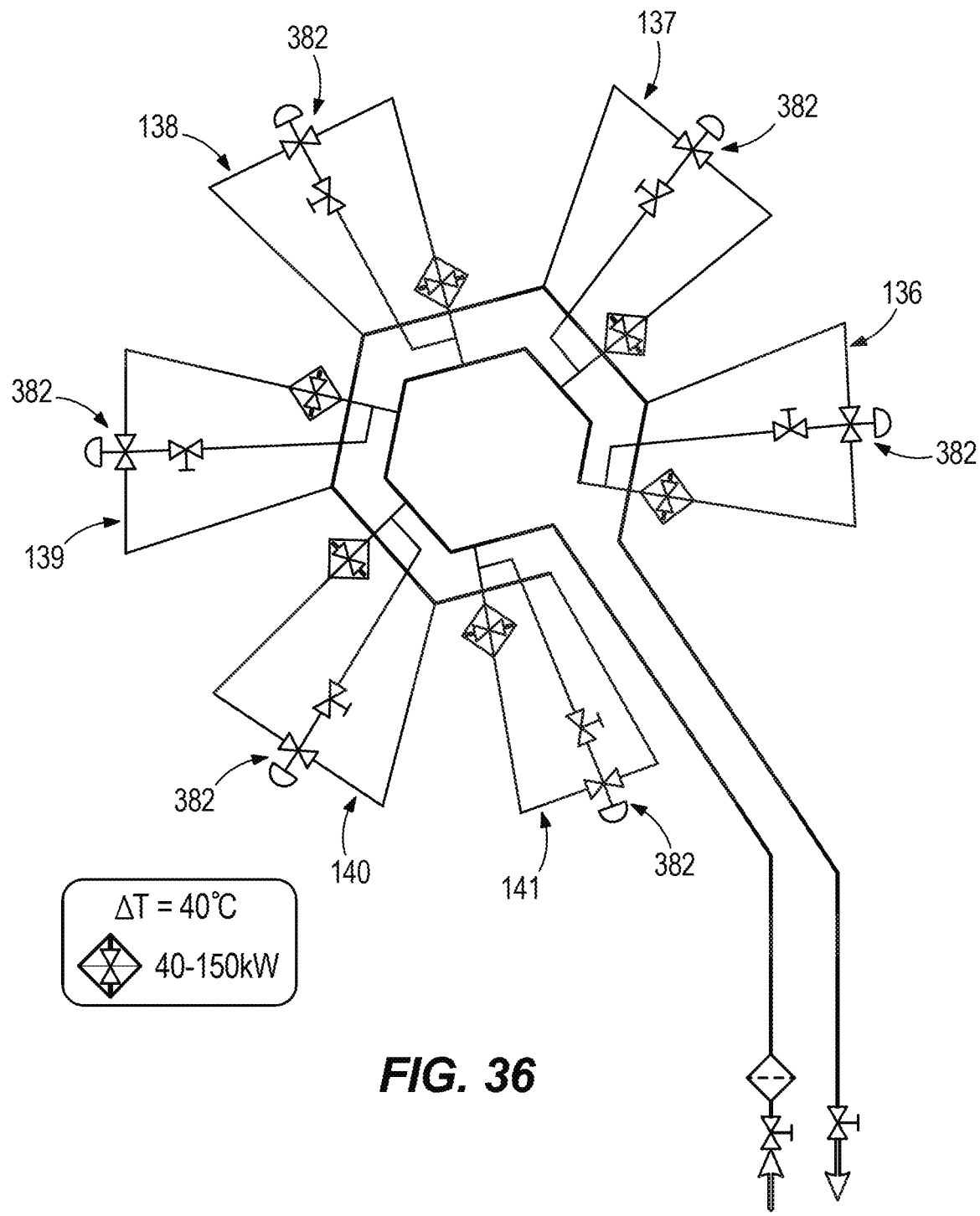
FIG. 36 is a schematic representation of a portion of one example of a spiral cooking device including one example of a fuel valve configuration, according to one aspect of the present disclosure.

With reference to FIG. 36, one example of a manner of fueling the heating elements 52 is provided. In this example, the cooking zones 136-141 may be independently controlled and each cooking zone 136-141 includes a pressure controlled oil valve 382 that controls the flow of fuel (e.g., thermal oil) to the heating element 52.

Figure 37:
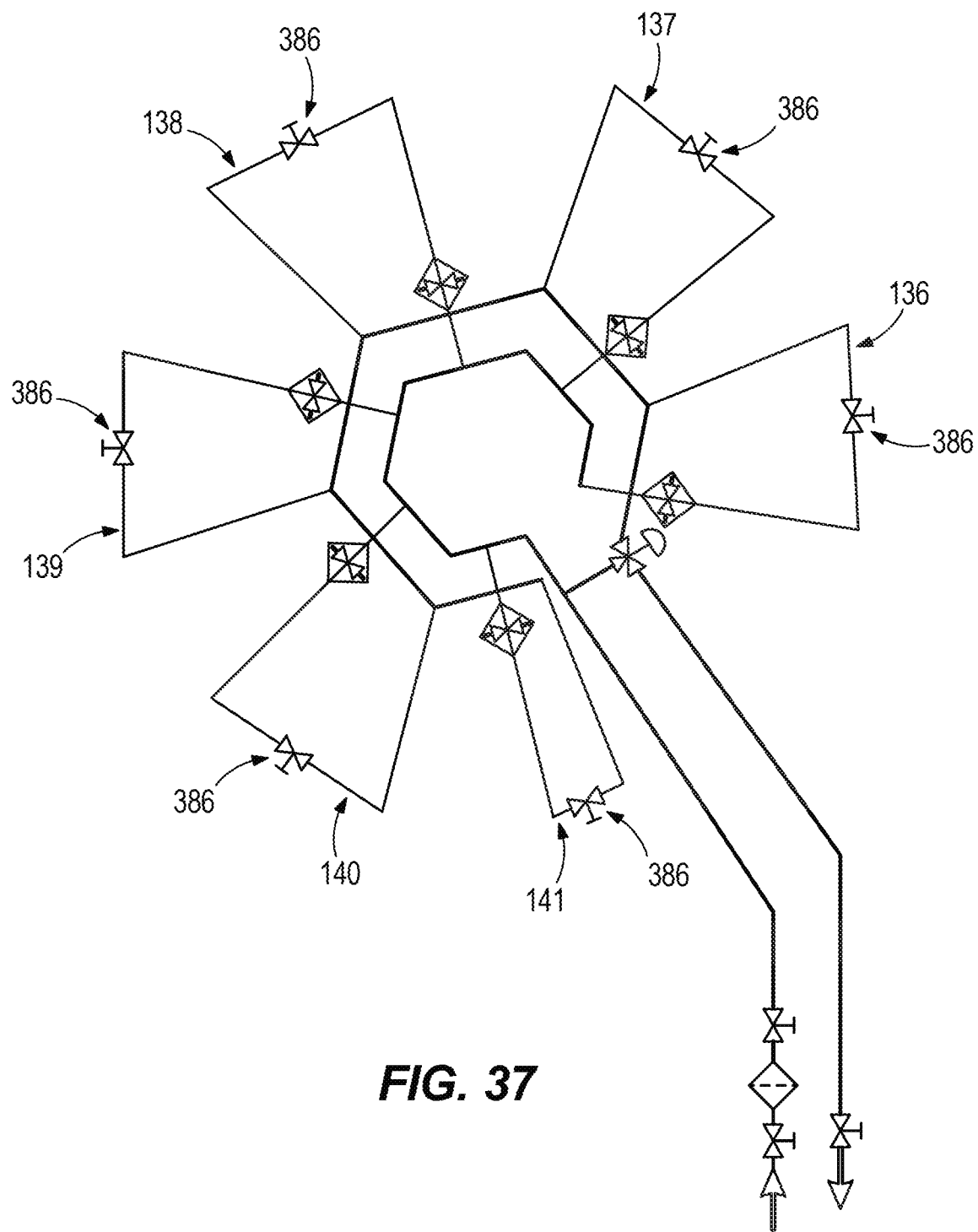
FIG. 37 is a schematic representation of a portion of another example of a spiral cooking device including another example of a fuel valve configuration, according to one aspect of the present disclosure.

With reference to FIG. 37, another example of a manner of fueling the heating elements 52 is provided. In this example, the cooking zones 136-141 may be independently controlled and each cooking zone 136-141 includes a hand valve 386 that controls the flow of fuel (e.g., thermal oil) to the heating element 52.

Figure 13:
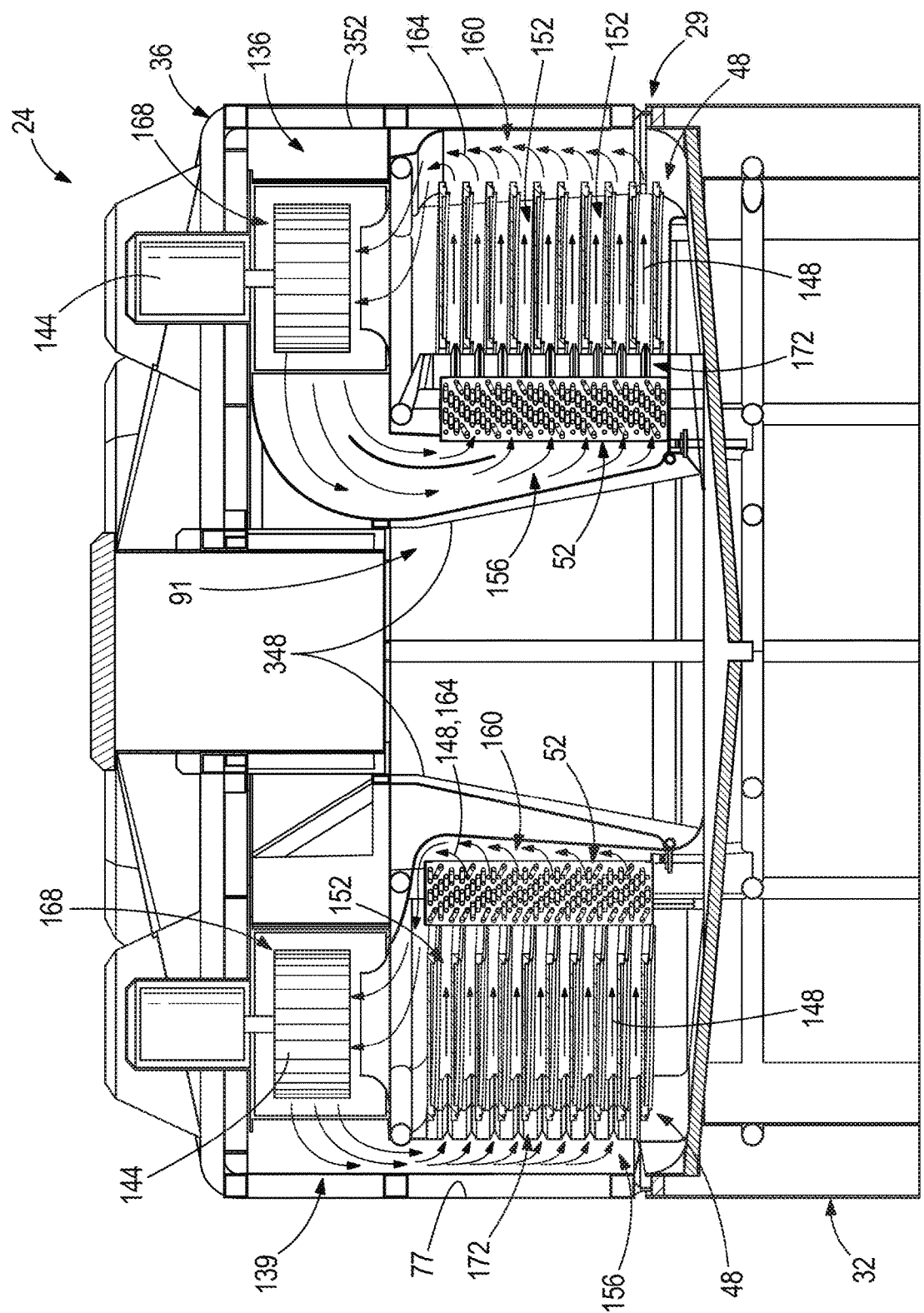
FIG. 13 is a cross-sectional view of the spiral cooking device taken along line 13-13 in FIG. 2, according to one aspect of the present disclosure.
Figure 14:
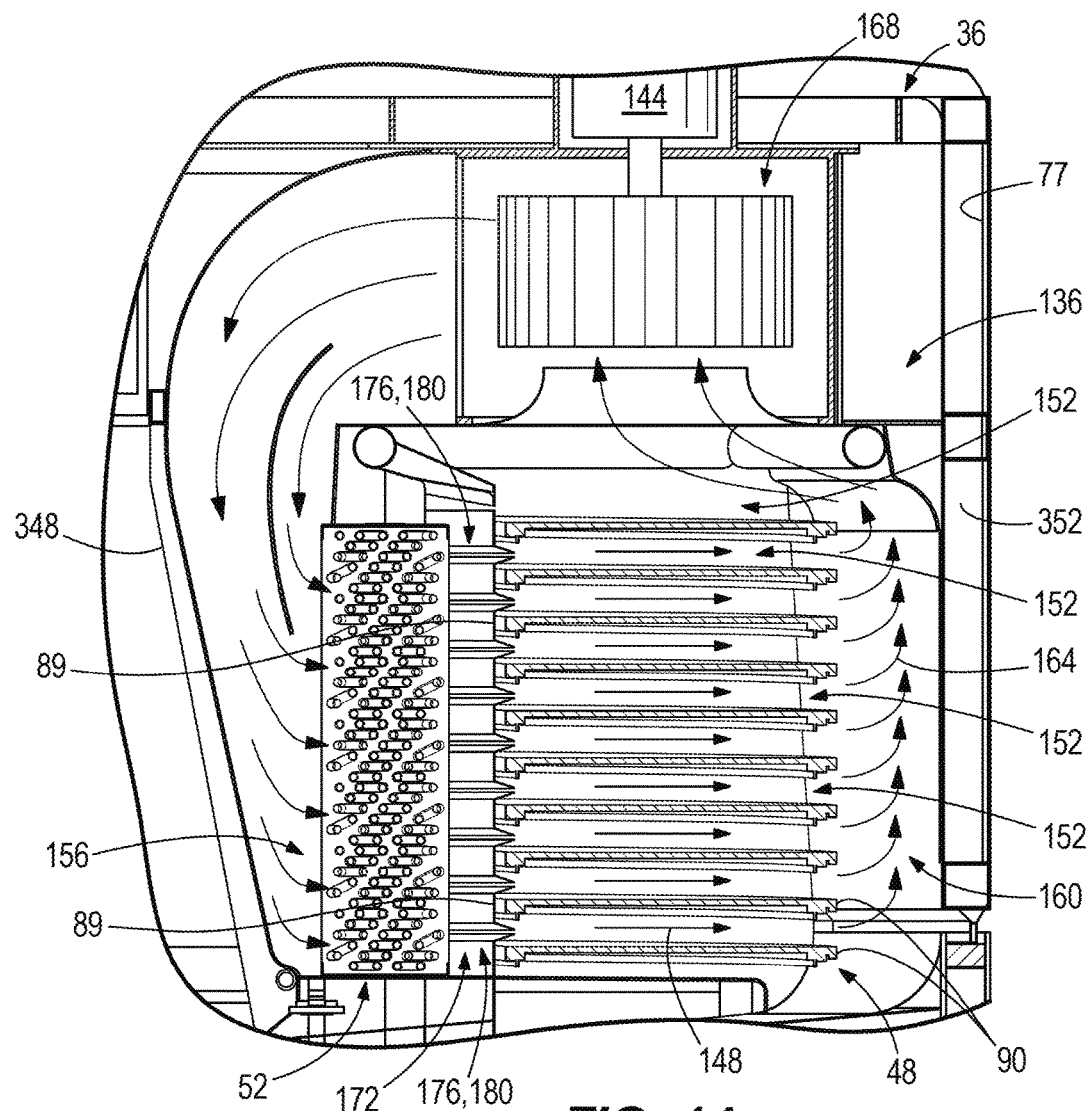
FIG. 14 is an enlarged view of a portion of the cross-sectional view shown in FIG. 13, according to one aspect of the present disclosure.

Referring now to FIGS. 13 and 14, a cross-section of the first and fourth cooking zones 136, 139 are illustrated in FIG. 13 and an enlarged view of the fourth cooking zone 139 is illustrated in FIG. 14. In the illustrated example of the first and fourth cooking zones 136, 139, heated air 148 is directed over the food product in a substantially horizontal manner. As indicated above, the illustrated example of the spiral cooking device 24 may include a variety of tiers, levels or layers of the spiral conveyor belt 48, thereby defining numerous cooking locations 152 with one cooking location 152 on each of the numerous tiers of the spiral conveyor belt 48. The heated air 148 is directed horizontally through each of the cooking locations 152 defined above each tier of the spiral conveyor belt 48. In one example, to facilitate this horizontal flow of heated air 148 over the food product in all the cooking locations 152 within all of the cooking zones 136-141, each cooking zone 136-141 includes a fan 144, a heating element 52, an air infeed path 156, and an air return path 160. In the illustrated example of the first and fourth cooking zones 136, 139 shown in FIG. 13, the fans 144 are positioned above the spiral conveyor belt 48 in both cooking zones 136, 139.

In the first cooking zone 136 shown in FIG. 13, the fan 144 draws return air 164 (or air that is exiting the cooking locations) from the cooking locations 152 into a fan chamber 168 via the air return path 160. The fan 144 then directs return air 164 from the fan chamber 168, through the heating element 52 where the return air 164 is heated into heated air 148 and then directs the heated air 148 into the air infeed path 156. The air infeed path 156 is configured to direct the heated air 148 from the heating element 52 into the cooking locations 152. The heated air 148 passes through the numerous cooking locations 152 in a horizontal manner and exits the cooking locations 152 back into the air return path 160. The return air 164 is then drawn or directed back into the fan chamber 168 via the fan 144 where the return air 164 is again cycled through the first cooking zone. In the illustrated example, the heated air 148 in the first cooking zone 136 moves horizontally through the cooking locations 152 from an interior or center of the spiral cooking device 24 toward an exterior of the spiral cooking device 24. In other words, the heated air 148 moves inside-out in the first cooking zone 136.

In the fourth cooking zone 139 shown in FIGS. 13 and 14, the fan 144 draws return air 164 (or air that is exiting the cooking locations) from the cooking locations 152 and through the heating element 52 wherein the return air 164 is heated into heated air 148. The heated air 148 is then drawn into a fan chamber 168 via the air return path 160 by the fan 144. The fan 144 then directs heated air 148 from the fan chamber 168 into the air infeed path 156. The air infeed path 156 is configured to direct the heated air 148 into the cooking locations 152 in a horizontal manner. The heated air 148 passes through the numerous cooking locations 152 in a horizontal manner and exits the cooking locations 152 back through the heating element 52 and into the air return path 160. The heated air 148 is then drawn or directed back into the fan chamber 168 via the fan 144 where the heated air 148 is again cycled through the fourth cooking zone 139. In the illustrated example, the heated air 148 in the fourth cooking zone 139 moves horizontally through the cooking locations 152 from an exterior of the spiral cooking device 24 toward an interior or center of the spiral cooking device 24. In other words, the heated air 148 moves outside-in in the fourth cooking zone 139.

With particular reference to FIG. 12, one example of horizontal flow of the heated air 148 through the cooking locations 152 in the plurality of cooking zones 136-141 is illustrated. In this illustrated example, the heated air 148 moves through the first cooking zone 136 from an interior or center of the spiral cooking device 24 toward an exterior of the spiral cooking device 24, the second cooking zone 137 from an exterior of the spiral cooking device 24 toward an interior or center of the spiral cooking device 24, the third cooking zone 138 from an interior or center of the spiral cooking device 24 toward an exterior of the spiral cooking device 24, the fourth cooking zone 139 from an exterior of the spiral cooking device 24 toward an interior or center of the spiral cooking device 24, the fifth cooking zone 140 from an interior or center of the spiral cooking device 24 toward an exterior of the spiral cooking device 24, and the sixth cooking zone 141 from an exterior of the spiral cooking device 24 toward an interior or center of the spiral cooking device 24. In this example, the horizontal flow of the heated air 148 alternates directions in the plurality of cooking zones 136-141. In the illustrated example, the heated air 148 is directed through the first, third and fifth cooking zones 136, 138, 140 in a first horizontal direction and the heated air 148 is directed through the second, fourth and sixth cooking zones 137, 139, 141 in a second horizontal direction opposite the first horizontal direction. As indicated above, the spiral cooking device 24 is capable of having any number of cooking zones and, accordingly, the heated air 148 may be alternatively directed throughout any number of cooking zones included in the spiral cooking device 24. Horizontal directing of the heated air 148 may also be considered as being directed in a direction generally parallel to top surfaces of the spiral conveyor belt 48.

In other examples, the heated air 148 may flow horizontally through the plurality of cooking zones 136-141 in any direction. In other examples, the heated air 148 may flow horizontally through the plurality of cooking zones 136-141 in manners other than the illustrated example of alternating directions. For example, the heated air 148 may move horizontally through all the plurality of cooking zones 136-141 in the same direction (e.g., all inside-out or all outside-in). Also, for example, the heated air 148 may move horizontally through the plurality of cooking zones 136-141 in groups such that, for example, at least two consecutive cooking zones 136-141 have heated air 148 moving horizontally therethrough in one direction and other cooking zones 136-141 have heated air 148 moving horizontally therethrough in a different direction. It should be understood that the spiral cooking device 24 is capable of moving heated air 148 through the plurality of cooking zones 136-141, and more particularly through the cooking locations 152) in any manner and all of such possibilities are intended to be within the spirit and scope of the present disclosure.

With continued reference to FIGS. 13 and 14, in one example, the hood 36 assists with defining the air flow path around the plurality of cooking zones 136-141. In one example, the hood 36 provides an upper limiting surface positioned above the fans 144 and the fan chambers 168 to inhibit air from escaping the air flow path in an upward direction. The hood 36 also assists with defining at least a portion of the air infeed paths 156 and at least a portion of the air return paths 160 depending on the cooking zone and the heated air 148 flow direction. The spiral cooking device 24 also includes a first side plate 172 in each of the plurality of cooking zones 136-141. The first side plate 172 assists with defining the air infeed path 156. For purposes of description herein, the first side plate 172 will be the plate through which heated air 148 passes before entering the cooking locations 152.

Figure 15:
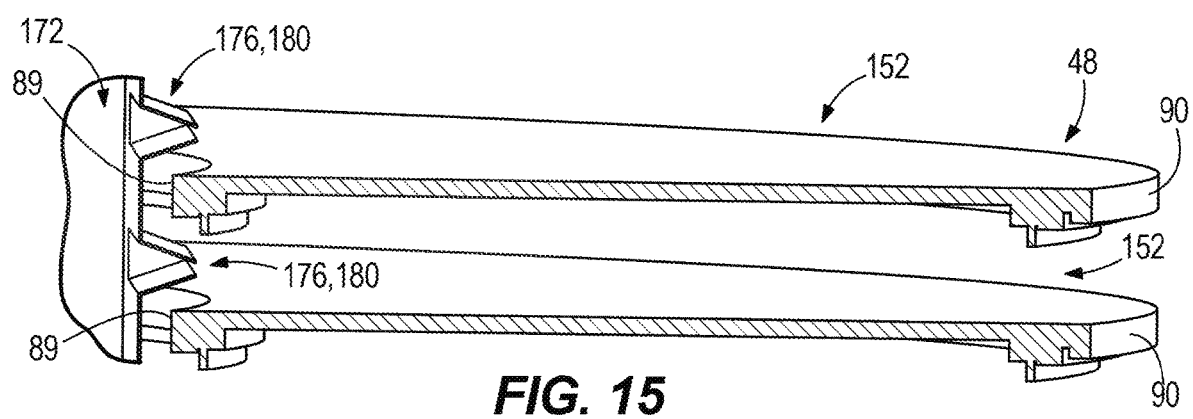
FIG. 15 is an enlarged view of a portion of the cross-sectional view shown in FIG. 14, according to one aspect of the present disclosure.

In one example, with reference to FIGS. 13-15, all of the first side plates 172 have substantially the same structure and function. Accordingly, only one of the first side plates 172 will be described in further detail herein with it being understood that such description may pertain to all the first side plates 172. In the illustrated example, a plurality of openings or apertures 176 are defined through the first side plate 172 in fluid communication with the air infeed path 156 and the plurality of cooking locations 152. One opening 176 is aligned with each of the plurality of cooking locations 152 to allow heated air 148 to pass through the first side plate 172 and enter the cooking locations 152 in a horizontal manner. In the illustrated example, the openings 176 are elongated slots having a longitudinal extent extending in a horizontal plane. In other examples, the openings 176 may have any shape and size, and the single slot may be comprised of a plurality of openings, and all of such possibilities are intended to be within the spirit and scope of the present disclosure. In other examples, any number of openings 176 may be defined in the first side plate 172 and in fluid communication with the air infeed path 156 and the cooking locations 152. For example, the first side plate 172 may include a plurality of openings 176 defined therein at each of the cooking locations 152 to direct heated air 148 through a plurality of openings 176 into each of the cooking locations 152.

In one example, the plurality of openings 176 defined in the first side plate 172 may be adjustable and configured to change the size of the openings 176. Decreasing the size of the openings 176 increases the velocity of the heated air 148 passing through the openings 176 into the cooking locations 152. Conversely, increasing the size of the openings 176 decreases the velocity of the heated air 148 passing through the openings 176 into the cooking locations 152. The openings 176 may be adjustable in any manner and all of such possibilities are intended to be within the spirit and scope of the present disclosure. In one example, each of the openings 176 is comprised of a nozzle 180 and each of the nozzles 180 includes a pair of converging plates (see, e.g., FIG. 15) having an inlet and an outlet with the outlet being smaller than the inlet. This nozzle configuration increases the velocity and/or flow rate of the heated air 148 as it passes from the air infeed path 156 into the cooking locations 152. It should be understood that the nozzles 180 may have any configuration and all of such possibilities are intended to be within the spirit and scope of the present disclosure. In one example, the converging plates may be moved relative to each other to adjust the spacing between the two plates. Moving the plates closer together will decrease the size of the opening 176 in the nozzle 180, thereby resulting in increasing the velocity of the heated air 148 exhausted from the nozzle 180. Conversely, moving the converging plates further apart will increase the size of the opening 176 in the nozzle 180, thereby resulting in decreasing the velocity of the heated air 148 exhausted from the nozzle 180. In one example, one of the converging plates may be moveable and the other converging plate may be fixed. In another example, both converging plates may be moveable. In one example, the openings 176 or nozzles 180 defined in the first side plate 172 may be adjusted independently of each other. For example, one opening 176 or nozzle 180 may have a smaller opening than another opening 176 or nozzle 180 defined in the first side plate 172. In another example, all of the openings 176 or nozzles 180 may be adjusted together. In a further example, some of the openings 176 or nozzles 180 may be adjusted and other of the openings 176 or nozzles 180 are not adjustable.

In examples of the spiral cooking device 24 where the openings 176 are adjustable, the openings 176 may be adjusted in a variety of manners. In one example, the openings 176 are adjustable manually. If the openings 176 are adjusted manually, a person may manually loosen one or both of the converging plates, move the one or both of the plates to a desired location, then secure the one or both of the plates in a desired location. This may be performed for any number of the openings 176. In another example, the openings 176 may be adjusted by a control member 94. In this example, the spiral cooking device 24 may include one or more actuators and/or motors coupled to any number of the openings 176 to adjust the size of the openings 176. The actuators are in electronic communication with the control member 94 and the control member 94 may activate the actuator(s) to adjust the size of the openings 176. Adjusting the openings 176 with a control member 94 provides the ability to adjust the size of the openings 176 during cooking operation of the cooking device 24. Whereas, manual adjustment of the openings 176 may require the spiral cooking device 24 to adequately cool down after the cooking operation to provide a safe condition for a person to adjust the openings 176.

With further reference to FIGS. 13-15, in the illustrated example, the spiral cooking device 24 does not include a second side plate on an opposite side of the cooking locations 152 from the first side plate 172 that may assist with defining the air return path 160. Instead, in the illustrated example, air exiting the cooking locations 152 moves directly into the air return path 160 or into the heating element 52 depending on the cooking zone (see particularly, e.g., FIG. 14) through the open interior ends of the tiers of the spiral conveyor belt 48.

Figure 16:
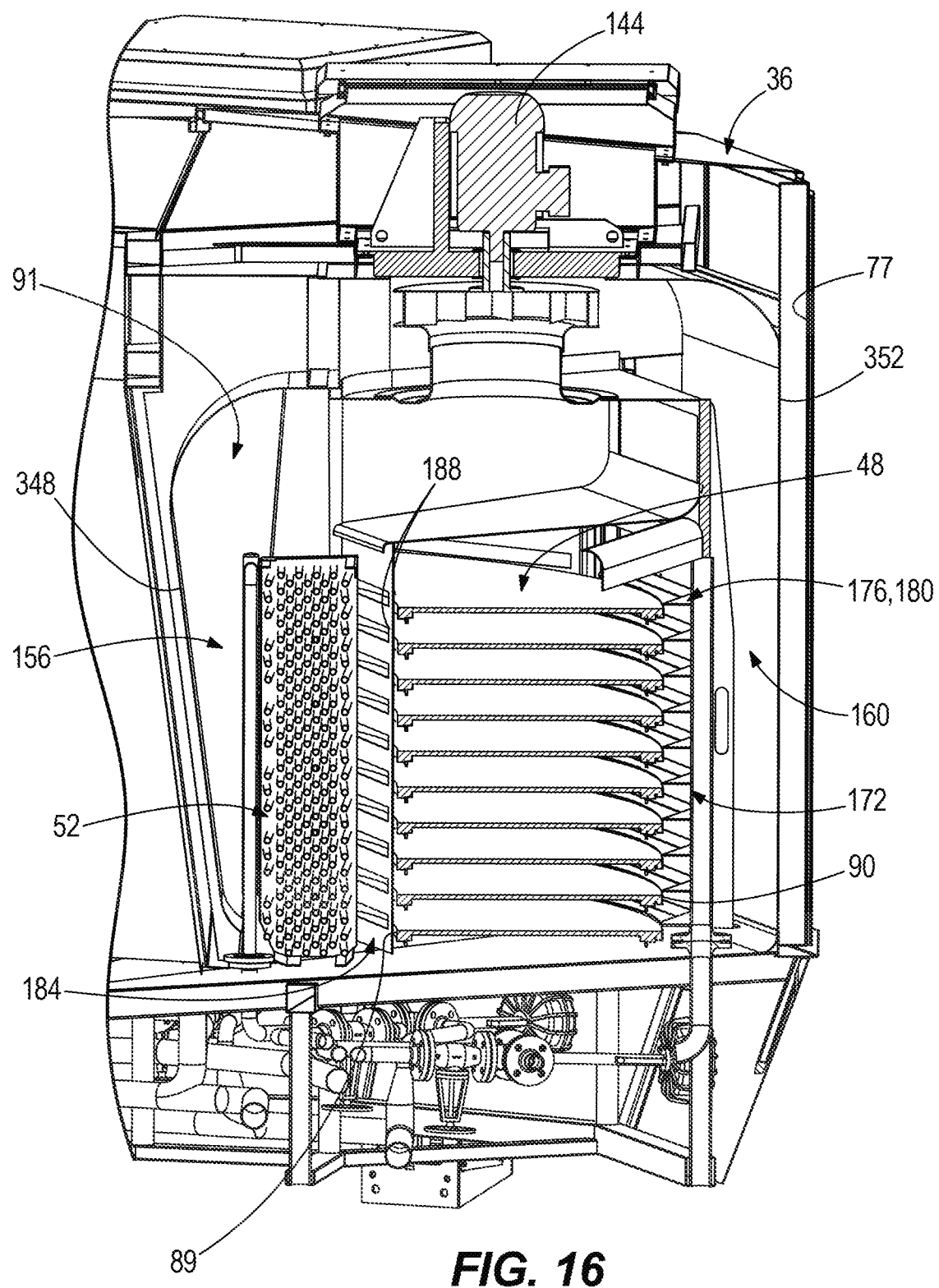
FIG. 16 is a top, perspective view of a portion of another spiral cooking device including one example of a second plate with openings, according to one aspect of the present disclosure.
Figure 17:
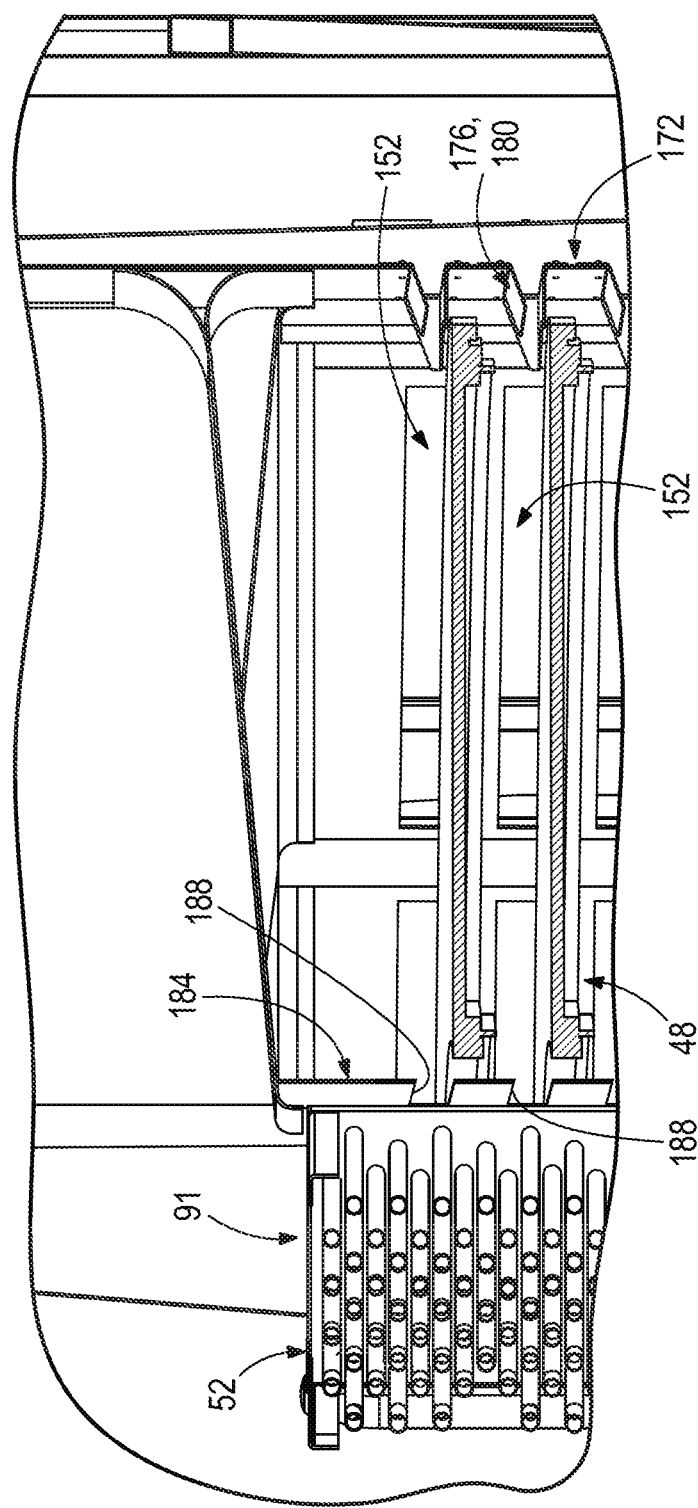
FIG. 17 is an elevational view of a portion of the spiral cooking device shown in FIG. 16, according to one aspect of the present disclosure.

Referring to FIGS. 16 and 17, another example of the spiral cooking device 24 is illustrated and this example of the spiral cooking device 24 includes a second side plate 184 in each of the plurality of cooking zones 136-141. The second side plate 184 assists with defining the air return path 160 or an entrance into the heating element 52 depending on the cooking zone. For purposes of description herein, the first side plate 172 will be the plate through which heated air 148 passes before entering the cooking locations 152 and the second side plate 184 will be the plate through which air passes when exiting the cooking locations 152. In this illustrated example of the spiral cooking device 24, a plurality of openings or apertures 188 are defined through the second side plate 184 in fluid communication with the cooking locations 152 and the air return path 160 and/or heating element 52. Any number of openings 188 may be aligned with each of the cooking locations 152 to allow air to pass through the second side plate 184 and exit the cooking locations 152 in a horizontal manner into the air return path 160 and/or the heating element 52. In the illustrated example, the openings 188 are elongated slots having a longitudinal extent extending in a horizontal plane.

In other examples, the openings 188 may have any shape, size and orientation, and all of such possibilities are intended to be within the spirit and scope of the present disclosure. In other examples, any number of openings 188 may be defined in the second side plate 184 and in fluid communication with the cooking locations 152 and the air return path 160 and/or the heating element 52. For example, the second side plate 184 may include a single opening 188 defined therein at each of the cooking locations 152, or two or more openings 188 may be defined in the second side plate 184 at each of the cooking locations 152 to allow air to exit the cooking locations 152 and enter the air return path 160 and/or the heating element 52.

With continued reference to the example shown in FIGS. 16 and 17, the illustrated example of the openings 188 defined in the second side plate 184 are fixed in size and shape. In other examples, the openings 188 defined in the second side plate 184 may be adjustable to adjust the size of the openings 188. In such an example, the openings 188 defined in the second side plate 184 may have any configuration, operation and/or alternatives describe with respect to the openings 176 defined in the first side plate 172 or they may have different configurations, operations and/or alternatives, with all of such possibilities intended to be within the spirit and scope of the present disclosure.

In one example, one or more of the first and second side plates 172, 184 may be movable to selectively expose and cover the components of the spiral cooking device 24 behind the side plates. This movability may allow a user to clean and/or repair/replace the components of the spiral cooking device 24 behind the side plates 172, 184.

In one example, one or more of the first and second side plates 172, 184 may each be comprised of two plates with each of the two plates being pivotable or rotatable about one or more hinges or other mechanisms allowing the one or more side plates to pivot or rotate relative to the mechanism between an opened position and a closed or secured position. One or more locking mechanisms such as, for example, clasps, friction-fit mechanisms, interference-fit mechanisms, detents, latches, or other locking mechanisms may be used with the pivotable or rotatable side plates to secure the side plates in the closed or secured position. In one example, the first and second side plates 172, 184 may be comprised of a single plate each (rather than two plates each) and the single plate may be pivotable or rotatable about one or more hinges or other mechanisms.

In another example, one or more of the first and second side plates 172, 184 may be removable from the spiral cooking device 24. The spiral cooking device 24 may include any type of coupling mechanism that allows the removable side plates 172, 184 to be selectively coupled to and removed from the spiral cooking device 24. In a further example, one or more of the first and second side plates 172, 184 may be both pivotable and removable.

Figure 39:
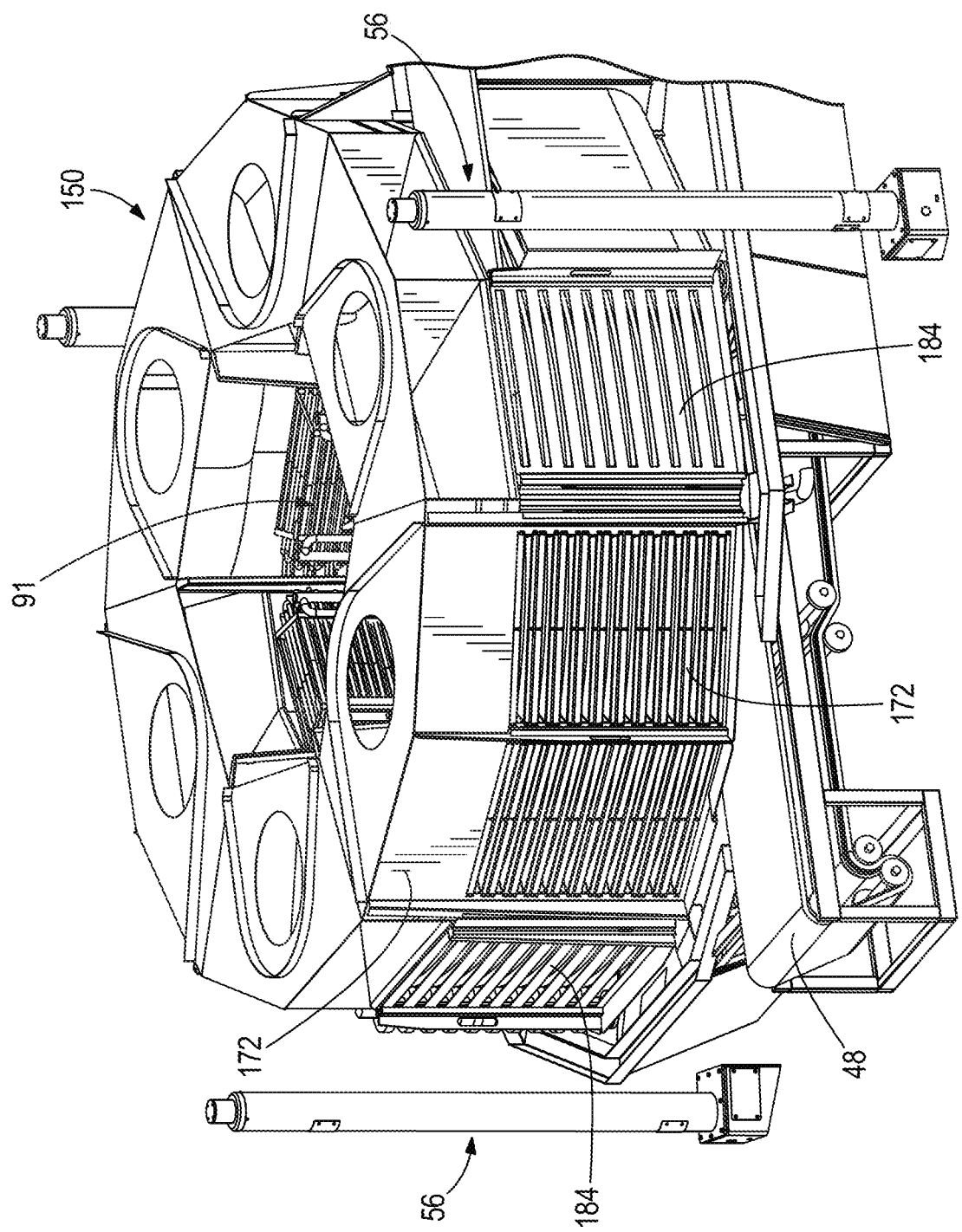
FIG. 39 is a top perspective view of a portion of one example of a spiral cooking device including a plurality of moveable side plates to facilitate access to interior components of the spiral cooking device, according to one aspect of the present disclosure.

With reference to FIG. 39, one example of the side plates 172, 184 that are moveable to allow access to components behind the side plates 172, 184 is illustrated. In one example, the side plates 172, 184 may be referred to as doors 172, 184.

Referring again to FIG. 13, one example of the first and the fourth cooking zones 136, 139 are illustrated. As indicated above, the fourth cooking zone 139 is similar to the first cooking zone 136 except the position of the heating elements 52 are reversed and the horizontal air flow over the food product in the cooking locations 152 in the fourth cooking zone 139 is in an opposite horizontal direction to the direction of the air flow through the cooking locations 152 in the first cooking zone 136 (one horizontal direction inside-out and other horizontal direction outside-in). The fourth cooking zone 139 includes similar structure as the first cooking zone 136, but the positioning of the heating element 52 in the fourth cooking zone 139 is reversed or on opposite sides of the cooking locations 152 than the heating element 52 of the first cooking zone 136. In the first cooking zone 136, the heating element 52 is positioned near the air infeed path 156. In the fourth cooking zone 139, the heating element 52 is positioned near the air return path 160.

The spiral cooking device 24 is configured to substantially isolate the cooking zones 136-141 from one another to ensure consistent and reliable cooking conditions within each cooking zone 136-141. Additionally, in some examples, the cooking conditions within each of the cooking zones 136-141 may be independently controlled to provide a desired manner of cooking the food product in each zone and, collectively, within the spiral cooking device 24. In other examples, the spiral cooking device 24 may be controlled in an efficiency mode or eco-mode where only a portion of the heating elements 52 are operated.

Examples of the components within the cooking zones 136-141 that may be independently controlled include, but are not limited to, the fans 144, the heating elements 52, the sizes of the openings 176, 188 in the first and/or second side plates 172, 184 and a humidity within each cooking zone 136-141 via a humidifying element (the spiral cooking device may include a single humidifying element within the spiral cooking device or any number of humidifying elements throughout the spiral cooking device including, but not limited to, one or more humidifying elements in each cooking zone). In one example, the spiral cooking device 24 may control the humidity for the entire spiral cooking device 24 rather than controlling the humidity for each cooking zone 136-141.

The spiral cooking device 24 is also capable of relatively isolating the cooking zones 136-141 by circulating air through the cooking zones 136-141 at a sufficiently high velocity. The cooking zones 136-141 are in fluid communication at the cooking locations 152 above and/or between the tiers of the spiral conveyor belt 48 in order to allow the belt and food product to move around the spiral cooking device 24 through the cooking zones 136-141. Circulating the air in opposite directions at a sufficiently high velocity in adjacent cooking zones inhibits the air from wanting to flow into an adjacent cooking zone at the cooking locations 152. The velocity of the air flow may be a wide variety of velocities and may be sufficiently high to inhibit air flow between adjacent cooking zones 136-141 at the cooking locations 152 above the spiral conveyor belt tiers. For example, the velocity of the air may be between about 0 meters/second (m/s) and about 20 m/s. Also, for example, the velocity of the air may be between about 0 m/s and about 10 m/s.

Referring now to FIGS. 18-23, the illustrated example of the spiral cooking device 24 includes one, illustrated example of a belt cleaning device 192 capable of cleaning the spiral conveyor belt 48. The spiral conveyor belt cleaning device 192 may be a continuous cleaning device or system capable of continuously cleaning the spiral conveyor belt 48 during operation of the spiral cooking device 24. In at least some conventional cooking devices, the cooking devices must be shut down when it is desirable to clean the conveyor belt. This shutdown results in significant shutdown time and loss of efficiency. The continuous belt cleaning device 192 of the present disclosure inhibits the need to shut down the spiral cooking device 24 in order to clean the conveyor belt 48.

In the illustrated example, the spiral conveyor belt 48 is directed into a soak bin, container or receptacle 196 containing water therein. The spiral conveyor belt 48 is submerged in the soak bin 196 for a period of time prior to further cleaning operations. Soaking the spiral conveyor belt 48 may help facilitate removal or cleaning of debris from the conveyor belt 48. The soak bin 196 has a water level 200 and a bottom of the bin is angled to facilitate draining when necessary. An overflow opening or drain 201 is defined in a side wall of the soak bin 196 and helps control the water level 200 in the soak bin 196.

In the illustrated example, the spiral conveyor belt 48 is then directed out of the soak bin 196 and past one or more sprayers or nozzles 202 configured to spray fluid onto the conveyor belt 48 upon exiting the soak bin 196. The one or more sprayers 202 may act as an initial rinse or cleaning upon exiting the soak bin 196. The spiral conveyor belt 48 is then directed through a dripping zone 203 where fluid from the sprayers 202 and any possible debris have an opportunity to fall or drop form the spiral conveyor belt prior to passing to the next cleaning process.

In the illustrated example, the spiral conveyor belt 48 is then directed between two pairs of brushes 204-207. The brushes 204-207 are configured to engage the conveyor belt 48 and brush or otherwise engage the conveyor belt 48 to loosen or dislodge debris that is positioned on the conveyor belt 48. The brushes 204-207 can have a variety of configurations and can be made of a variety of materials, and all of such possibilities are intended to be within the spirit and scope of the present disclosure. For example, the brushes 204-207 may include a flat circumference, a plurality of projections or nodules extending outward from the circumference, a plurality of bristles, or any other configuration. Additionally, for example, the brushes 204-207 (including their circumference, projections, nodules, bristles, etc.) may be made out of a wide variety of materials including, but not limited to, stainless steel, plastic, rubber, metal, composite materials, or any other material. In other examples, the spiral cooking device 24 may include other numbers of brushes such as, for example a single pair of brushes, a single brush or any number of brushes, and all of such possibilities are intended to be within the spirit and scope of the present disclosure.

In the illustrated example, the spiral conveyor belt 48 passes between the two pairs of brushes 204-207. The top brushes 204, 206 engage a first surface of the conveyor belt 48 and the bottom brushes 205, 207 engage a second surface of the conveyor belt 48 opposite the first surface. In one example, the brushes 204-207 may be driven or rotated by a motor or other actuation device. In such an example, a single motor may drive all the brushes 204-207, each brush 204-207 may be driven by its own motor or any number of motors may be utilized to drive the brushes 204-207. In other examples, the brushes 204-207 may be passive and unpowered and movement of the spiral conveyor belt 48 past the brushes 204-207 will cause the brushes 204-207 to rotate. In still other examples, the brushes 204-207 may be rigid and non-rotatable or non-movable, and provide friction or abrasion to the conveyor belt 48 as it passes between the brushes 204-207. In this example, the brushes 204-207 may act like wipers that wipe against the two surfaces of the conveyor belt 48 to dislodge debris. Returning to the illustrated example, the brushes 204-207 extend at least the width of the spiral conveyor belt 48 and in some cases wider than the spiral conveyor belt 48 to ensure the entire width of the spiral conveyor belt 48 is engaged by the brushes 204-207. In other examples, the brushes 204-207 may extend only a portion of the width of the spiral conveyor belt 48 to engage only a portion of the width of the spiral conveyor belt 48. In other examples, a plurality of linearly aligned brushes, each shorter than the width of the spiral conveyor belt 48, may be utilized together to extend a portion of the width of the conveyor belt 48, as wide as the width of the conveyor belt 48 or wider than the width of the conveyor belt 48.

A plurality of sprayers or nozzles 210-214 capable of spraying a fluid onto the spiral conveyor belt 48 are orientated adjacent to or near the spiral conveyor belt 48. In the illustrated example, a first set of upper sprayers 210 and a first set of lower sprayers 211 are oriented upstream of the first pair of brushes 204, 205 (upstream established based on the direction of movement of the spiral conveyor belt—in other words, the spiral conveyor belt passes by the first sets of upper and lower sprayers prior to the first pair of brushes). In this example, the first sets of upper and lower sprayers 210, 211 spray fluid onto the spiral conveyor belt 48 to loosen and/or dislodge debris that is on the spiral conveyor belt 48. By having the first sets of upper and lower sprayers 210, 211 upstream of the first pair of brushes 204, 205, the first sets of upper and lower sprayers 210, 211 may initially loosen and/or dislodge debris and the first pair of brushes 204, 205 may subsequently engage the spiral conveyor belt 48 to remove the debris from the spiral conveyor belt 48. In one example, the sprayers 210, 211 spray reused water (described in more detail below). In another example, the sprayers 210, 211 spray clean water from a clean water source. In a further example, the sprayers 210, 211 may spray a mixture of water and cleaning solution including, but not limited to, soap, bleach, etc. In yet another example, the sprayers 210, 211 spray air.

Returning to the illustrated example, the first sets of upper and lower sprayers 210, 211 extend at least the width of the spiral conveyor belt 48 and in some cases wider than the spiral conveyor belt 48 to ensure the entire width of the spiral conveyor belt 48 is sprayed by the first sets of upper and lower sprayers 210, 211. In other examples, the first sets of upper and lower sprayers 210, 211 may not extend the entire width of the spiral conveyor belt 48, but are capable of spraying the entire width of the spiral conveyor belt 48. In still other examples, the sprayers 210, 211 may spray at least the useable width of the conveyor belt 48. In the illustrated example, the first set of upper sprayers 210 is disposed above the spiral conveyor belt 48 or disposed above a nip 216 between the first pair of brushes 204, 205 through which the spiral conveyor belt 48 passes and the first set of lower sprayers 211 is disposed below the spiral conveyor belt 48 or disposed below the nip 216. The first set of upper sprayers 210 spray the fluid downward toward the spiral conveyor belt 48 and generally toward the nip 216. The first set of lower sprayers 211 spray the fluid upward toward the spiral conveyor belt 48 and generally toward the nip 216. In other examples, the spiral cooking device 24 may include any number of first sets of upper and lower sprayers 210, 211 arranged in any number of rows of sprayers or any other configuration. For example, sprayers may only be disposed above or below the spiral conveyor belt 48.

The spiral conveyor belt 48 then passes through the first pair of brushes 204, 205 and through the second pair of brushes 206, 207. Subsequent to passing through the second pair of brushes 206, 207, the spiral conveyor belt 48 passes through second sets of upper and lower sprayers or nozzles 212, 213. In the illustrated example, the second set of upper sprayers 212 and the second set of lower sprayers 213 are oriented downstream of the second pair of brushes 206, 207 (downstream established based on the direction of movement of the spiral conveyor belt—in other words, the spiral conveyor belt passes by the second pair of brushes prior to the second sets of upper and lower sprayers). In this example, the second sets of upper and lower sprayers 212, 213 spray fluid onto the spiral conveyor belt 48 to loosen and/or dislodge debris that is on the spiral conveyor belt 48. By having the second sets of upper and lower sprayers 212, 213 downstream of the second pair of brushes 206, 207, the second sets of upper and lower sprayers 212, 213 may loosen and/or dislodge debris that the second pair of brushes 206, 207 loosened, but did not dislodge. In one example, the sprayers 212, 213 spray reused water (described in more detail below). In another example, the sprayers 212, 213 spray clean water from a clean water source. In a further example, the sprayers 212, 213 may spray a mixture of water and cleaning solution or soap. In yet another example, the sprayers 212, 213 spray air.

Returning to the illustrated example, the second sets of upper and lower sprayers 212, 213 extend at least the width of the spiral conveyor belt 48 and in some cases wider than the spiral conveyor belt 48 to ensure the entire width of the spiral conveyor belt 48 is sprayed by the second sets of upper and lower sprayers 212, 213. In other examples, the second sets of upper and lower sprayers 212, 213 may not extend the entire width of the spiral conveyor belt 48, but are capable of spraying the entire width of the spiral conveyor belt 48. In further examples, the upper and lower sprayers 212, 213 may not extend the entire width of the conveyor belt 48, but will spray at least the useable width of the conveyor belt 48. In the illustrated example, the second set of upper sprayers 212 is disposed above the spiral conveyor belt 48 or disposed above a second nip 218 between the second pair of brushes 206, 207 through which the spiral conveyor belt 48 passes and the second set of lower sprayers 213 is disposed below the spiral conveyor belt 48 or disposed below the second nip 218. The second set of upper sprayers 212 spray the fluid downward toward the spiral conveyor belt 48 and generally toward the second nip 218. The second set of lower sprayers 213 spray the fluid upward toward the spiral conveyor belt 48 and generally toward the second nip 218. In other examples, the spiral cooking device 24 may include any number of second sets of upper and lower sprayers arranged in any number of rows of sprayers or any other configuration. For example, sprayers may only be disposed above or below the spiral conveyor belt 48.

A third set of sprayers or nozzles 214 is disposed downstream of the second sets of upper and lower sprayers 212, 213. In the illustrated example, the third set of sprayers 214 is disposed above the spiral conveyor belt 48 and sprays fluid straight down or vertical toward the spiral conveyor belt 48. In other examples, the third set of sprayers 214 may be oriented to spray fluid in any direction such as, for example, at an angle offset from vertical. In one example, the third set of sprayers 214 spray reused water (described in more detail below). In another example, the third set of sprayers 214 spray clean water from a clean water source. In a further example, the third set of sprayers 214 may spray a mixture of water and cleaning solution or soap. In yet another example, the third set of sprayers 214 spray air.

Returning to the illustrated example, the third set of sprayers 214 extends at least the width of the spiral conveyor belt 48 and in some cases wider than the spiral conveyor belt 48 to ensure the entire width of the spiral conveyor belt 48 is sprayed by the third set of sprayers 214. In other examples, the third set of sprayers 214 may not extend the entire width of the spiral conveyor belt 48, but are capable of spraying the entire width of the spiral conveyor belt 48. In further examples, the third set of sprayers 214 may not extend the width of the conveyor belt 48, but will spray at least the useable width of the conveyor belt 48. In some examples, the spiral cooking device 24 may include any number of a third set of sprayers arranged in any number of rows of sprayers or any other configuration. For example, the third set of sprayers may be disposed below the spiral conveyor belt 48 or both above and below the spiral conveyor belt 48.

The brushes and sprayers are disposed over a waste bin or container 220 which is configured to receive the sprayed fluid and any debris dislodged from the spiral conveyor belt 48. A drain or opening 224 is positioned in a bottom of the waste bin 220 to evacuate the fluid and debris from the waste bin 220. In one example, a sensor 228 may be positioned in the waste bin 220 to sense a height of fluid accumulating in the waste bin 220. If the fluid level is too high and activates the sensor 228, the sensor 228 will send data to the control member 94 of the spiral cooking device 24 to indicate a high fluid level in the waste bin 220. The control member 94 may react in a variety of manners. In one example, the control member 94 may shutdown the spiral cooking device 24. In another example, the control member 94 may activate one or more of a visual indicator 232 (e.g., an illumination device such as a light, LED, display an item on a monitor or display, etc.) and an audible indicator 236 (e.g., such as an audible alarm, bell, speaker, etc.). In a further example, the control member 94 may send data or a communication to a server, database or other electronic device where the data will be stored and/or acted upon by at least one of a person or an electronic device.

Figure 19:
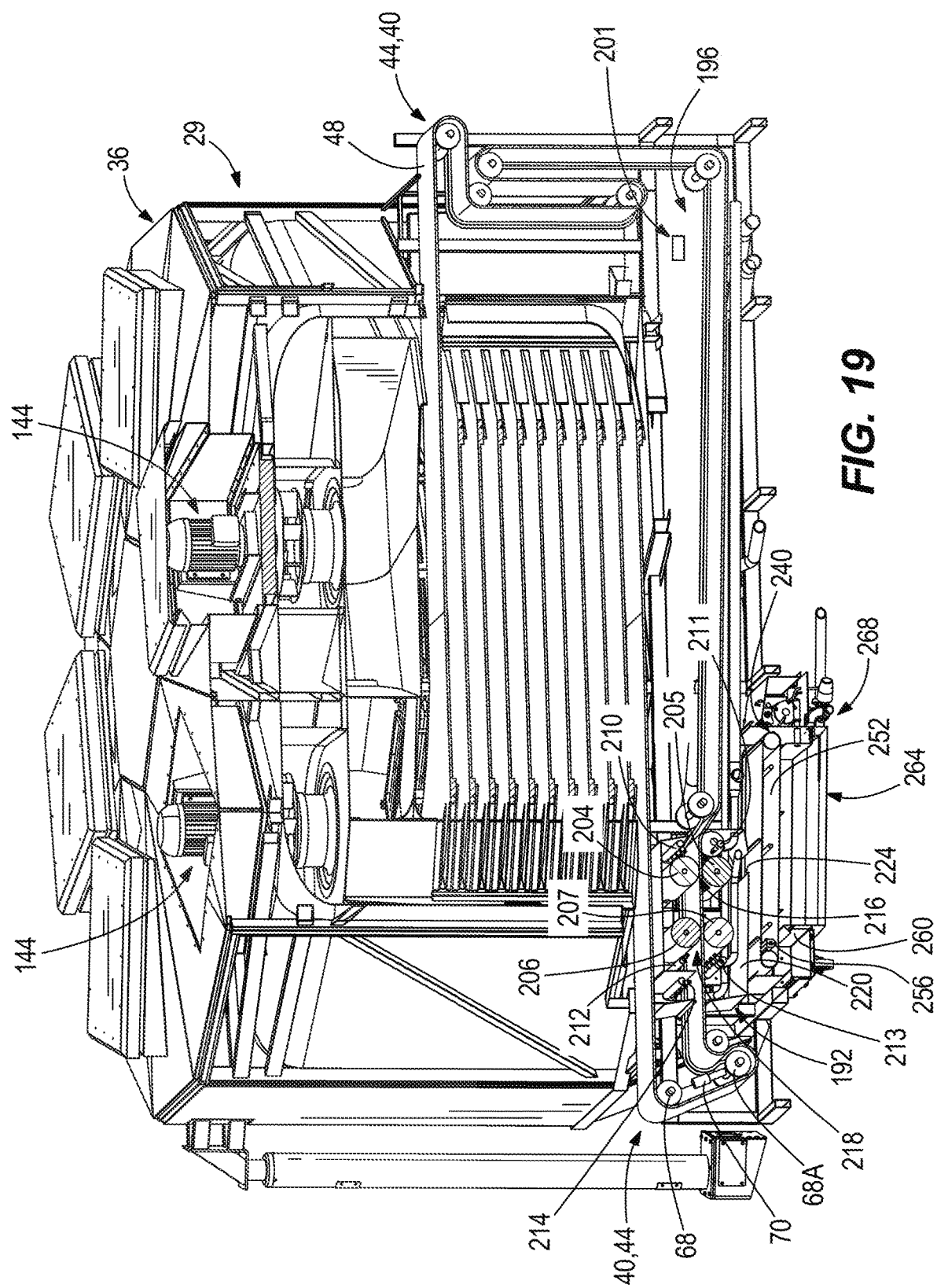
FIG. 19 is a top cross-sectional perspective view of the spiral cooking device and exemplary conveyor belt cleaning device shown in FIG. 18, according to one aspect of the present disclosure.
Figure 20:
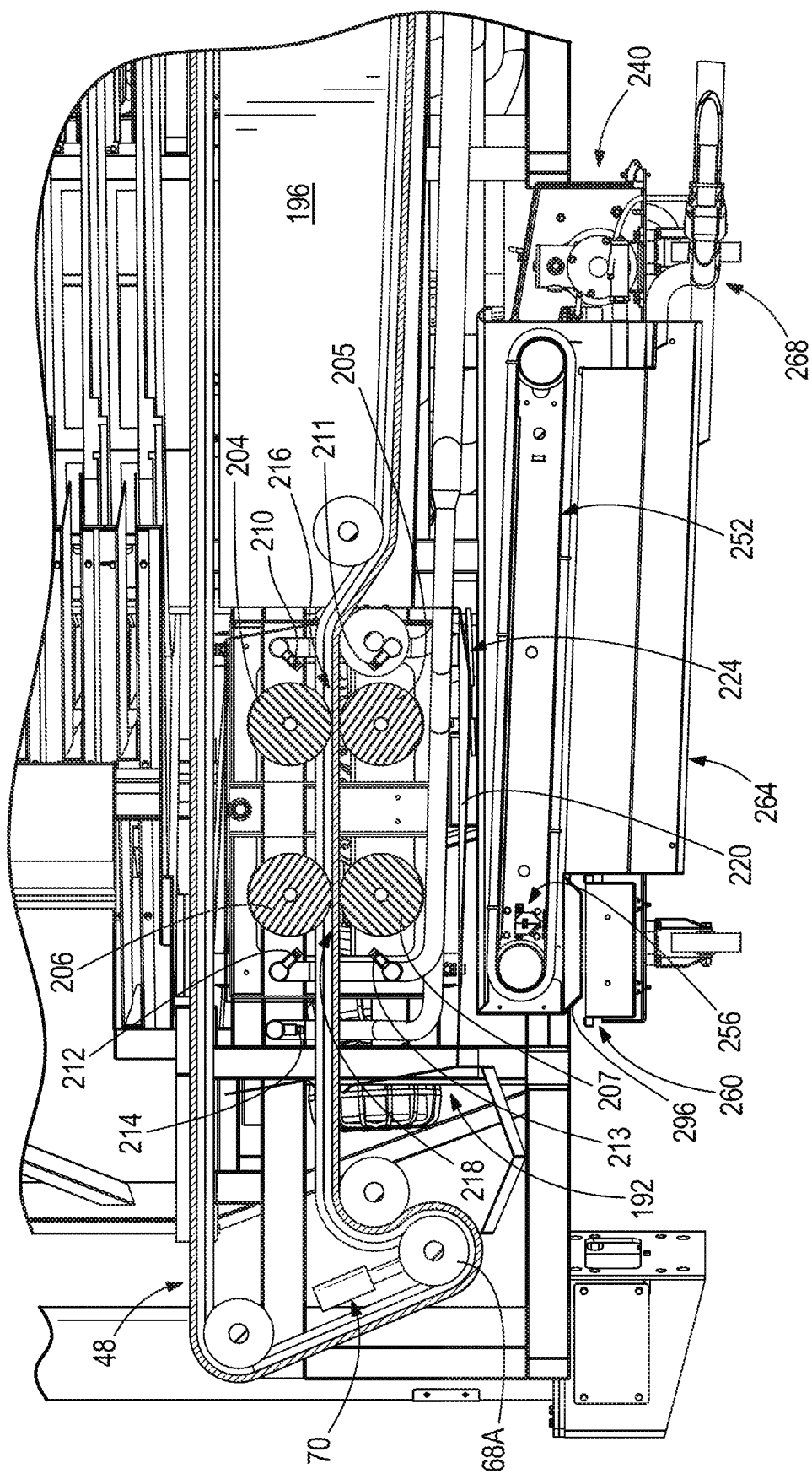
FIG. 20 is an enlarged view of a portion of the spiral cooking device and the conveyor belt cleaning device shown in FIG. 18, according to one aspect of the present disclosure.
Figure 21:
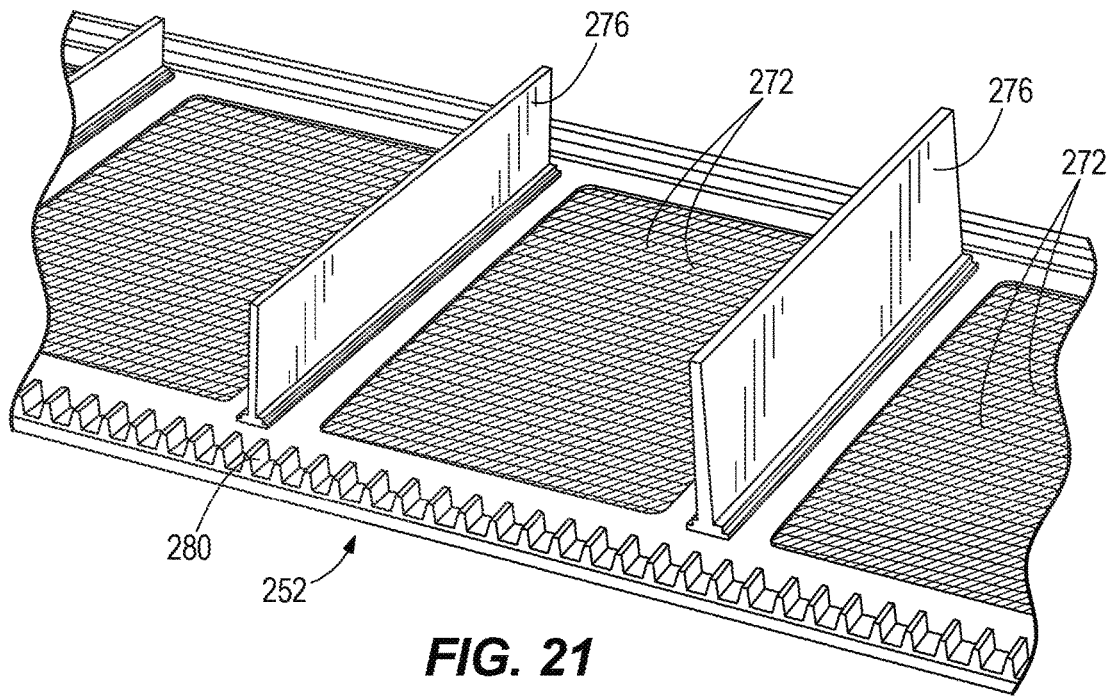
FIG. 21 is a top perspective view of a portion of one example of a filter belt of the conveyor belt cleaning device shown in FIG. 18, according to one aspect of the present disclosure.
Figure 22:
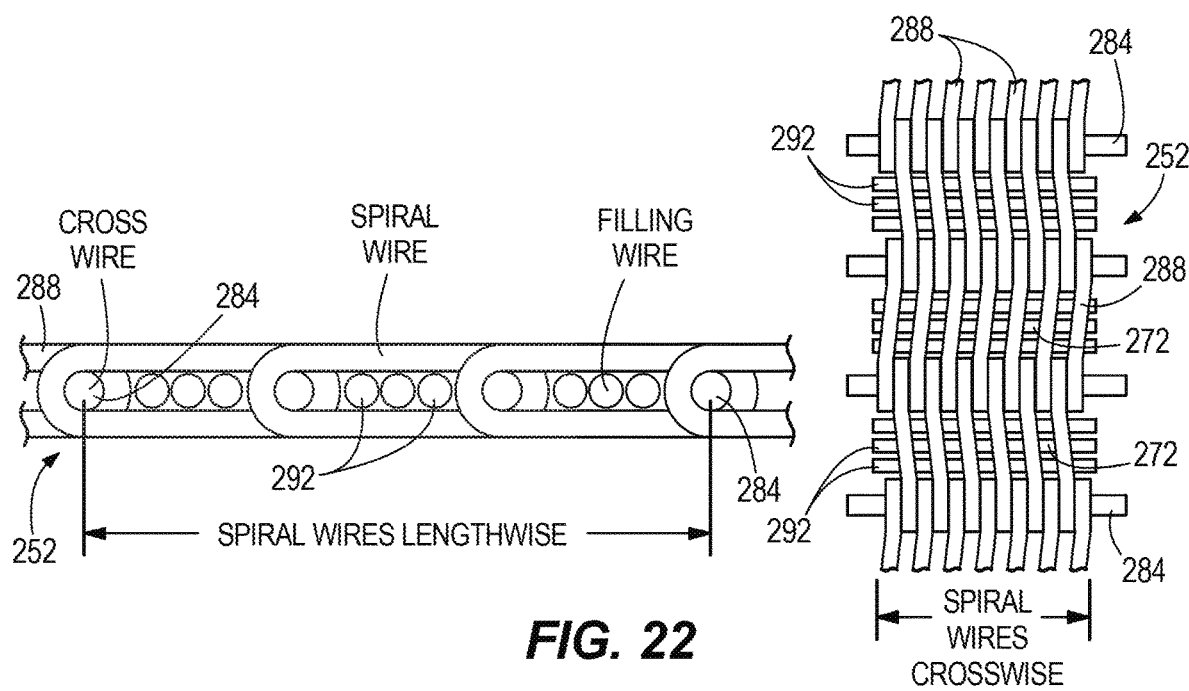
FIG. 22 includes elevational and top views of a portion of another example of a filter belt of the conveyor belt cleaning device shown in FIG. 18, according to one aspect of the present disclosure.

With continued reference to FIGS. 18-23, in one example, the cleaning device 192 also includes a filter device 240. The filter device 240 is configured to filter or separate debris from the fluid. In the illustrated example, the filter device 240 includes housing 244, a pair of rollers 248, a filter belt 252 wrapped around the rollers 248, an air knife 256, an overflow area 258, a debris bin or container 260, a fluid bin 264, an overflow of the fluid bin, and a drain 268 disposed in the fluid bin 264. At least one of the rollers 248 is driven to rotate the filter belt 252 in a counter-clockwise direction as viewed in FIGS. 18 and 20. The filter belt 252 is configured to allow fluid or a portion of the fluid therethrough while inhibiting debris from passing therethrough. In general, the filter belt 252 includes a plurality of apertures or holes 272 therein sufficiently sized to allow fluid to pass therethrough and debris to remain on the filter belt 252. The filter belt 252 is capable of having a wide variety of configurations to facilitate this filtering or separation of debris from the fluid and all of these possibilities are intended to be within the spirit and scope of the present disclosure. One example of a filter belt 252 is illustrated in FIG. 21. In this example, the filter belt 252 includes a main surface with a plurality of apertures 272 defined therein and a plurality of projections or fins 276 extending upward from the main surface. The filter belt 252 may also include engagement members 280 for engagement by a drive member (e.g., such as a drive roller) and raised edges to assist with maintaining fluid and debris on the main surface and inhibit the fluid and debris from running off edges of the filter belt 252. Another example of a filter belt 252 is illustrated in FIG. 22. In this example, the filter belt 252 is comprised of a plurality of cross wires or cross members 284, a plurality of spiral wires or spiral members 288 and a plurality of fill wires or filling members 292. The cross, spiral and fill members 284, 288, 292 are configured to provide spaces or apertures 272 in the filter belt 252 to allow fluid to pass therethrough, but maintain debris on the filter belt 252. These two examples of filter belts 252 are provided to demonstrate at least some of the principles of the present disclosure and are not intended to limit the present disclosure in any way.

With particular reference to FIGS. 19 and 20, the mixture of fluid and debris from the waste bin 220 evacuates through the drain 224 in the waste bin 220 and falls onto the filter belt 252. The apertures 272 in the filter belt 252 allow some of the fluid to pass therethrough and the debris remains on the filter belt 252 because the apertures 272 are not sufficiently large to allow the debris to pass therethrough. In the illustrated example, the filter belt 252 is non-horizontally oriented or angled offset from horizontal. This inclined or declined orientation of the filter belt 252 allows fluid to run down the filter belt 252 and over one end of the filter belt 252 into the fluid bin 264. Thus, fluid may either pass through the filter belt 252 into the fluid bin 264 or run down and over one end of the filter belt 252 into the fluid bin 264. Regarding the debris, the filter belt 252 rotates in a counter clockwise direction (as viewed in FIGS. 19 and 20) to move the debris resting there upon toward the debris bin 260. As the filter belt 252 wraps around the roller 248 and moves downward around the roller 248, the debris falls from the filter belt 252, through a chute 296 in the housing 244 and into the debris bin 260. In the event debris remains attached or engaged with the filter belt 252 (i.e., the debris does not fall from the filter belt), the air knife 256 is positioned adjacent the roller 248, and above the filter belt 252 and debris bin 260 to blow debris stuck to the filter belt 252 into the debris bin 260. In one example, the debris bin 260 is removable and replaceable to dump or otherwise dispose of the debris positioned therein.

Fluid in the fluid bin 264 may be evacuated from the fluid bin 264 through a drain 268. The drain 268 may be in fluid communication with either or both a sewer system to permanently dispose of the fluid or any number of the sprayers 210-214 in the cleaning device 192 to facilitate reuse of the fluid. In examples where the fluid is reused, at least one pump 333 (see, e.g., FIG. 35) is utilized to pump the fluid to the sprayers 210-214. The pump 333 may be switched on and off by the control member 94 as necessary to pump the reused fluid to the sprayers. The pump 333 may be any one of a variety of conventional pumps to perform this functionality and may be positioned anywhere in the spiral cooking device 24 to perform this functionality and all of such possibilities are intended to be within the spirit and scope of the present disclosure. In one example, the drain 268 is in fluid communication with the first and second sets of upper and lower sprayers 210-213 to facilitate spraying of reused fluid. In this example, the third set of sprayers 214 is in fluid communication with a clean fluid source to spray clean fluid.

In one example, a sensor may be positioned in the fluid bin 264 to sense a height of fluid accumulating in the fluid bin 264. If the fluid level is too high and activates the sensor, the sensor will send data to the control member 94 of the spiral cooking device 24 to indicate a high fluid level in the fluid bin 264. The control member 94 may react in a variety of manners. In one example, the control member 94 may shutdown the spiral cooking device 24. In another example, the control member 94 may activate one or more of a visual indicator 232 (e.g., an illumination device such as a light, LED, display an item on a monitor or display, etc.) and an audible indicator 236 (e.g., such as an audible alarm, bell, speaker, etc.). In a further example, the control member 94 may send data or a communication to a server, database or other electronic device where the data will be stored and/or acted upon by at least one of a person or an electronic device.

In one example, the filter device 240 may be operated continuously. In another example, the filter device 240 may be operated intermittently in a controlled manner. In this example, the filter device 240 is operated intermittently to improve efficiency of the spiral cooking device 24. The filter device 240 may be in electrical communication with the control member 94, which may control operation of the filter device 240 based on the cooking operation of the spiral cooking device 24. For example, the filter device 240 may be controlled in one manner when the spiral cooking device 24 is performing a first cooking operation (e.g., when cooking a first type of food product) and may be controlled in a different manner when the spiral cooking device 24 is performing a second cooking operation (e.g., when cooking a second type of food product). The filter device 240 may be controlled in a wide variety of manners based on a wide variety of variables (e.g., type of food product being cooked, length of cooking time, number of tiers of spiral conveyor belt 48, humidity in the spiral cooking device 24, temperature in the spiral cooking device 24, speed of the spiral conveyor belt 48, etc.). In such intermittent, controlled operation, power or energy is not being utilized by the rotation of the filter belt 252 or by the air knife 256.

Figure 46:
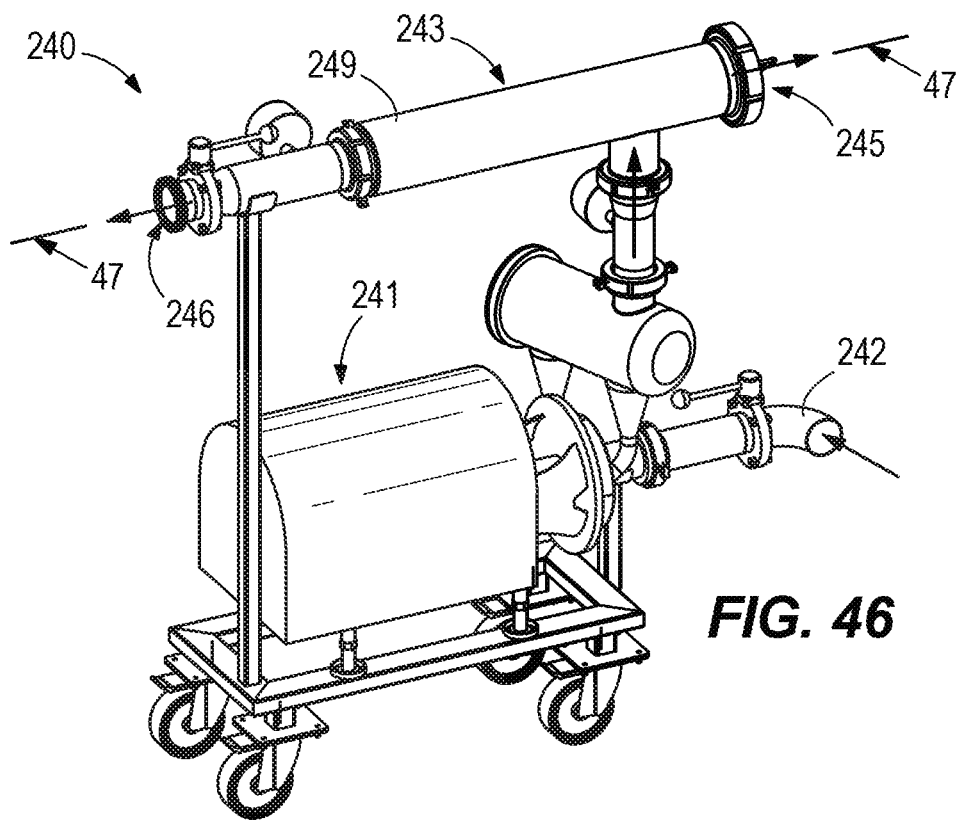
FIG. 46 is a perspective view of another example of a filter device useable with a belt cleaning device, according to one aspect of the present disclosure.
Figure 47:
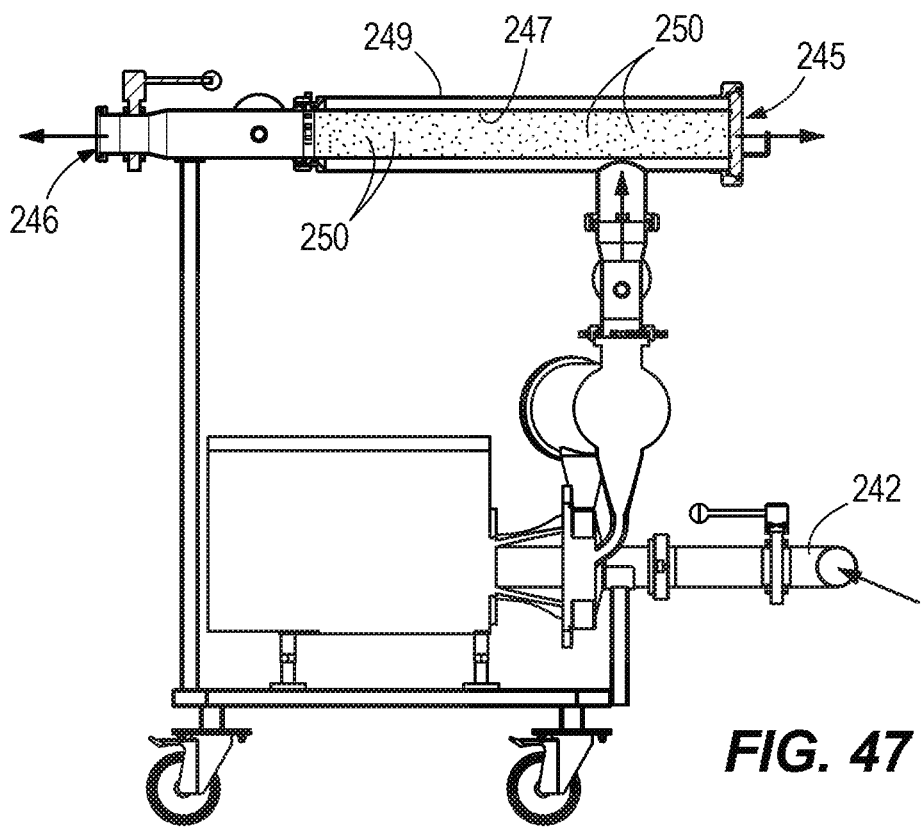
FIG. 47 is a cross-sectional view taken along line 47-47 in FIG. 46, according to one aspect of the present disclosure.

With reference to FIGS. 46 and 47, another example of a filter device is illustrated. This filter device 240 may be used in combination with any of the other filter devices disclosed herein or in place of the other filter devices. In examples where the filter device 240 illustrated in FIGS. 46 and 47 is used in combination with other filter devices, the filter device 240 may receive filtered fluid from the other filter devices and perform a further filtering process. In examples where the filter device 240 illustrated in FIGS. 46 and 47 is used in place of or instead of the other filter devices, the filter device 240 performs the primary filtering process.

Figure 18:
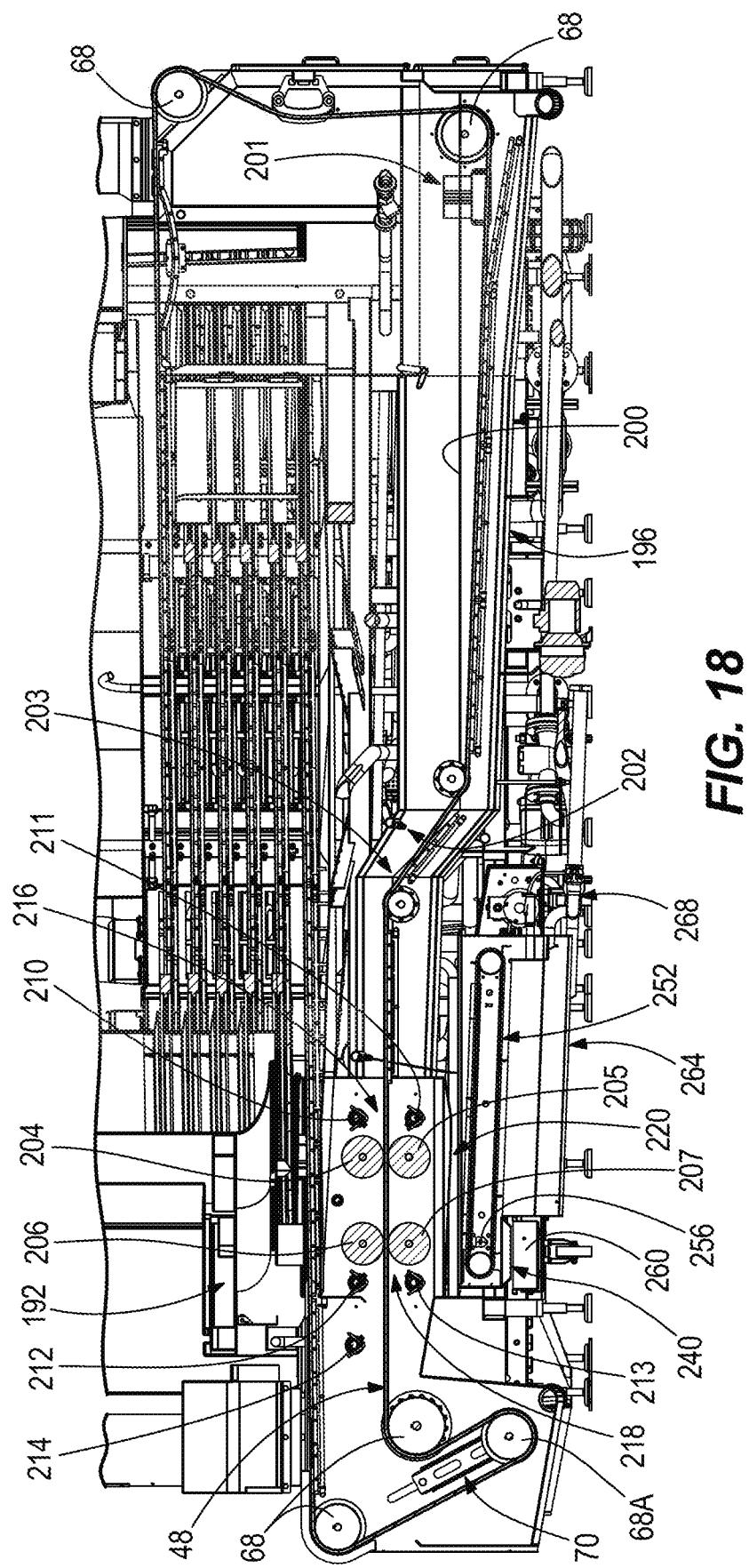
FIG. 18 is an elevational cross-sectional view of a portion of the spiral cooking device shown in FIG. 2 including one example of a conveyor belt cleaning device, according to one aspect of the present disclosure.

With continued reference to FIGS. 46 and 47, the filter device 240 includes a pump 241 for pumping a combination of fluid and debris that resulted from the conveyor belt cleaning process performed by the conveyor belt cleaning device 192 (see FIGS. 18-20). The combination of fluid and debris is pumped into the filter device 240 via an inlet 242 and upward into a filter element or sieve element 243. The filter element 243 is configured to separate debris from the fluid such that debris is transported out of the filter element 243 in one direction via a debris outlet 245 and filtered fluid is transported out of the filter element 243 in a second direction via a fluid outlet 246. In the illustrated example, the filter element 243 includes an inner pipe 247 and an outer pipe 249 having a larger size or diameter than the inner pipe 247 and surrounding the inner pipe 247. In one example, the inner and outer pipes 247, 249 may be concentrically oriented relative to each other. In the illustrated example, the inner pipe 247 includes a plurality of apertures 250 defined therethrough. The combination of fluid and debris are introduced into the inner pipe 247, the plurality of apertures 250 are sufficiently sized to allow fluid to pass therethrough, but inhibit debris of a size larger than the apertures 250 from passing through the apertures 250. The debris remains in the inner pipe 247 and is transported or pumped out of the filter element 243 via the debris outlet 245. The fluid that passes through the apertures 250 is transported or pumped into the outer pipe 249 and transported or pumped out of the filter element 243 via the fluid outlet 246. It should be understood that the plurality of apertures 250 may have any size, shape and configuration and all of such possibilities are intended to be within the spirit and scope of the present disclosure.

In some examples, a plurality of filter devices 240 illustrated in FIGS. 46 and 47 may be used in conjunction with each other to filter the combination fluid and debris resulting from the conveyor cleaning process. In such examples, the plurality of filter devices 240 may be coupled in series with one another. Filtered fluid exiting a fluid outlet 246 of a first filtering device may be pumped or transported to an inlet 242 of a second filtering device, and so on for as many filter devices 240 that are used in conjunction. In one example, the apertures 250 in an inner pipe 247 of the first filtering device 240 in the series may have a first size, the apertures 250 in an inner pipe 247 of the second filtering device 240 may have a second size, and so on for as many filtering devices 240 that are used in conjunction. In one example, the first size may be larger than the second size, the second size may be larger than a third size, and so on for as many filter devices 240 that are used in conjunction. In such an example, the size of the apertures decrease in size from the first filter device 240 in the series to the last filter device 240 in the series.

Figure 23:
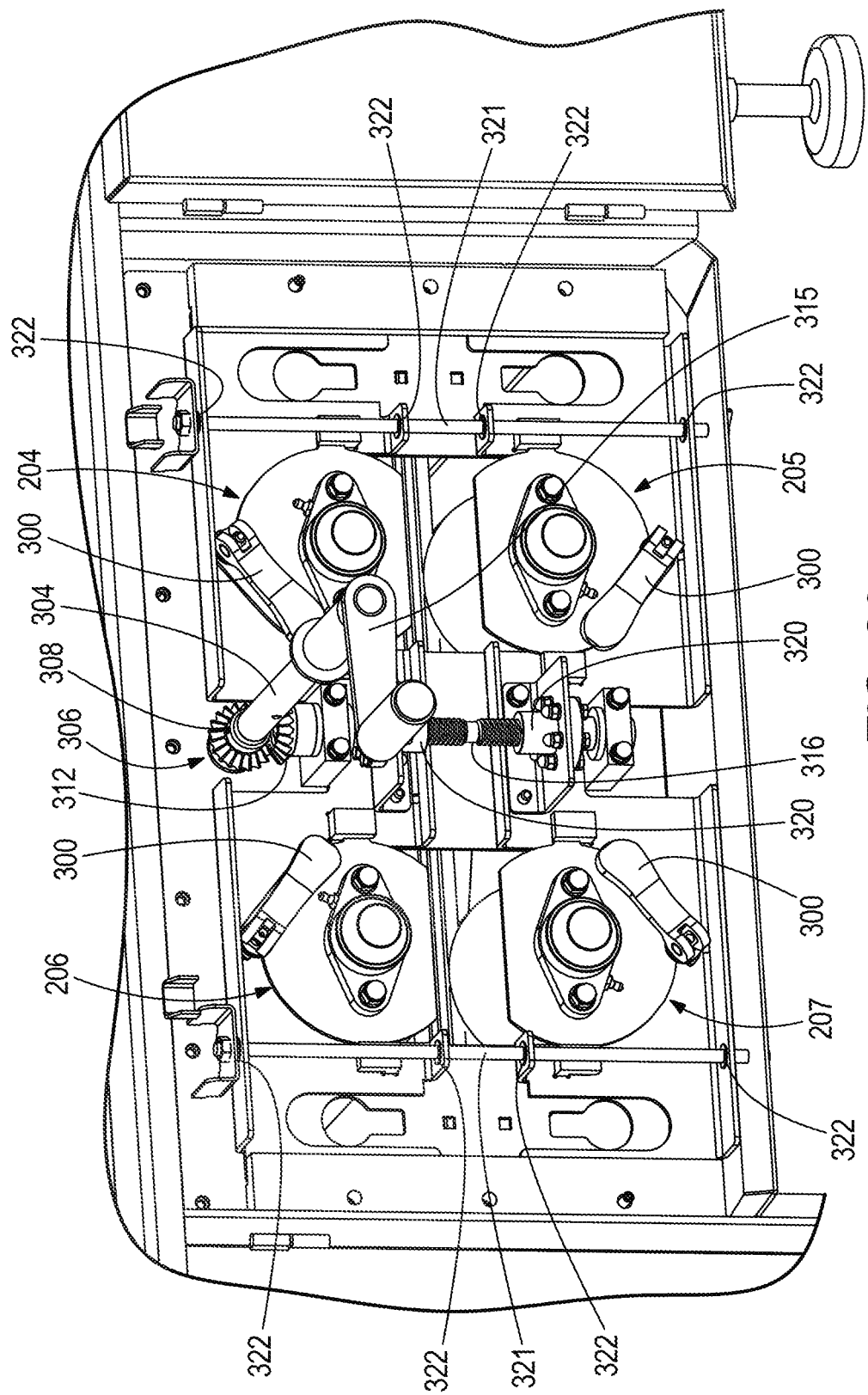
FIG. 23 is a top perspective view of a portion of the conveyor cleaning device shown in FIG. 18 including one example of brushes and one example of a mechanism for moving the brushes, according to one aspect of the present disclosure.

Referring now to FIG. 23, in one example, the plurality of brushes 204-207 may be moved relative to the spiral conveyor belt 48. The brushes 204-207 may be moved for a variety of reasons including, but not limited to, wear of the brushes 204-207, removal and/or replacement of the spiral conveyor belt 48, removal and/or replacement of the brushes 204-207, or a variety of other reasons. In one example, the brushes 204-207 may be moved manually. This example is illustrated in FIG. 23. Each brush 204-207 is associated with a lever or lock 300 that may be actuated manually to selectively secure or unsecure the associated brush 204-207 from movement relative to the spiral cooking device 24. With the locks 300 actuated or moved to an unsecured condition, the brushes 204-207 may be manually moved toward or away from the conveyor belt 48 as desired.

In one example, an individual may engage a tool 315 (see FIG. 23) with an engagement member 304 of a brush positioning device 306 and rotate the tool (e.g., a hand rotated tool, a power drill, etc.) to rotate the engagement member 304. The engagement member 304 is coupled to a first gear 308, which meshes with a second gear 312 to convert horizontal rotation to vertical rotation. The first gear 308 is rotated by rotation of the engagement member 304 which then causes the second gear 312 to rotate. A threaded shaft 316 is rigidly coupled to the second gear 312 and rotates with the second gear 312. A pair of complementary threaded members 320 threadably engage the threaded shaft 316 and move along the threaded shaft 316 in either direction depending on the direction of rotation of the threaded shaft 316. The upper threaded member 320 is coupled to the upper brushes 204, 206 and the lower threaded member 320 is coupled to the lower brushes 205, 207. Vertical movement of the threaded members 320 results in vertical movement of the associated brushes 204-207. In the illustrated example, a pair of rods 321 are provided to inhibit tilting of the brushes 204-207 as they move vertically. A respective one of the rods 321 extends through vertically aligned apertures 322 associated with the brushes 204-207 with each brush 204-207 including a pair of apertures 322. As the brushes 204-207 move vertically, the brushes 204-207 slide along the respective rod 321 via the apertures 322. In this example, the upper and lower brushes 204-207 move simultaneously. The brushes 204-207 are then secured in place by actuating the locks 300 to a locked condition. This example is only one example of the variety of different manners of moving the brushes 204-207 relative to the spiral conveyor belt 48 and is not intended to be limiting upon the present disclosure. Rather, all of such possibilities are intended to be within the spirit and scope of the present disclosure.

In another example, the brushes 204-207 are moved individually. In a further example, associated upper brushes 204, 206 may be moved together and lower brushes 205, 207 may be moved together.

In one possible scenario, the brushes 204-207 wear down over time and the bristles or other projections thereon are worn shorter. Thus, in order to prolong the life of the brushes 204-207, the brushes 204-207 are moved toward the spiral conveyor belt 48 to reengage the shorted bristles or projections with the spiral conveyor belt 48 in a desired manner.

Figure 40:
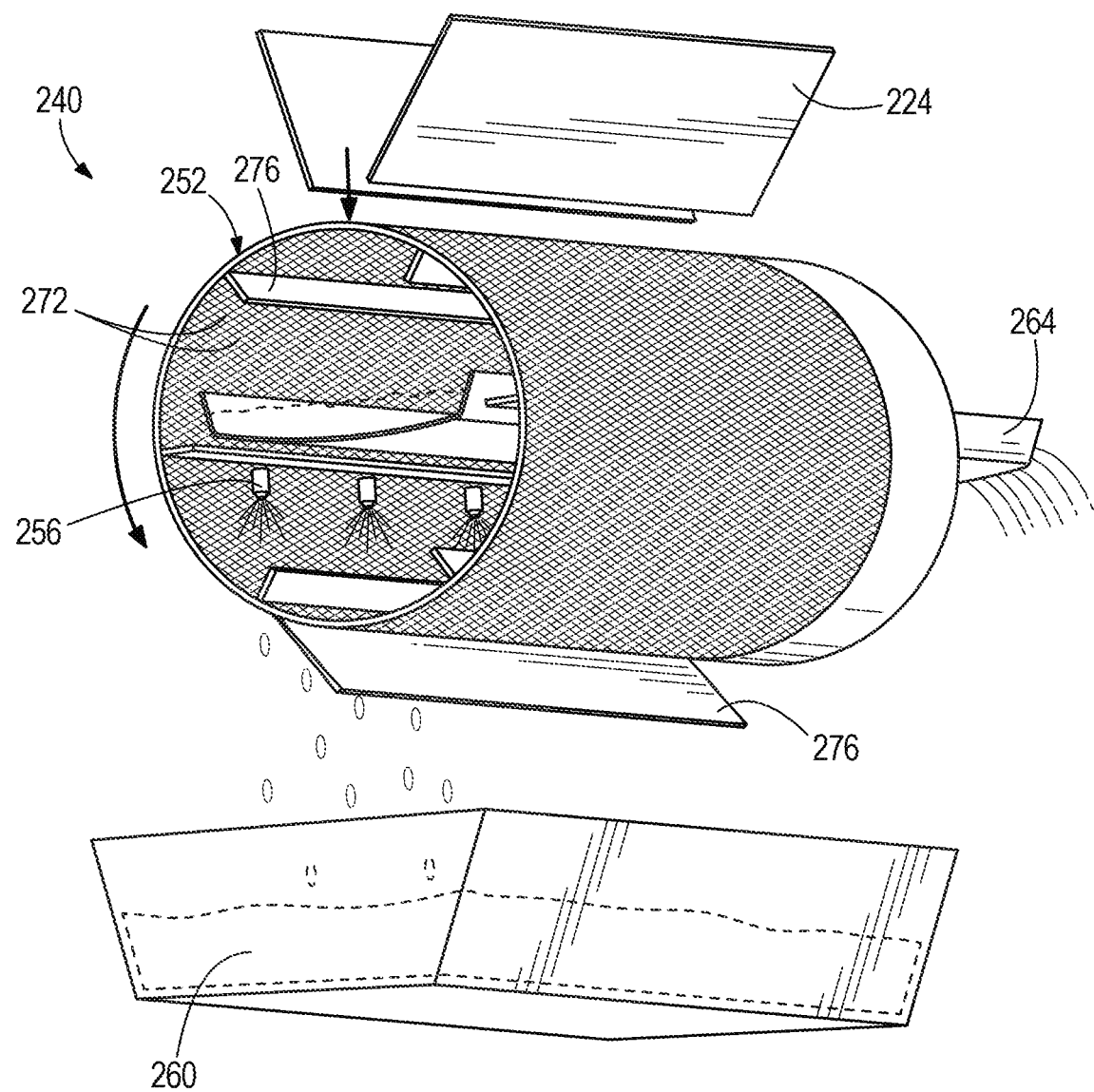
FIG. 40 is a perspective view of another example of a filter device useable with a belt cleaning device, according to one aspect of the present disclosure.

With reference to FIG. 40, another example of a filter device 240 for the belt cleaning device 192 is illustrated. In this example, the combination of fluid and debris evacuating the waste bin 220 via the drain 224 falls onto the filter belt 252. In this example, the filter belt 252 is configured into a cylindrical drum and includes fins 276 on an exterior thereof. The filter belt 252 includes apertures 272 through which fluid may pass. Debris remains on the filter belt 252 since the apertures 272 are too small to all the debris to pass therethrough. As the filter belt 252 rotates, the debris falls from the filter belt 252 into a debris bin 260. The filter device 240 in this example also includes an air knife 256 to assist with dislodging any debris that may not have fallen from the filter belt 252. Fluid that passes through the filter belt 252 is captured by a fluid bin or fluid tray 264, which is angled or otherwise configured to convey fluid away from the filter device 240. The fluid may be pumped from the fluid bin 264 for reuse and spraying by any number of the sprayers 210-214 or the liquid may be transported to a sewer.

Figure 24A:
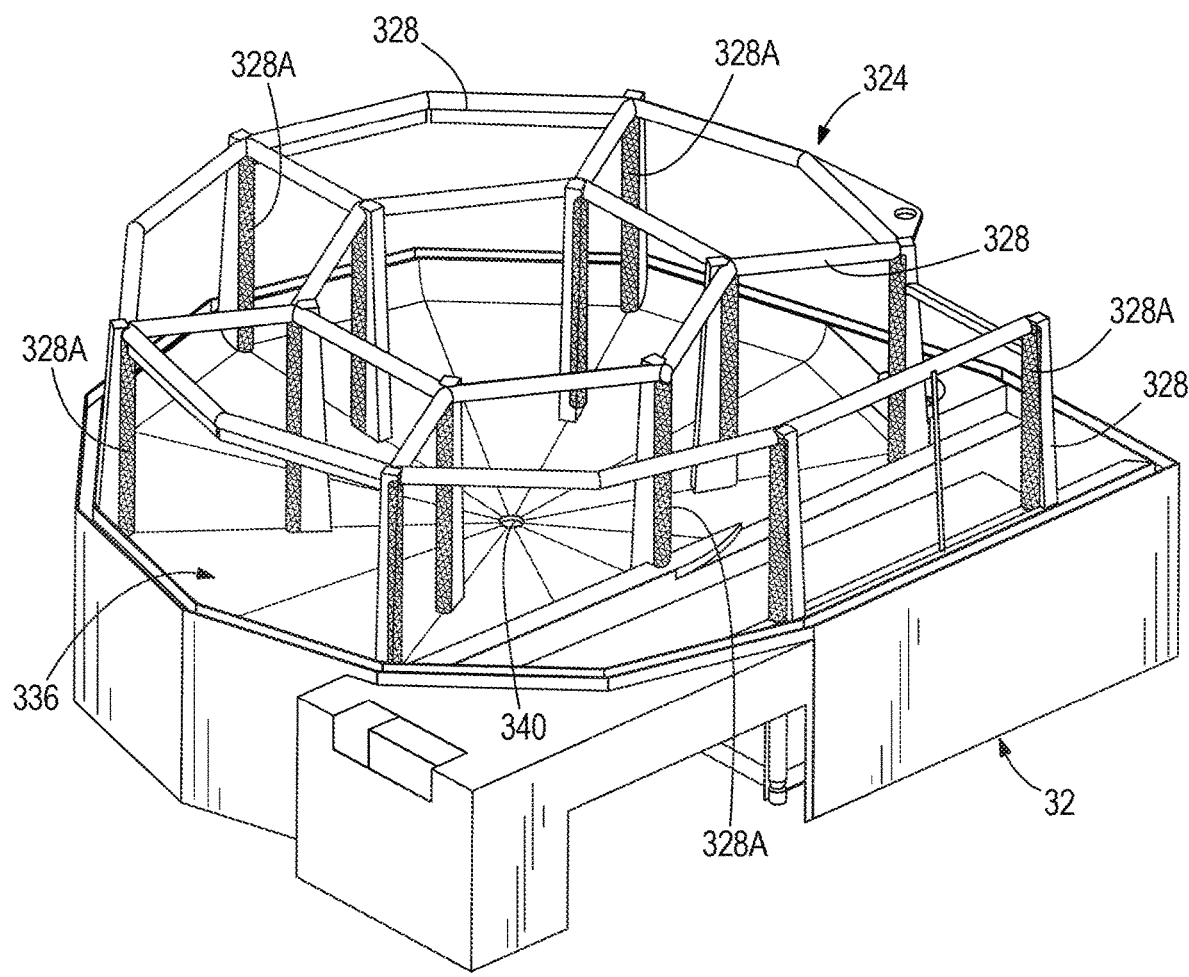
FIG. 24A is a schematic top, front perspective view of a portion of the spiral cooking device shown in FIG. 2 including one example of a base, one example of a frame and one example of a cooker cleaning device, according to one aspect of the present disclosure.
Figure 24B:
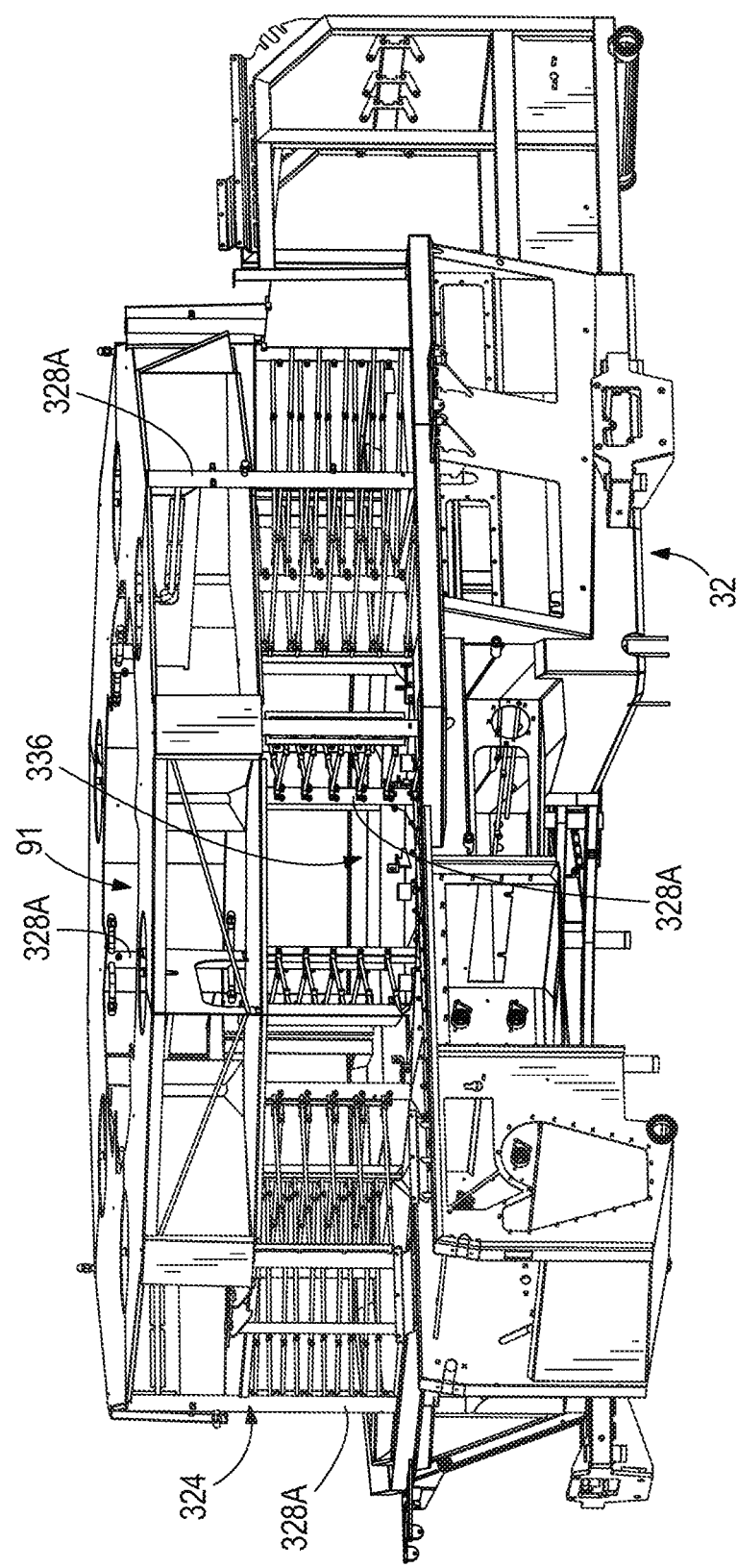
FIG. 24B is a top, front perspective view of the spiral cooking device shown in FIG. 2 with various components removed to illustrate internal components of the spiral cooking device, this figure including a more detailed representation of the frame and the cooker cleaning device shown in FIG. 24A, according to one aspect of the present disclosure.
Figure 25A:
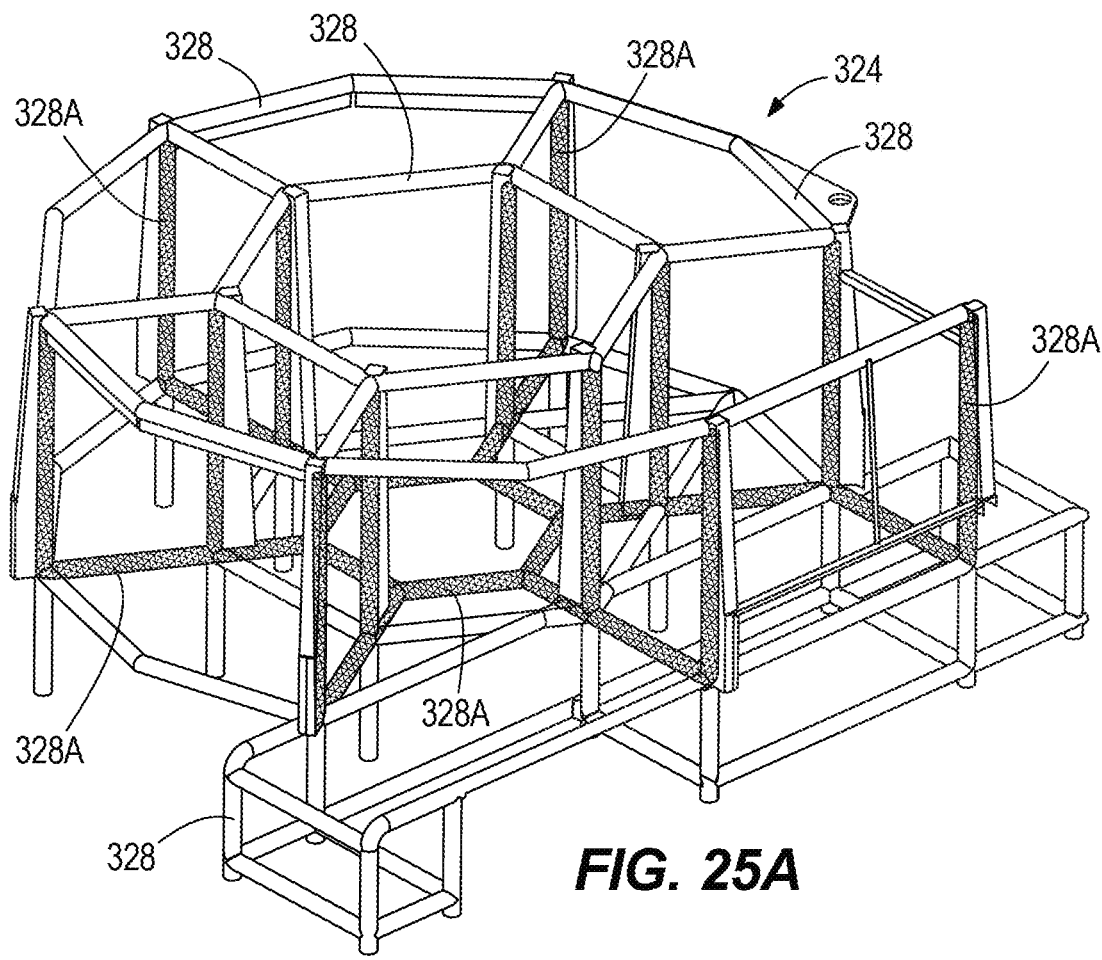
FIG. 25A is a schematic top, front perspective view of the exemplary schematic frame shown in FIG. 24A including integrated water pipes of the cooker cleaning device and support pipes of the frame, according to one aspect of the present disclosure.
Figure 25B:
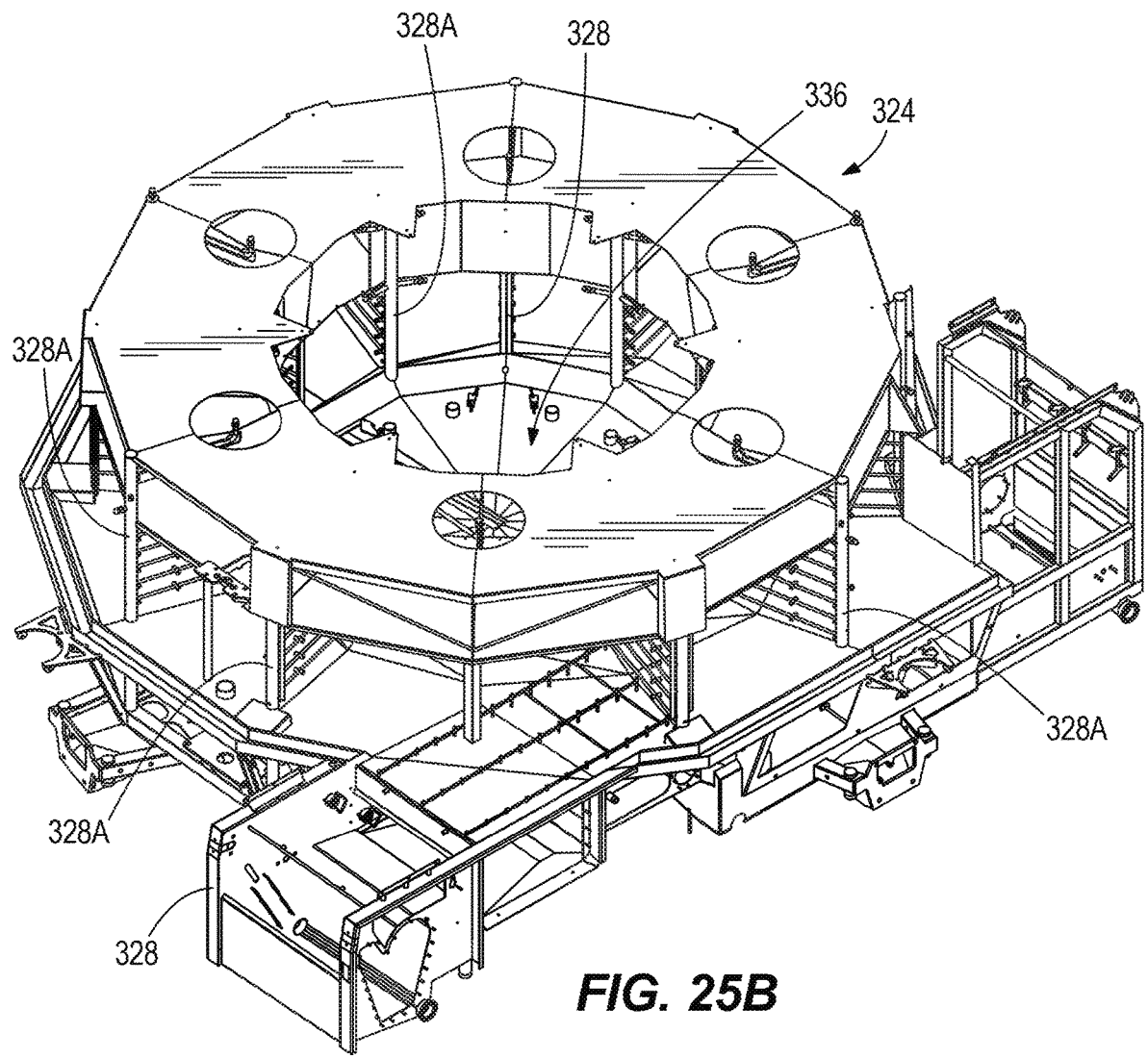
FIG. 25B is a top, front perspective view of the spiral cooking device shown in FIG. 2 with various components removed to illustrate internal components of the spiral cooking device, this figure including a more detailed representation of the integrated water pipes of the cooker cleaning device and support pipes of the frame shown in FIG. 25A, according to one aspect of the present disclosure.

Referring now to FIGS. 24 and 25, the spiral cooking device 24 includes a frame 324 for providing support and rigidity to the spiral cooking device 24 and its components. The frame 324 is coupled to the housing 29 and/or the base 32 and the hood 36. In one example, the frame 324 is comprised of a plurality of interconnected pipes 328. Such pipes 328 may be connected in a variety of manners including, but not limited to, welding, unitarily formed as one-piece, etc. The spiral cooking device 24 includes a cooker cleaning device 332 (or clean-in-place device) capable of cleaning an interior of the spiral cooking device 24. The cleaning device 332 requires a supply of clean water or, in some instances, a combination of water and cleaning solution. The cleaning device 232 may include a plurality of sprayers or nozzles disposed at or near a top of the spiral cooking device 24 within the hood 36. One example of such sprayers can be found in U.S. Pat. No. 9,161,651, issued Oct. 20, 2015, which is incorporated by reference herein.

In one example, the cleaning device 332 includes a plurality of cleaning zones and each cleaning zone includes at least one sprayer. In this example, the control member 94 selectively controls sprayers and associated pump or pumps to intermittently or consecutively clean the cleaning zones. In other words, not all of the cleaning zones are cleaned simultaneously. Instead, one or more of the cleaning zones are cleaned, then after completion of cleaning of these initial cleaning zone(s), subsequent one or more cleaning zones are cleaned. This continues until all the cleaning zones are cleaned. The cleaning device 332 is configured to clean any number of the cleaning zones simultaneously. In one example, the cleaning device 332 may include a sensor at each sprayer to detect a blockage or otherwise drop in flow. In this example, the sensor(s) is in electrical communication with the control member 94 such that the control member 94 can immediately detect a blockage and take appropriate action such as, for example, shutdown the cleaning device 332, illuminate a visual indicator 232, activate an audible indicator 236, transmit data to another device related to the sensed blockage, or any combination of these or other alternatives.

Conventional cooking devices may include a frame comprised of a plurality of coupled pipes that provides the necessary support and structure to the cooking device and a cooker cleaning device separate from the frame. Such a cooker cleaning device of a convention cooking device may include its own pipes separate from the pipes of the frame for providing water or a combination water and cleaning solution to sprayers of the cooker cleaning device. In the illustrated example of the present disclosure, the spiral cooking device 24 utilizes at least some of the pipes 328A of the frame 324 to convey or transport water or a combination of water and cleaning solution to the sprayers of the cleaning device 332. Thus, in the illustrated example, the frame 324 is part of or included in the cleaning device 332 of the spiral cooking device 24. In this example, the pipes 328A of the frame 324 utilized to transport water or a combination of water and cleaning solution to the sprayers are hollow and made of appropriate material to transport water or a combination of water and cleaning solution and provide the necessary strength to support the cooking device 24. Accordingly, at least some of the pipes 328A both provide structural support to the spiral cooking device 24 and allow water or a combination of water and cleaning solution to transport therethrough to the sprayers for cleaning purposes. The integrated pipes 328A that are both part of the frame 324 for providing structural support and used to transport water or a combination of water and cleaning solution therethrough may be any size and shape. In one example, the integrated pipes 328A may have an inner diameter of about 50 millimeters. It should be understood that this cleaning device 332 with integrated frame 324 and water supply pipes 328A may be used in a wide variety of applications other than just spiral cooking devices 24 such as, for example, fryers, linear ovens, mixers, among others. Thus, the application of this cleaning device 332 to any other appropriate application is intended to be within the spirit and scope of the present disclosure.

Figure 26B:
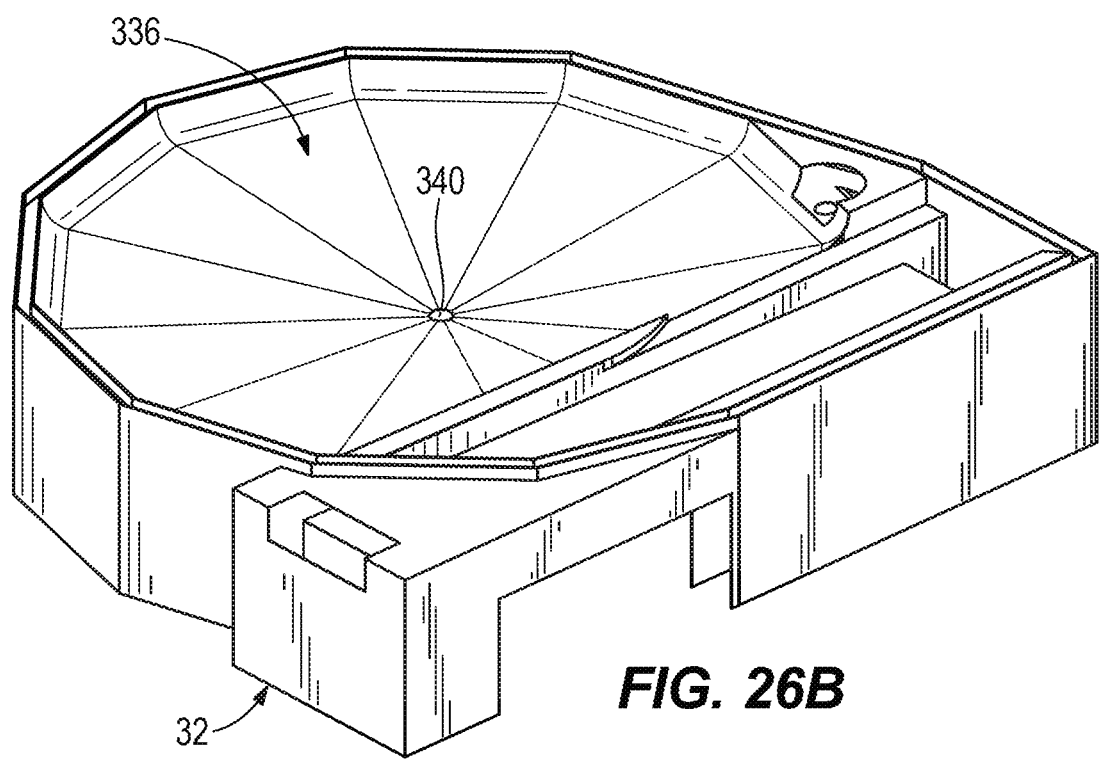
FIG. 26B is a top, front perspective view of another example of a base of a spiral cooking device including another example of a drain and another example of a sloped basin sloped toward the drain, according to one aspect of the present disclosure.
Figure 26A:
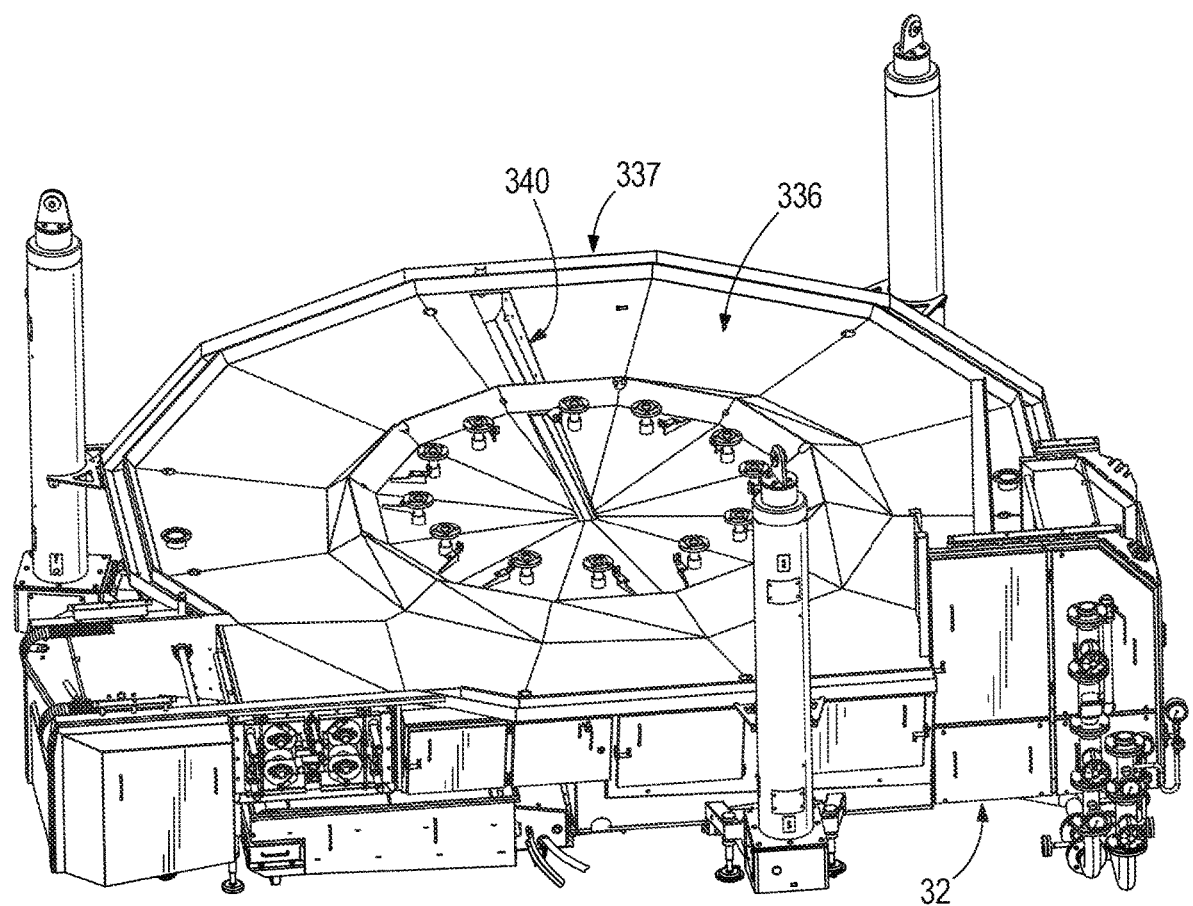
FIG. 26A is a top, front perspective view of one example of a base of the spiral cooking device shown in FIG. 2 including one example of a drain and one example of a sloped basin sloped toward the drain, according to one aspect of the present disclosure.

With continued reference to FIG. 24A and additional reference to FIG. 26A, in one example, the spiral cooking device 24 includes a base 32 having a basin 336 defined therein for capturing water or a combination of water and cleaning solution dispensed by the cleaning device 332 and directing such captured water or combination to a drain 340 defined in the basin 336. In one example, the basin 336 includes a dike or wall 337 and is sloped or angled downward toward the drain 340 to ensure the captured water or combination water and cleaning solution is appropriately directed toward the drain 340. Also, in this example, the drain 340 is elongated and extends from a center of the basin 336 to the wall 337 and slopes downward from the center of the basin 336 to the wall 337. In another example, with reference to FIG. 26B, the drain 340 may be substantially circular in shape and centrally located in the basin 336. In this example, the basin 336 may equally slope around the centrally located drain 340 toward the central drain 340. In other examples, the drain may be defined in the basin at other locations and the basin may slope in different manners toward the alternatively located drain. It should be understood that the drain may be located anywhere within the basin and the basin may slope or angle downward toward the drain in any manner, and all of such possibilities are intended to be within the spirit and scope of the present disclosure.

Figure 27:
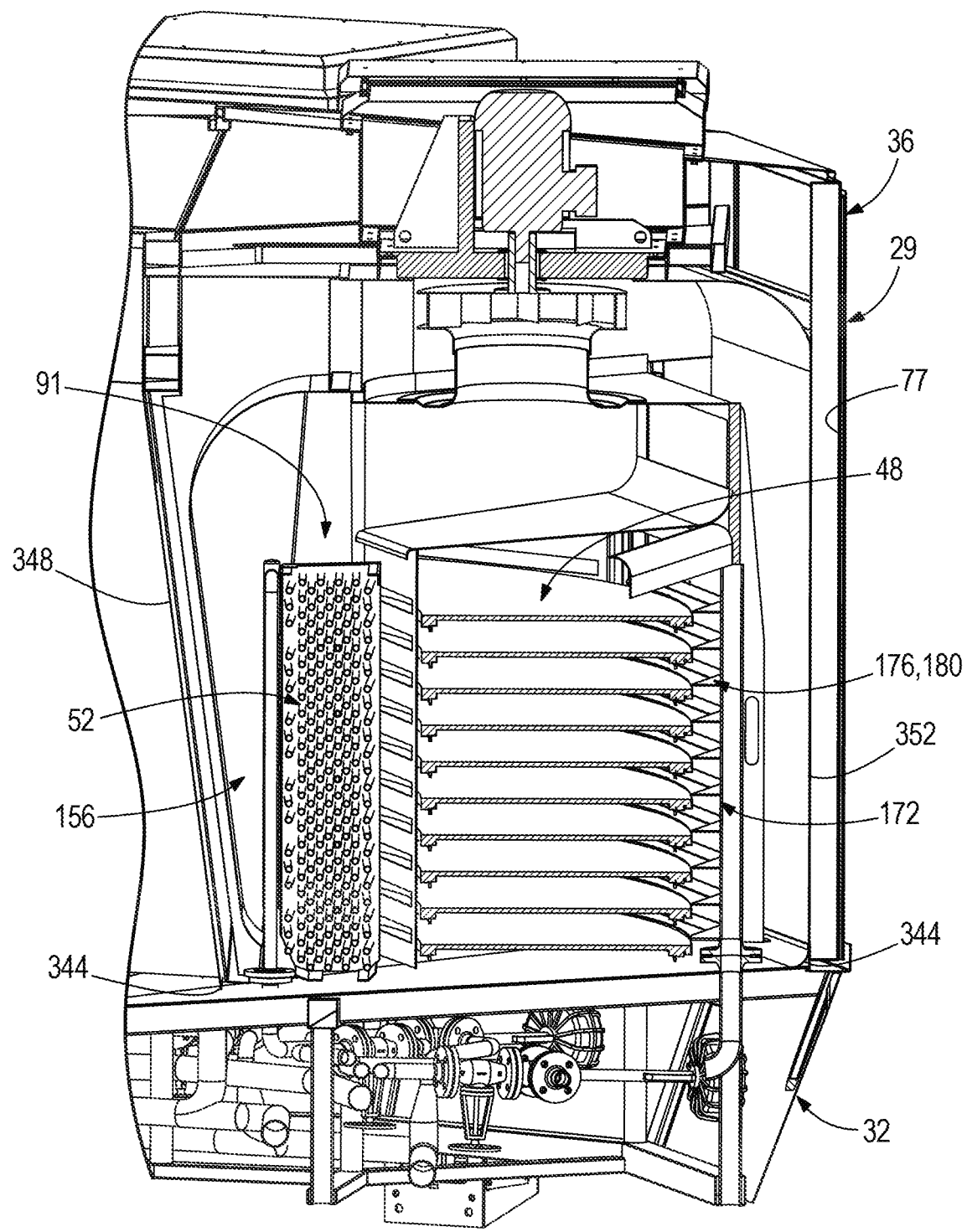
FIG. 27 is a top, perspective view of a portion of a spiral cooking device including one example of an interior wall and an exterior wall contacting a base of the spiral cooking device to provide one example of a seal, according to one aspect of the present disclosure.
Figure 28:
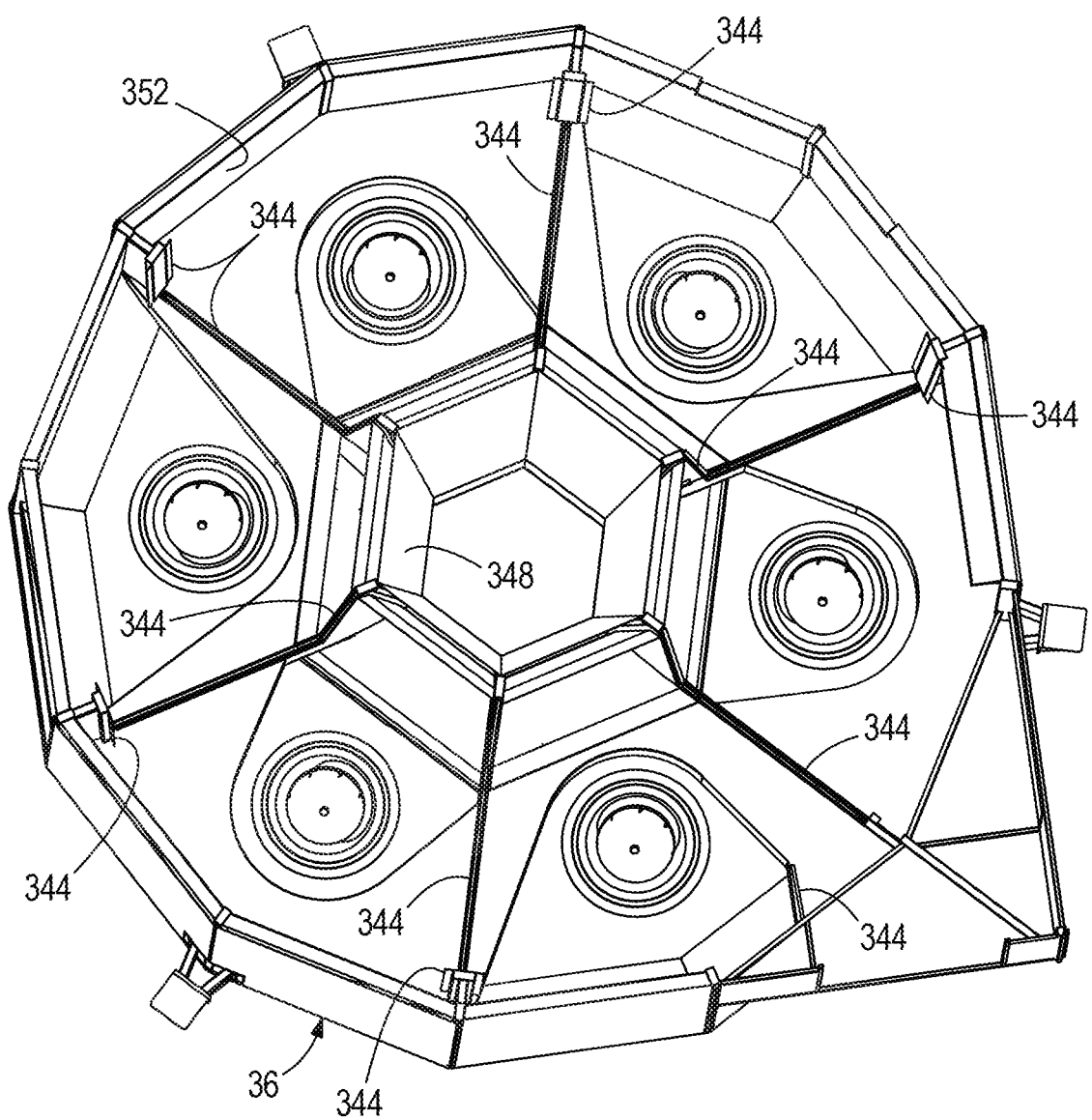
FIG. 28 is a bottom perspective view of an underside or interior of the hood of the spiral cooking device shown in FIG. 27 including one example of engagement members for providing a seal between the hood and other components of the spiral cooking device, according to one aspect of the present disclosure.
Figure 28B:
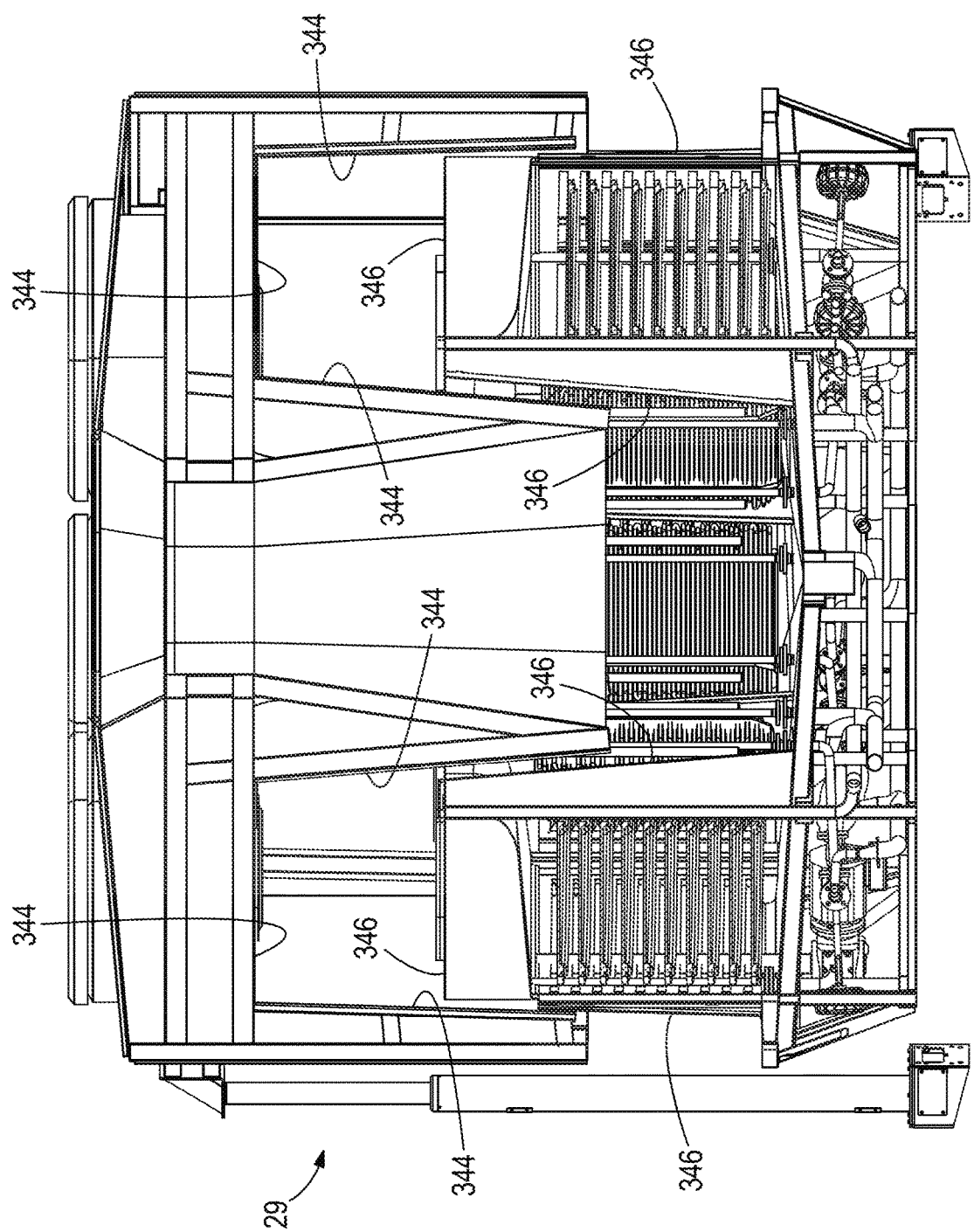
FIG. 28B is an elevational cross-sectional view similar to FIG. 28A except the hood of the spiral cooking device is at least partially raised relative to a substructure of the spiral cooking device with the engagement members of the hood and the substructure emphasized, according to one aspect of the present disclosure.
Figure 28C:
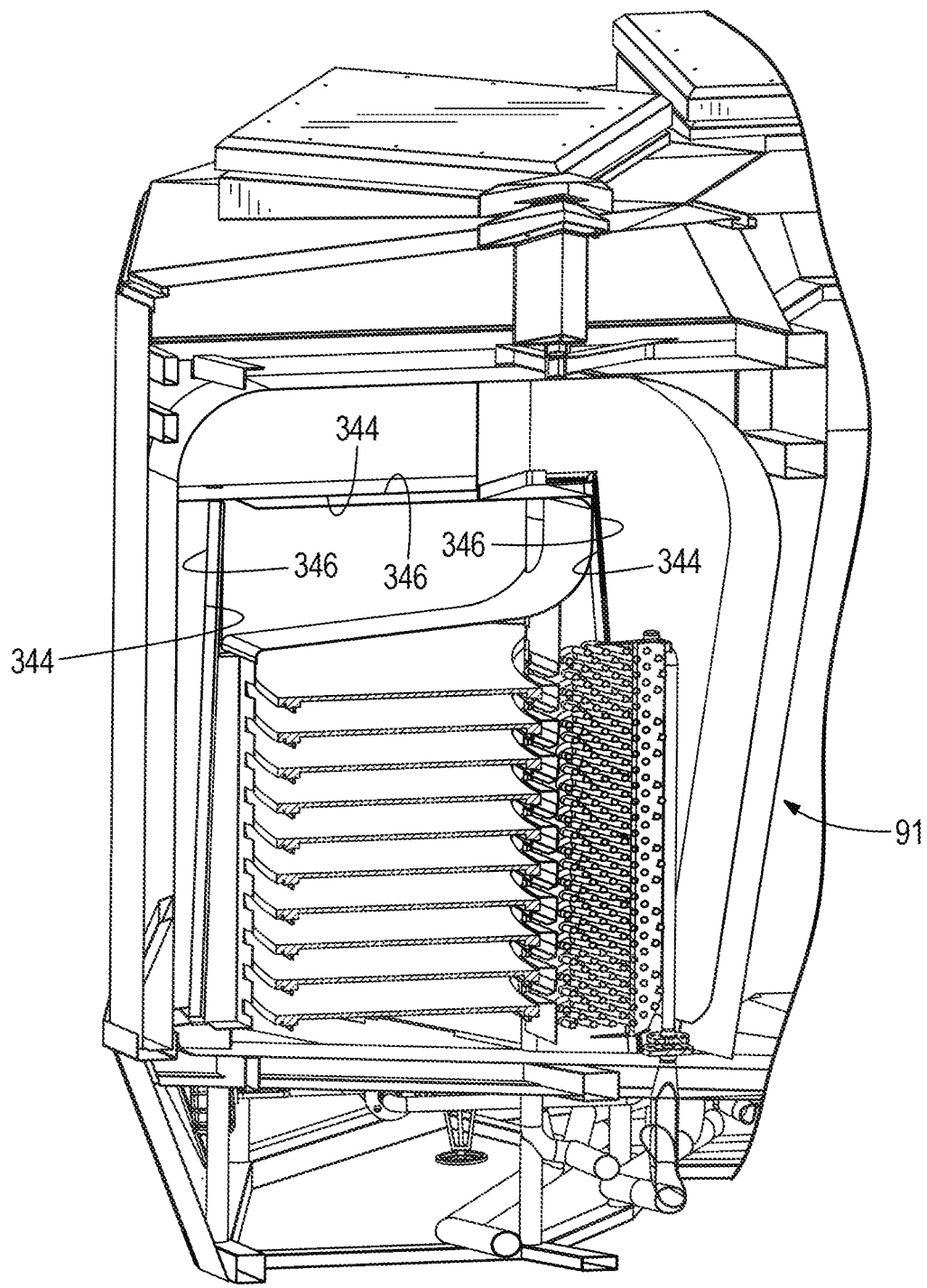
FIG. 28C is a top perspective cross-sectional view of the spiral cooking device shown in FIG. 2 with the engagement members of the hood and substructure emphasized, according to one aspect of the present disclosure.
Figure 28D:
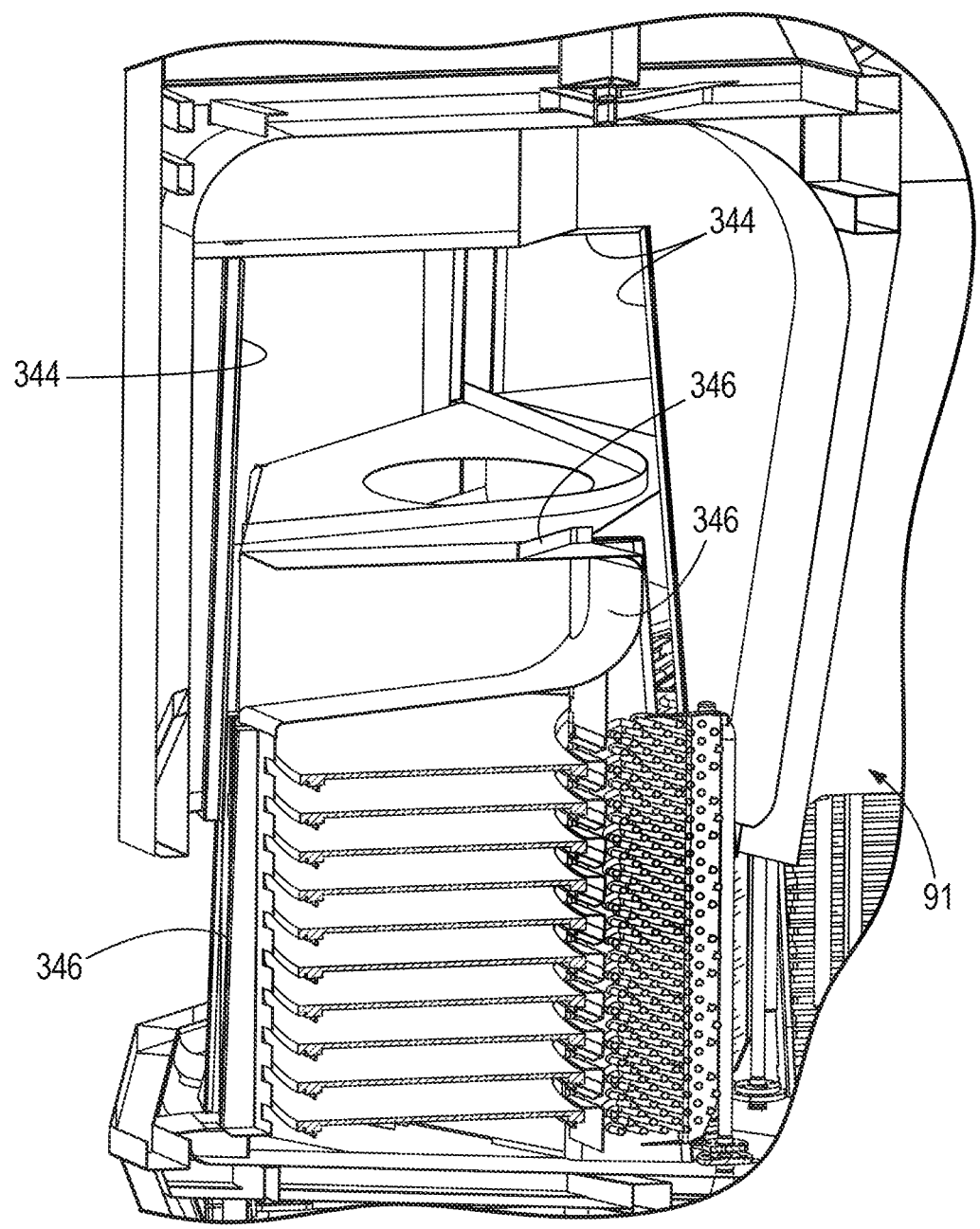
FIG. 28D is a top perspective cross-sectional view similar to FIG. 28C except the hood is at least partially raised relative to the substructure with the engagement members thereof emphasized, according to one aspect of the present disclosure.
Figure 28E:
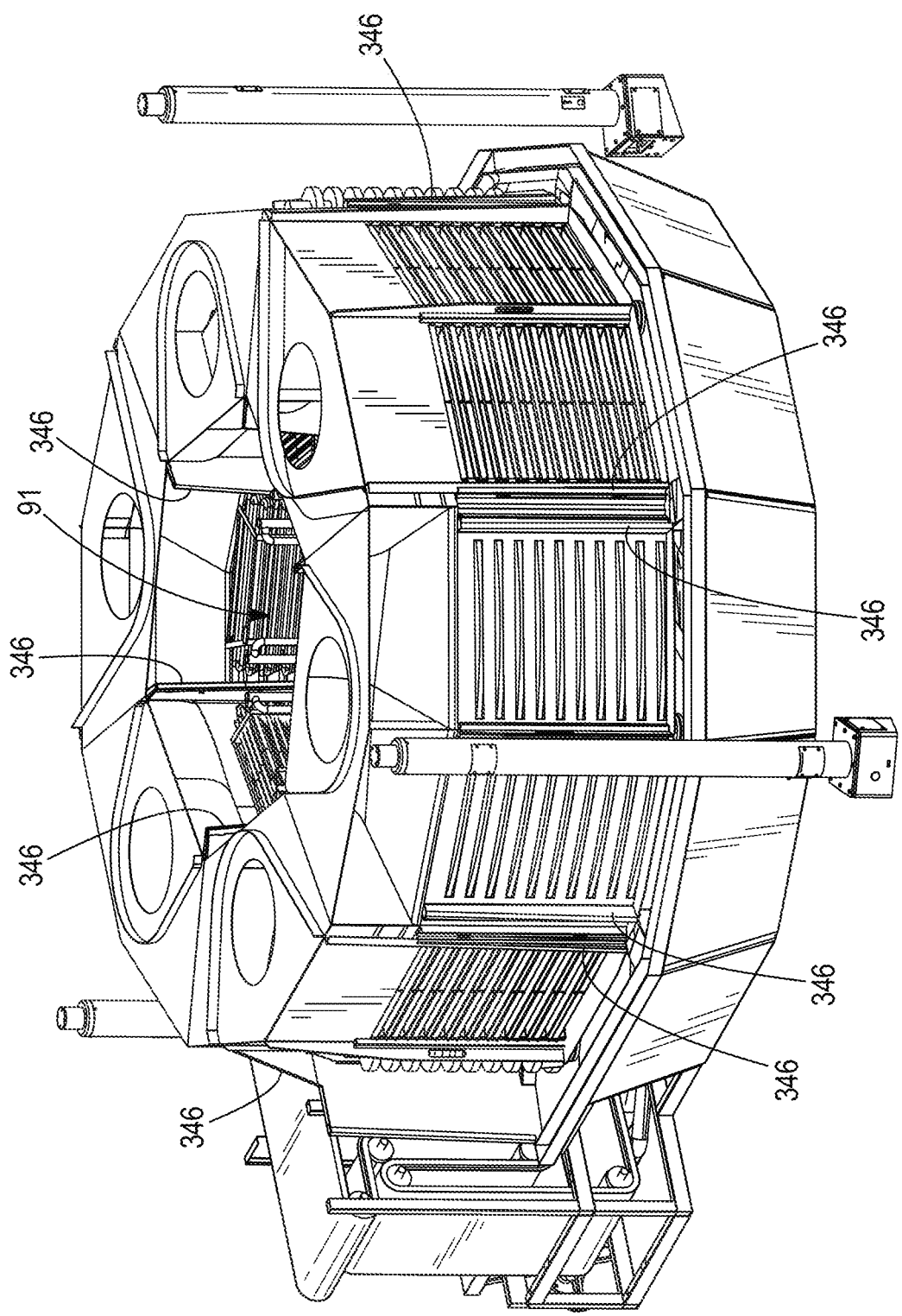
FIG. 28E is a top perspective view of the substructure of the spiral cooking device shown in FIG. 2 with the engagement members of the substructure emphasized, according to one aspect of the present disclosure.

With reference to FIGS. 27 and 28-28E, the spiral cooking device 24 is configured to seal in a substantially air-tight manner to inhibit leaking of heated air 148 from the hood 36 to the environment and is configured to seal between the cooking zones 136-141 to inhibit heated air 148 from passing from one cooking zone to another cooking zone. In one example, the hood 36 includes a plurality of engagement members 344 configured to engage engagement members 346 of the substructure 150 of the spiral cooking device 24 to seal between the cooking zones 136-141. In one example, the engagement members 344, 346 are resilient to allow flexing when engaging each other to accommodate slight tolerance differences in the components of the spiral cooking device 24. In one example, the hood 36 also includes an internal wall 348 and an external wall 352 that engage the base 32 of the spiral cooking device 24 and provide a seal between the internal and external walls 348, 352 and the base 32. In one example, the internal and external walls 348, 352 (or at least a bottom portion thereof engaging the base 32) are resilient to accommodate slight tolerance differences in the spiral cooking device 24 and/or to ensure sufficient engagement to provide a seal. Bottom edges of the internal and external walls 348, 352 engage the base 32 to provide a seal between the hood 36 and the base 32, which inhibits heated air 148 from escaping the spiral cooking device 24 and entering the surrounding environment.

Figure 29:
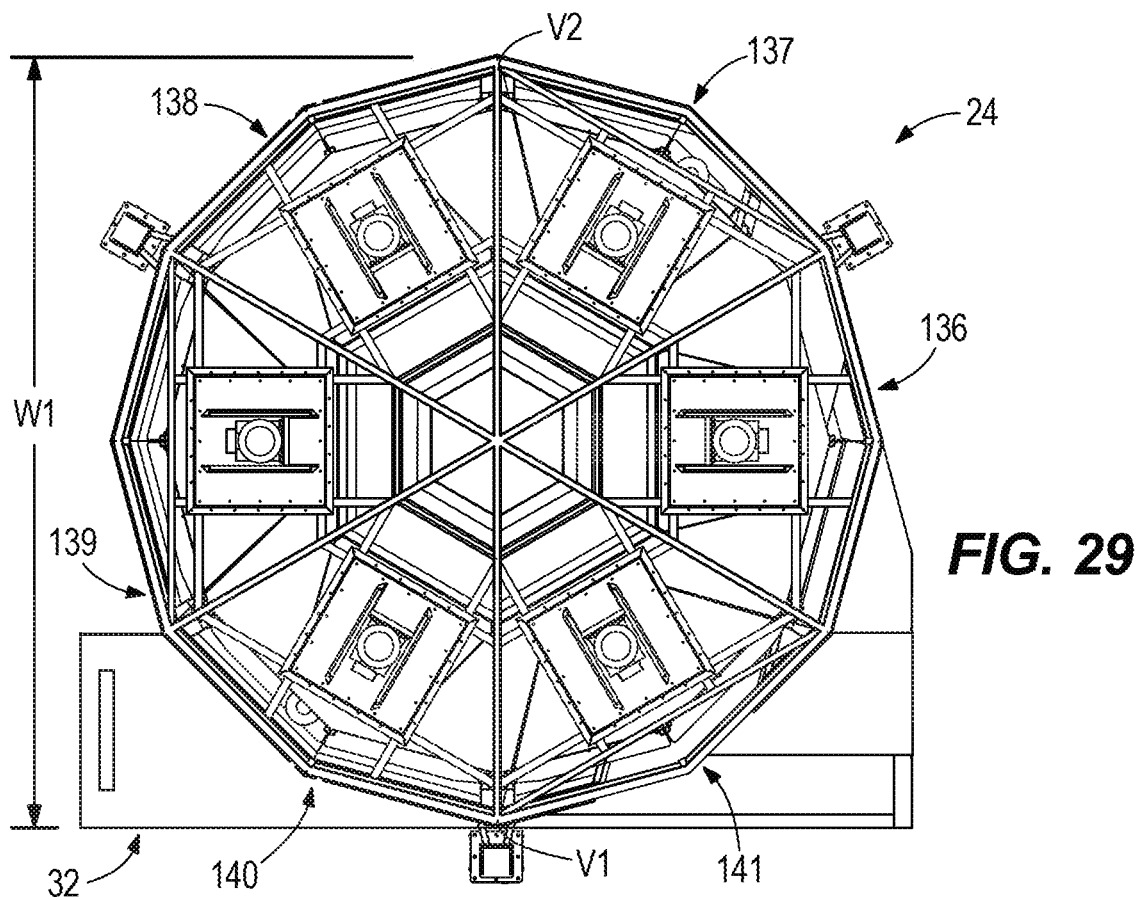
FIG. 29 is a top view of the spiral cooking device shown in FIG. 2 with the hood removed to expose components of the spiral cooking device, in this figure the plurality of cooking zones are illustrated in a first configuration, according to one aspect of the present disclosure.

Referring now to FIG. 29, in one example, the spiral cooking device 24 is shown in one orientation or configuration. In this example, the spiral cooking device 24 includes a number of cooking zones 136-141 and complementary shaped hood 36 to provide a twelve-sided polygon as viewed from above. In other examples, the spiral cooking device 24 may include different numbers of cooking zones 136-141 and different configurations, which may result in a different shape as viewed from above. In the example illustrated in FIG. 29, the cooking zones 136-141 and resulting hood shape are oriented such that one vertex V1 of the hood 36 is positioned at a bottom most point and another one of the vertices or opposite vertex V2 is positioned at a top most point. In this example, the spiral cooking device 24 has a first width W1.

Figure 30:
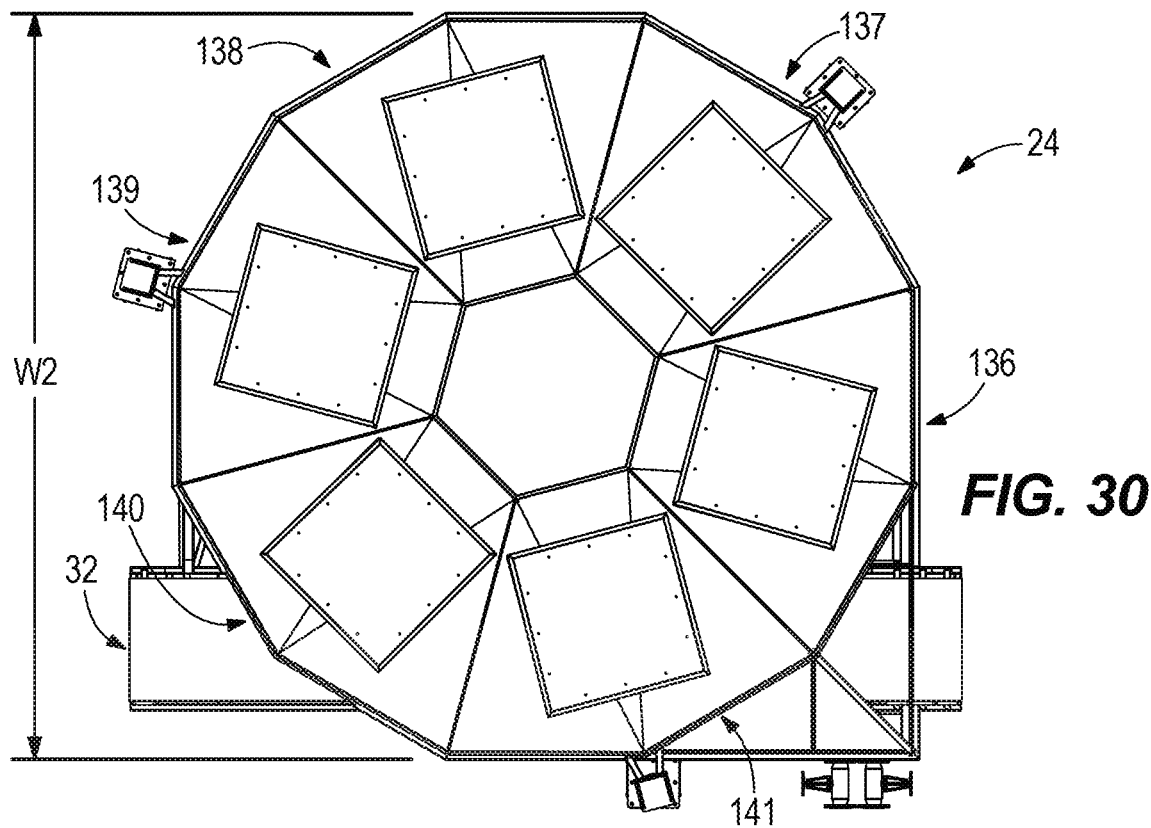
FIG. 30 is a top view of another example of a spiral cooking device with the hood and the plurality of cooking zones in a second configuration, according to one aspect of the present disclosure.
Figure 31:
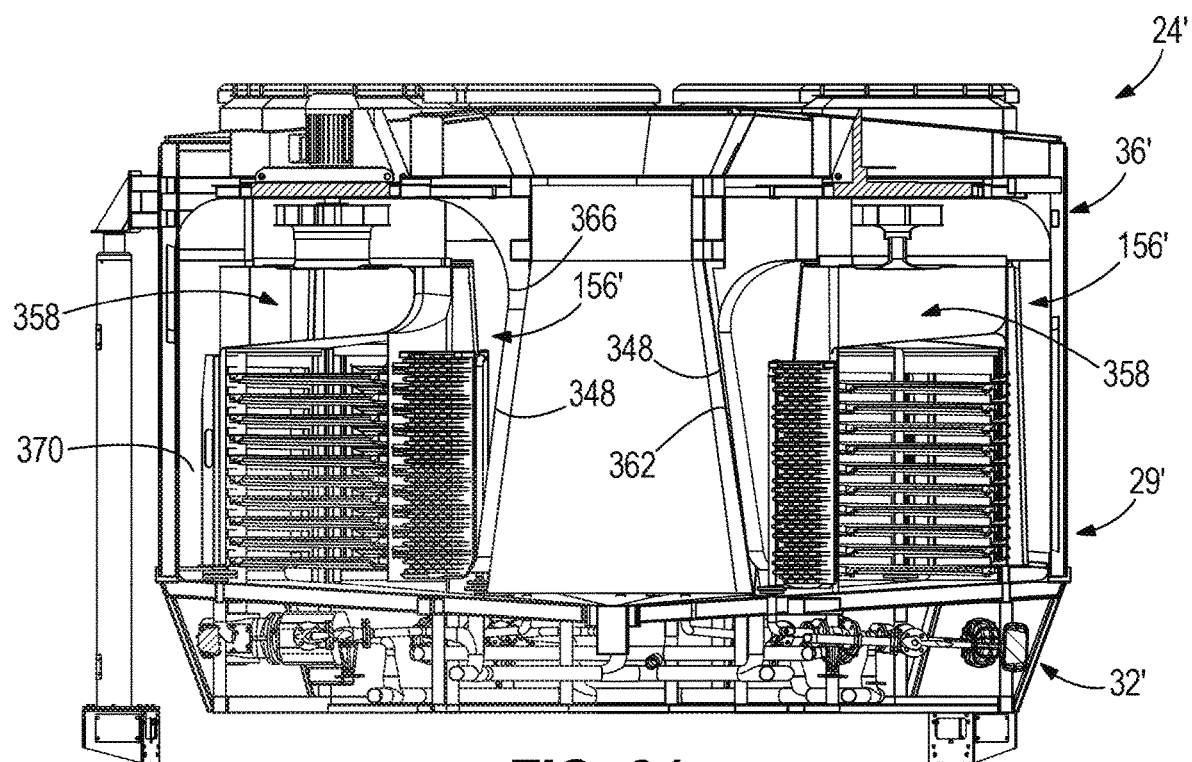
FIG. 31 is an elevational cross-sectional view of another example of a spiral cooking device including one example of different height air return paths and air infeed paths, according to one aspect of the present disclosure.
Figure 32:
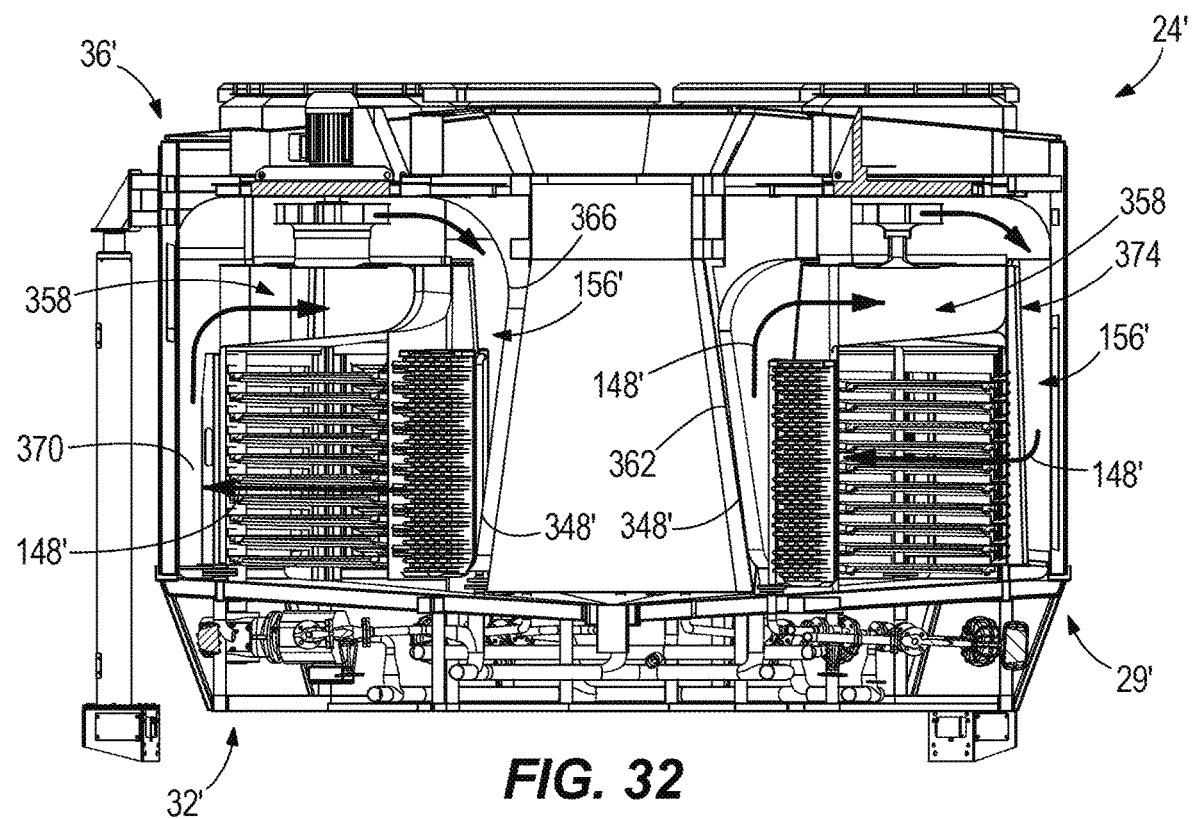
FIG. 32 is an elevational cross-sectional view similar to FIG. 31 including indicators for examples of air directions, and indicators for an air return path and air infeed path, according to one aspect of the present disclosure.

It should be understood that the spiral cooking device 24 is capable of having various configurations and orientations, and all of such possibilities are intended to be within the spirit and scope of the present disclosure. For example, with reference to FIG. 30, another example of the spiral cooking device 24 is illustrated and in such an example the cooking zones 136-141 and the resulting hood configuration is different than the example shown in FIG. 29. More particularly, the cooking zones 136-141 and resulting hood shape have been moved within and relative to the spiral cooking device 24 to result in two of the twelve flat sides of the twelve-sided polygon shape of the hood positioned at the top most point and the bottom most point as viewed from above. In this configuration, the spiral cooking device 24 has a second width W2, which is less than the first width W1. As indicated above, the spiral cooking device 24 may have a variety of different cooking zones 136-141 and a variety of different shapes associated with the number of cooking zones 136-141. It should be understood that the spiral cooking device 24 may be configured in a variety of manners associated with the number of cooking zones 136-141 and such different configurations may provide different dimensions of the spiral cooking device 24, with some of the configurations resulting in smaller dimensions, different cooking operations and/or better cooking operations.

With reference to FIGS. 31-34, another example of a spiral cooking device 24' is illustrated. The spiral cooking device 24' illustrated in FIGS. 31-34 is capable of including any quantity of the structure/components and having any quantity of the functionality of the spiral cooking devices 24 illustrated in FIGS. 1-30, and all of such similar structure/components included in the spiral cooking device 24' have the same reference number and an "'".

Figure 33:
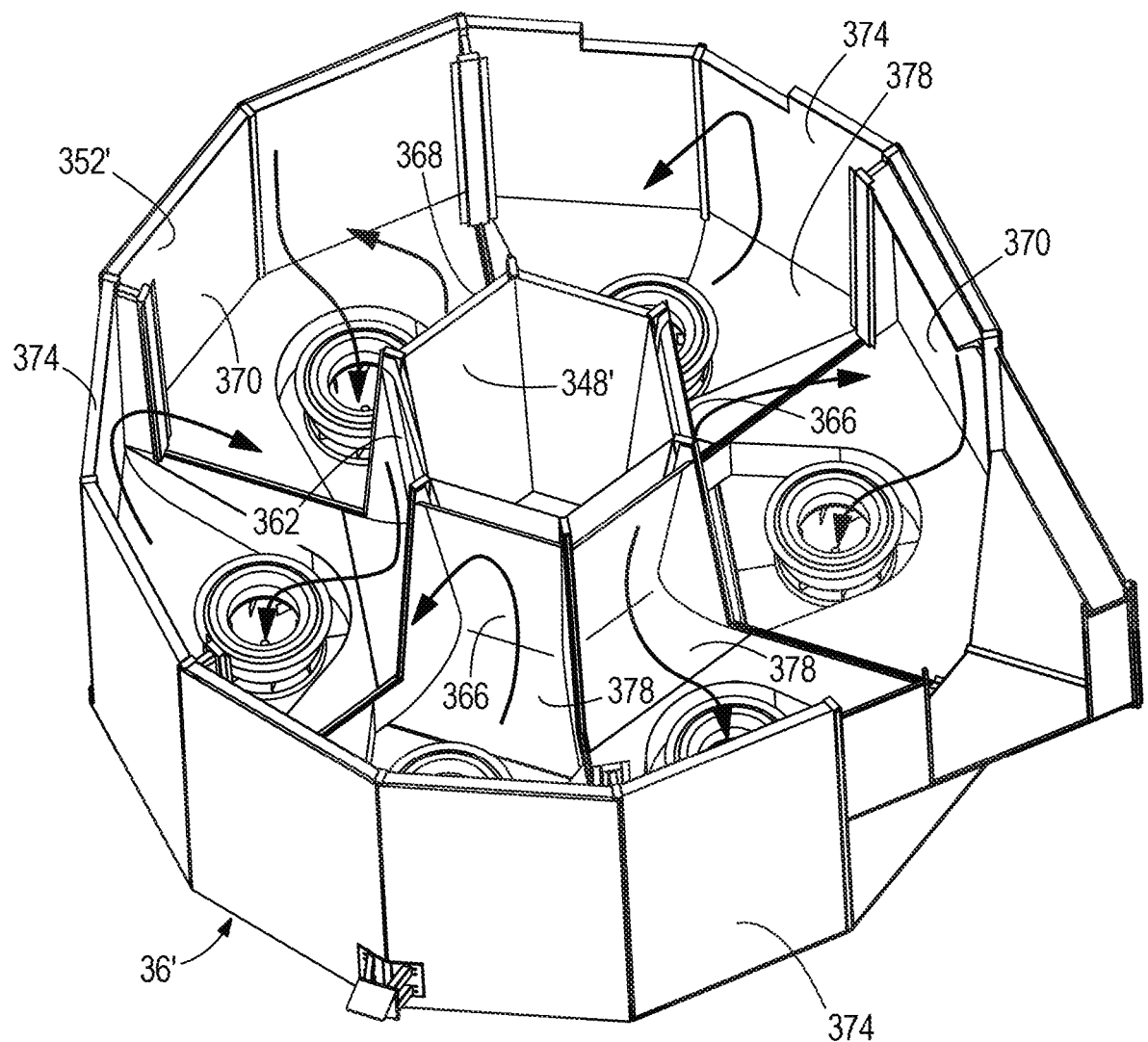
FIG. 33 is a bottom perspective view of one example of an interior of a hood of the spiral cooking device shown in FIG. 31 including indicators for examples of air directions, according to one aspect of the present disclosure.
Figure 34:
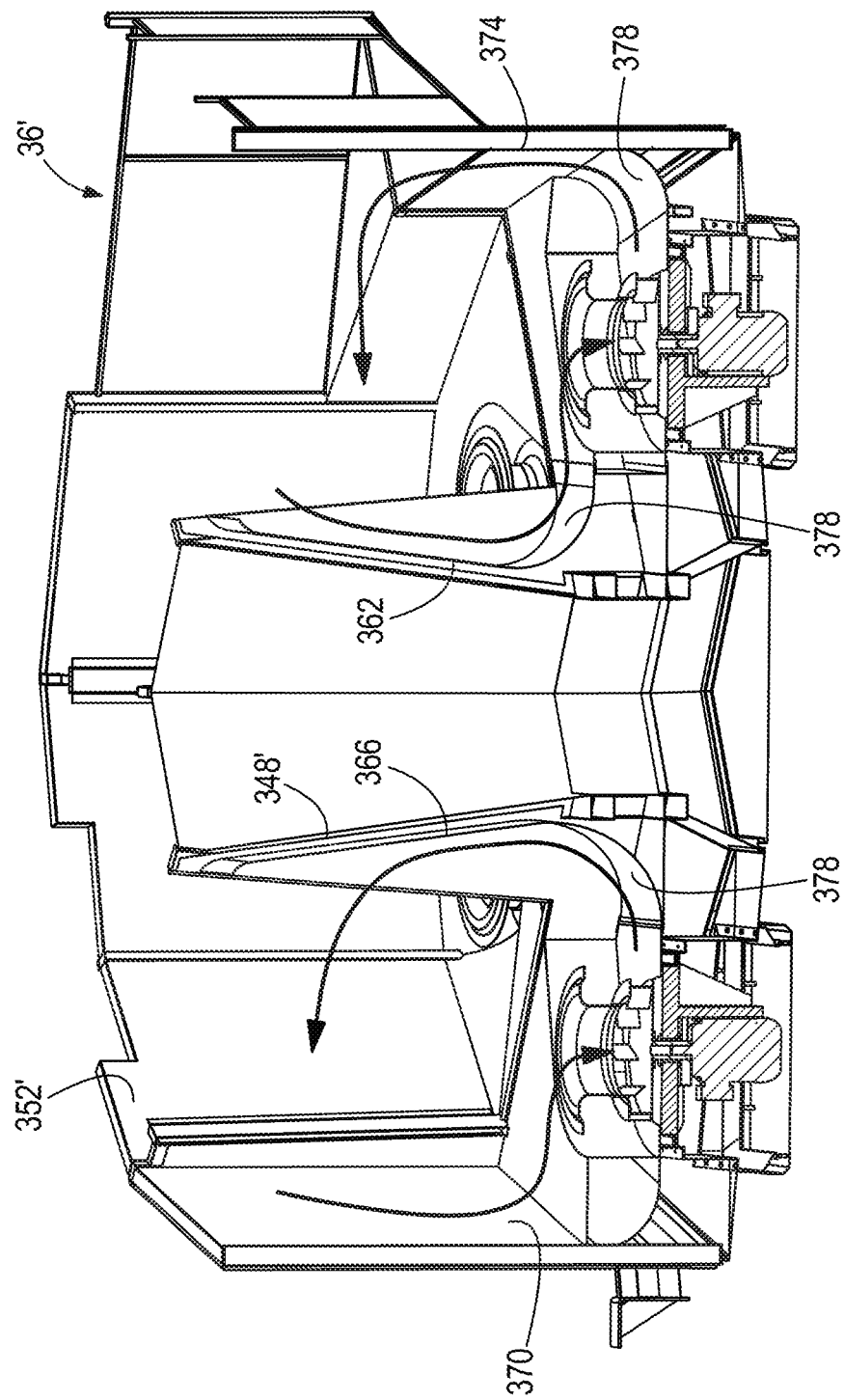
FIG. 34 is a cross-sectional bottom perspective view of a portion of the hood shown in FIG. 33 including indicators for examples of air directions, according to one aspect of the present disclosure.

In this example, each cooking zone 136'-141' includes an air chamber 358 below the fan chamber 168'. Air passes into the air chamber 358 before entering the fan chamber 168' (in which at least a portion of the fan is positioned). The fans 144' are not positioned in the respective air chambers 358. In the cooking zones 136'-141', air from the air return paths 160' enters the air chambers 358 prior to entering the fan chambers 168' (see FIG. 32). To accommodate the air chambers 358, the air return path 160' in each cooking zone 136'-141' is shorter in stature than the air infeed path 156'. That is, the air chamber 358 is below the fan chamber 168' and the air return path 160' directs the return air 164' into the lower air chamber 358. The air is then directed into the fan chamber 168' above the air chamber 358. From the fan chamber 168', the air is directed into the air infeed path 156'. Since the fan chamber 168' is higher than the air chamber 358, the air infeed path 156' must be higher in stature to receive the air from the fan chamber 168'. The air infeed path 156' then directs the air downward toward the cooking layers. With reference to FIGS. 33 and 34, in one example, the shorter air return path 160' and the taller air infeed path 156' are at least partially defined by the hood 36'. More particularly, in some cooking zones, an interior wall 362 of the hood 36' defines the shorter air return paths 160' and in other cooking zones an interior wall 366 of the hood 36' defines the taller air infeed paths 156'. Also, in some cooking zones, an exterior wall 370 of the hood 36' defines the shorter air return paths 160' and in other cooking zones an exterior wall 374 of the hood 36' defines the taller air infeed paths 156'.

With continued reference to FIGS. 31-34, in one example, the interior wall and exterior wall of the hood 36' include deflectors 378 that at least partially define the respective air return paths 160' and air infeed paths 156'. These deflectors 378 assist with directing air in an appropriate manner along the air return paths 160' and air infeed paths 156'. Additionally, in one example, the interior and exterior walls, along with the shape of the deflectors 378, make it easy to clean inside the hood 36'. This exemplary configuration of the hood 36' eliminates any difficult to reach corners or cavities and proves smooth, easy to access and clean surfaces.

Figure 35:
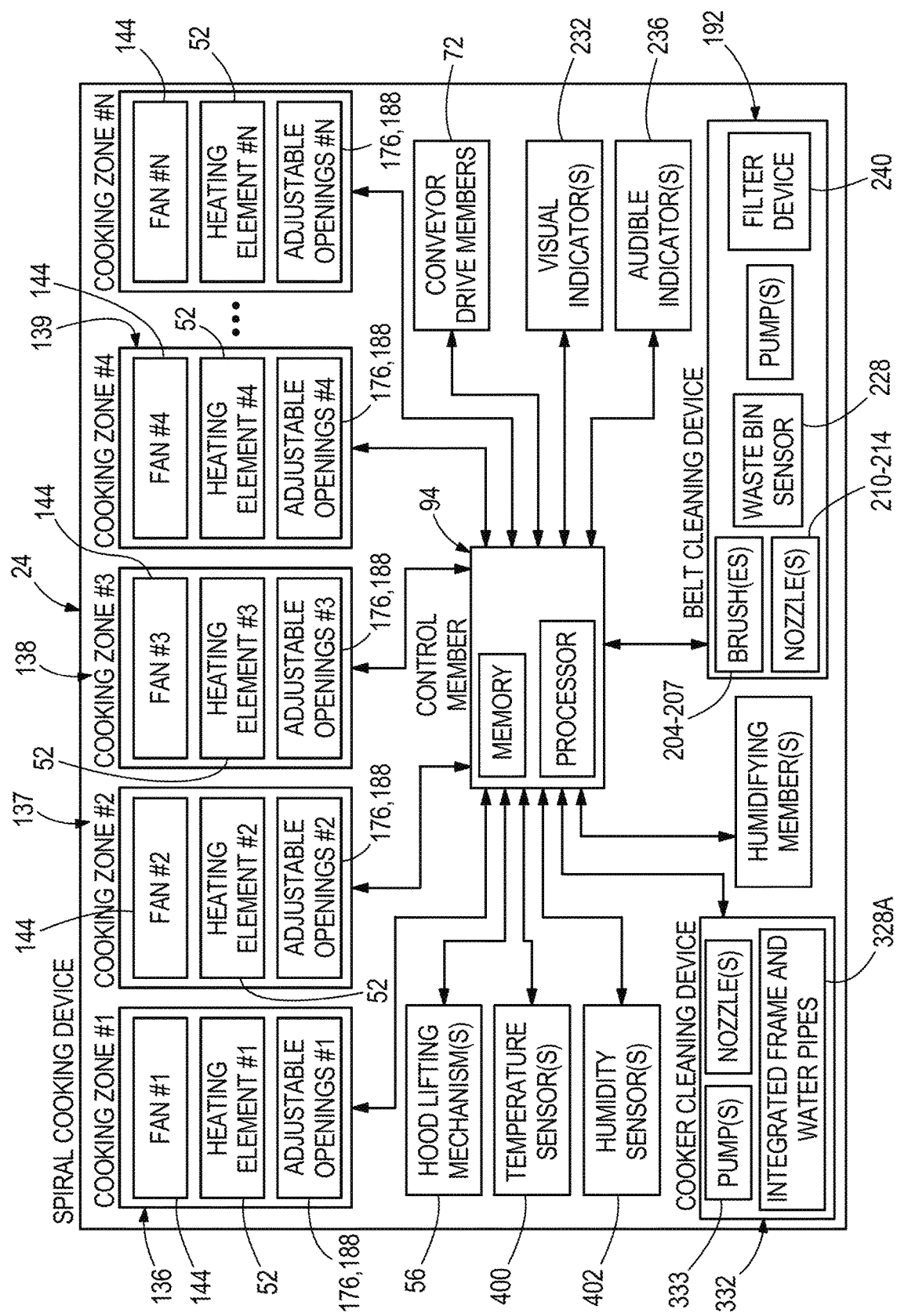
FIG. 35 is one example of a block diagram of one example of a spiral cooking device with the components and functionality of this one example of the spiral cooking device being capable of applying to any of the spiral cooking devices disclosed herein, according to one aspect of the present disclosure.

Referring now to FIG. 35, one example of a block diagram is illustrated and may be associated with any of the spiral cooking devices 24, 24', 24", 24''' illustrated and described herein. For the sake of simplicity, components illustrated in FIG. 35 will solely include the alphanumeric number and not the one or more apostrophes even though the disclosure of FIG. 35 may pertain to any of the spiral cooking devices 24', 24", 24'''. Moreover, the block diagram is not intended to be limiting upon any of the present disclosure or any examples of spiral cooking devices 24, 24', 24", 24''' disclosed herein, but is rather provided to demonstrate at least some of the principles of the present disclosure. At least some of the components included in this exemplary block diagram have been introduced and described above in detail. The spiral cooking devices 24, 24', 24", 24''' may also include one or more temperature sensors 400 and one or more humidity sensors 402 in communication with the control member 94. The control member 94 receives data associated with the one or more temperature sensors 400 and/or the one or more humidity sensors 402 to maintain the spiral cooking devices 24, 24', 24", 24'" at a desired cooking condition. The spiral cooking devices 24, 24', 24", 24'" may include any number of temperature sensors 400 and any number of humidity sensors 402, both of which may be positioned anywhere within the spiral cooking devices 24, 24', 24", 24'", and all of such possibilities are intended to be within the spirit and scope of the present disclosure. In one example, the spiral cooking devices 24, 24', 24", 24'" may include a single temperature sensor 400 and a single humidity sensor 402. In another example, the spiral cooking devices 24, 24', 24", 24'" may include a temperature sensor 400 and a humidity sensor 402 in each of the cooking zones 136-141. In a further example, the spiral cooking devices 24, 24', 24", 24'" may include a single humidity sensor 402 therein and a temperature sensor 400 in each of the cooking zones 136-141.

In one example, the control member 94 communicates with the various components of the spiral cooking devices 24, 24', 24", 24'" to retrieve and/or send information or data as necessary. The control member 94 may include any necessary hardware, software or any combination thereof to achieve the processes, methods, functionalities, operations, etc., of the present disclosure.

In one example, the control member 94 may be comprised of one or more of software and/or hardware in any proportion. In such an example, the control member 94 may reside on a computer-based platform such as, for example, a server or set of servers. Any such server or servers may be a physical server(s) or a virtual machine(s) executing on another hardware platform or platforms. The nature of the configuration of such server or servers is not critical to the present disclosure. Any server, or for that matter any computer-based system, systems or elements described herein, will be generally characterized by one or more processors and associated processing elements and storage devices communicatively interconnected to one another by one or more busses or other communication mechanism for communicating information or data. In one example, storage within such devices may include a main memory such as, for example, a random access memory (RAM) or other dynamic storage devices, for storing information and instructions to be executed by the processor(s) and for storing temporary variables or other intermediate information during the use of the control member 94 described herein. In one example, the control member 94 may also include a static storage device such as, for example, read only memory (ROM), for storing static information and instructions for the processor(s). In one example, the control member 94 may include a storage device such as, for example, a hard disk or solid state memory, for storing information and instructions. Such storing information and instructions may include, but not be limited to, instructions to compute, which may include, but not be limited to processing and analyzing information of all types. RAMs, ROMs, hard disks, solid state memories, and the like, are all examples of tangible computer readable media, which may be used to store instructions which comprise processes, methods and functionalities of the present disclosure. Execution of such instructions by the control member 94 may cause the various computer-based elements of the control member 94 to perform the processes, methods, functionalities, operations, etc., described herein. In some examples, the control member 94 of the present disclosure may include hard-wired circuitry to be used in place of or in combination with, in any proportion, such computer-readable instructions to implement the disclosure.

The spiral cooking devices of the present disclosure may be operated in a wide variety of manners and all of such possibilities are intended to be within the spirit and scope of the present disclosure. In one example, a spiral cooking device of the present disclosure may be configured to have a maximum cooking temperature of about 250 degrees Celsius. In one example, a spiral cooking device of the present disclosure may be configured to have a maximum cooking temperature of about 220 degrees Celsius.

It should be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the spiral cooking device and any component thereof may be utilized in any orientation and use of such terms is intended to correspond to the exemplary orientation of the spiral cooking device and its components illustrated in the drawings. The use of these terms in association with the spiral cooking device and its components are not intended to limit the spiral cooking device or its components to a single orientation or to limit the spiral cooking device and its components in any manner.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A spiral cooking device comprising:
a housing with an interior surface and an exterior surface;
a spiral conveyor belt at least partially positioned in the housing and arranged in a series of consecutive tiers providing a central opening inside the spiral conveyor belt, wherein the spiral conveyor belt includes an interior edge and an exterior edge such that the interior edge defines the central opening;
a conveyor belt drive member positioned between the exterior edge of the spiral conveyor belt and the interior surface of the housing and configured to drive the spiral conveyor belt, wherein the conveyor belt drive member is positioned externally of the central opening,
wherein the conveyor belt drive member includes:
a motor;

a first spindle extending from the motor;

a first plurality of sprockets coupled to the first spindle and positioned such that each of the plurality of sprockets engages the exterior edge of the spiral conveyor belt at each of the consecutive tiers and such that the motor drives the first spindle and the first plurality sprockets that in turn drive each of the consecutive tiers of the spiral conveyor belt in a common direction;

a heating element positioned in the central opening configured to move heated air horizontally through the consecutive tiers of the spiral conveyor belt; and a continuous conveyor belt wash device positioned proximate to the spiral conveyor belt, the continuous conveyor belt wash device including at least one brush engaging the spiral conveyor belt, a soak bin configured to hold an amount of fluid through which the spiral conveyor belt is configured to pass prior to engagement with the brush, and a filter device configured to receive debris dislodged from the spiral conveyor belt by at least the brush.

2. The spiral cooking device of claim 1, wherein the housing includes a base and a hood, wherein the hood is moveable relative to the base to selectively provide access inside the hood.

3. The spiral cooking device of claim 2, further comprising a lifting mechanism coupled between the base and the hood to selectively move the hood between a lowered position, in which the hood engages the base to facilitate a seal between the hood and the base and a lifted position, in which the hood is vertically raised relative to the base and does not provide a seal between the base and the hood.

4. The spiral cooking device of claim 1, wherein the housing includes a base and a hood, wherein the hood is rigidly coupled to the base, the spiral cooking device further comprising a plurality of doors coupled to the hood, wherein the doors are moveable relative to the hood to selectively provide access inside the hood.

5. The spiral cooking device of claim 1, further comprising a cooking location, an air infeed path and an air return path, wherein:

the helical conveyor belt is configured to move food product through the cooking location;

the air infeed path is in fluid communication with the cooking location and is configured to direct heated air into the cooking location;

the air return path is in fluid communication with the cooking location and is configured to receive air exiting the cooking location; and one of the air infeed path or the air return path is positioned in the central opening defined by the helical conveyor belt.

6. The spiral cooking device of claim 1, wherein the continuous conveyor belt wash device further includes a first sprayer to spray a further amount of the fluid onto the spiral conveyor belt, and wherein the filter device is further configured to receive debris additionally dislodged from the conveyor belt by the fluid sprayed by the first sprayer.

7. The spiral cooking device of claim 6, wherein the filter device includes a filter belt at least partially positioned below the brush to receive the debris and the fluid from the first sprayer.

8. The spiral cooking device of claim 7, wherein the filter belt is at least partially oriented in a non-horizontal manner.

9. The spiral cooking device of claim 7, wherein the filter belt defines a plurality of holes sufficiently sized to allow the fluid to pass through while retaining the debris on the filter belt.

10. The spiral cooking device of claim 1, wherein the housing and the spiral conveyor belt define a first cooking zone with air configured to move horizontally therethrough in a first direction and a second cooking zone with air configured to move horizontally therethrough in a second direction different than the first direction.

11. The spiral cooking device of claim 10, wherein the spiral cooking device is generally circular in shape, and wherein the first direction is a center-out direction and the second direction is an outside-in direction.

* * * * *